United States Patent
Cohen

(10) Patent No.: US 11,388,120 B2
(45) Date of Patent: Jul. 12, 2022

(54) PARALLEL MESSAGING APPARATUS AND METHOD THEREOF

(71) Applicant: Wrinkl, Inc., Sands Point, NY (US)

(72) Inventor: Marc A. Cohen, Blue Bell, PA (US)

(73) Assignee: Wrinkl, Inc., Sands Point, NY (US)

( * ) Notice: Subject to any disclaimer, the term of this patent is extended or adjusted under 35 U.S.C. 154(b) by 650 days.

(21) Appl. No.: 16/014,578

(22) Filed: Jun. 21, 2018

(65) Prior Publication Data
US 2018/0302357 A1    Oct. 18, 2018

Related U.S. Application Data

(63) Continuation-in-part of application No. 15/858,696, filed on Dec. 29, 2017, now Pat. No. 10,025,475, and a continuation-in-part of application No. 15/609,663, filed on May 31, 2017, now Pat. No. 10,009,300, application No. 15/858,696, which is a
(Continued)

(51) Int. Cl.
| | | |
|---|---|---|
| H04L 51/046 | (2022.01) | |
| H04L 51/18 | (2022.01) | |
| H04L 65/1069 | (2022.01) | |
| H04L 51/56 | (2022.01) | |
| H04L 51/212 | (2022.01) | |
| H04L 51/216 | (2022.01) | |

(52) U.S. Cl.
CPC .......... *H04L 51/046* (2013.01); *H04L 51/18* (2013.01); *H04L 51/212* (2022.05); *H04L 51/216* (2022.05); *H04L 51/56* (2022.05); *H04L 65/1069* (2013.01)

(58) Field of Classification Search
CPC ....... H04L 51/046; H04L 51/36; H04L 51/18; H04L 51/16; H04L 51/12; H04L 65/1069
See application file for complete search history.

(56) References Cited

U.S. PATENT DOCUMENTS

| | | |
|---|---|---|
| 7,945,620 B2 | 5/2011 | Bou-Ghannam et al. |
| 8,832,569 B2 | 9/2014 | Chen et al. |
| (Continued) | | |

OTHER PUBLICATIONS

Brown, A. (2016). WhatsApp quietly introduced a brand-new way to reply to your messages. Express. Available online from https://www.express.co.uk/life-style/science-technology/679325/WhatsApp-How-To-Quote-Message-in-Reply-iOS-Android-Chat.
(Continued)

*Primary Examiner* — Benjamin R Bruckart
*Assistant Examiner* — Akshay Doshi
(74) *Attorney, Agent, or Firm* — Caesar Rivise, PC

(57) ABSTRACT

An apparatus is for providing display of exchanged messages wherein the apparatus comprises a memory for storing the messages; and at least one processor for providing display of messages exchanged between a plurality of participants, the messages are exchanged within channels, wherein each of said participants exchanges messages with others of the participants in one or more channels in which message exchange between the plurality of participants is authorized; and any of the participants are prevented from exchanging messages in one or more channels when message exchange between the plurality of participants is not authorized; and allowing one of the participants sending one of the messages in one of the channels to send the one of the messages in parallel to another one of the channels.

35 Claims, 52 Drawing Sheets

Related U.S. Application Data continuation-in-part of application No. 15/431,077, filed on Feb. 13, 2017, now Pat. No. 9,860,198, application No. 15/609,663, which is a continuation of application No. 15/293,620, filed on Oct. 14, 2016, now Pat. No. 9,712,466.

(60) Provisional application No. 62/666,137, filed on May 3, 2018, provisional application No. 62/518,905, filed on Jun. 13, 2017, provisional application No. 62/446,067, filed on Jan. 13, 2017, provisional application No. 62/358,719, filed on Jul. 6, 2016, provisional application No. 62/253,229, filed on Nov. 10, 2015.

(56) References Cited

U.S. PATENT DOCUMENTS

| | | | |
|---|---|---|---|
| 9,218,603 | B2 | 12/2015 | Kumar |
| 9,262,455 | B2 | 2/2016 | Palay |
| 9,426,102 | B1 | 8/2016 | Wong et al. |
| 9,712,466 | B2 | 7/2017 | Cohen et al. |
| 9,860,198 | B1 | 1/2018 | Cohen et al. |
| 9,971,500 | B2 | 5/2018 | Yang et al. |
| 9,996,248 | B2 | 6/2018 | Park et al. |
| 10,009,300 | B2 | 6/2018 | Cohen et al. |
| 10,025,475 | B1 | 7/2018 | Cohen |
| 10,659,243 | B1* | 5/2020 | Soroker ............... H04L 51/043 |
| 2002/0095465 | A1 | 7/2002 | Banks et al. |
| 2005/0198584 | A1 | 9/2005 | Matthews et al. |
| 2006/0031361 | A1 | 2/2006 | Bailey et al. |
| 2007/0185961 | A1 | 8/2007 | Perlow et al. |
| 2009/0094288 | A1 | 4/2009 | Berry et al. |
| 2009/0119371 | A1 | 5/2009 | Chang et al. |
| 2010/0299599 | A1 | 11/2010 | Shin et al. |
| 2011/0047227 | A1 | 2/2011 | Arthurs et al. |
| 2011/0289406 | A1 | 11/2011 | Waessingbo |
| 2012/0017149 | A1 | 1/2012 | Lai et al. |
| 2012/0158857 | A1* | 6/2012 | Loofbourrow ......... G06Q 10/00 709/206 |
| 2012/0198360 | A1 | 8/2012 | Wanderski et al. |
| 2012/0240062 | A1* | 9/2012 | Passmore ............... H04L 51/32 715/758 |
| 2013/0097260 | A1* | 4/2013 | Lee ........................ H04W 4/00 709/206 |
| 2014/0040784 | A1 | 2/2014 | Behforooz et al. |
| 2014/0059040 | A1 | 2/2014 | Cha et al. |
| 2014/0067977 | A1 | 3/2014 | Rasmussen et al. |
| 2014/0096033 | A1* | 4/2014 | Blair ...................... H04L 51/04 715/752 |
| 2014/0143684 | A1 | 5/2014 | Oh et al. |
| 2014/0195621 | A1 | 7/2014 | Rao Dv |
| 2014/0208402 | A1* | 7/2014 | White ..................... H04L 63/08 726/5 |
| 2014/0219433 | A1 | 8/2014 | Pai et al. |
| 2014/0298210 | A1 | 10/2014 | Park et al. |
| 2015/0088998 | A1* | 3/2015 | Isensee ................. G06F 40/279 709/206 |
| 2015/0188928 | A1 | 7/2015 | Shapiro |
| 2016/0028660 | A1* | 1/2016 | Weishaupl ............ G06F 21/606 709/206 |
| 2016/0179773 | A1 | 6/2016 | Shen et al. |
| 2016/0294742 | A1 | 10/2016 | Weaver et al. |
| 2016/0330147 | A1 | 11/2016 | Antebi et al. |
| 2017/0054664 | A1* | 2/2017 | Lee ........................ H04L 51/16 |
| 2017/0163594 | A1 | 6/2017 | Anderson |
| 2018/0159812 | A1 | 6/2018 | Sarafa et al. |
| 2018/0351903 | A1* | 12/2018 | Allen ..................... H04L 51/04 |
| 2018/0359292 | A1* | 12/2018 | Chen ................... H04L 65/1093 |

OTHER PUBLICATIONS

Slack. "Share messages in Slack" in "Using Slack". Obtained from https://get.slack.help/hc/en-us/articles/203274767-Share-messages-in-Slack. Jan. 2017.

"Top 50 Features of Slack to Boost Your Productivity", Blog.standuply.com, Sep. 11, 2016, retrieved from: <https://blog.standuply.com/50-additional-features-of-slack-to-boost-your-productivity-959ee56f7893>, retrieved on Dec. 11, 2019.

"How to Retweet With a Comment, aka Use the Life-Changing Feature Twitter Just Added," Bustle.com, Apr. 7, 2015, retrieved from: URL<https://www.bustle.com/articles/74648-how-to-retweet-with-a-comment-aka-use-the-life-changing-feature-twitter-just-added>, retrieved on Dec. 11, 2019.

"Narwhal: The Best Reddit Client-Apps (App Walkthrough," Corban Tech, Dec. 16, 2016, retrieved from: URL<https://www.youtube.com/watch?v=78wgtwP1hKE>, (Video Submission), retrieved on Dec. 11, 2019.

"WhatsApp Can Quote Messages You Want to Respond to," Engadget.com, Jun. 2016, retrieved from: URL<https://www.engadget.com/2016/06/12/whatsapp-quote-messages/>, retrieved on Dec. 11, 2019.

"How to Retweet Anything iPhone iPad iPod Mac," Tech & Design, Jul. 18, 2015, retrieved from: URL<https://www.youtube.com/watch?v=6D_MkQO0zjY>, (Video Submission), retrieved on Dec. 11, 2019.

"How to Retweet the Right Way (With a Comment) on Twitter," HubSpot.com, Apr. 15, 2015, retrieved from: URL<https://blog.hubspot.com/blog/tabid/6307/bid/27675/how-to-retweet-the-right-way-in-4-easy-steps.aspx>, retrieved on Dec. 11, 2019.

"Twitter Updates TweetDeck, Allows Users to Edit and Retweet," Mashable.com, Mar. 22, 2012, retrieved from: URL<https://mashable.com/2012/03/22/tweetdeck-rt-updates/>, retrieved on Dec. 11, 2019.

"Outlook for Android: Swipe Options, Swipe Left for Reply, Swipe Right for Forward. Please Add These Options," Outlook.uservoice.com, Sep. 30, 2015, retrieved from: URL<https://outlook.uservoice.com/forums/293346-outlook-for-android/suggestions/9992319-swipe-options-swipe-left-for-reply-swipe-right-f>, retrieved on Dec. 11, 2019.

"How to Use the New Retweet Function on Twitter-Social Media Solutions," Plexus Worldwide, Apr. 7, 2015, retrieved from: URL<https://www.youtube.com/watch?v=Ji9mAP8vwiQ>, (Video Submission), retrieved on Dec. 11, 2019.

"Using Slack," Slack.com, 2019, retrieved from: URL<https://slack.com/help/articles/203274767>, retrieved on Dec. 11, 2019.

"Sharing Messages in Slack," Slackhq.com, May 2016, retrieved from: URL<https://slackhq.com/sharing-messages-in-slack>, retrieved on Dec. 11, 2019.

"Share Messages in Slack: From Channels to Search—Learn How Slack Works From Top to Bottom!," Slack.com, retrieved from: URL<https://slack.com/help/articles/203274767-Share-messages-in-Slack>, retrieved on Dec. 16, 2019.

"Free Open-Source Distributed Alternative to Twitter: Mastodon," T5 by Robin Good, Oct. 10, 2016, retrieved from: URL<tools.robingood.com/site/contents/content/765621/2016-10-06/free-open-source-distributed-alternative-to-twitter-mastodon>, retrieved on Dec. 11, 2019.

Written Opinion of related PCT Application No. PCT/US2018/13462 dated Apr. 4, 2018.

International Search Report and Written Opinion for PCT Application No. PCT/US2018/13462 dated Apr. 4, 2018.

* cited by examiner

Figure 11C

ChannelA (e.g., Sales)
- MarcCohen: Looking forward to the conference?
- KareKessler: Me too! I love Philly!
- ErikKatz: Are we the only ones going?

ChannelB #ChannelC Who is going to the conference in Philadelphia?

1101

1108
ChannelA (e.g., Sales)
- MarcCohen: Looking forward to the conference?
- KareKessler: Me too! I love Philly!
- ErikKatz: Are we the only ones going?
- MarcCohen shared with #ChannelB and #ChannelC Who is going to the conference in Philadelphia? REPLY

*Type new message here* e.g., Private Group Channel

1109
ChannelB (e.g., Marketing)
- DeenaH: I'm uploaded the designs. Check them out!
- PhillipGreen: They look great!
- MarcCohen shared with #ChannelB and #ChannelC Who is going to the conference in Philadelphia? REPLY

*Type new message here* e.g., Private Group Channel

1110
ChannelC (e.g. TomSmith)
- TomSmith: @MarcCohen when is the RFP due?
- MarcCohen: Friday at 5PM!
- MarcCohen shared with #ChannelB and #ChannelC Who is going to the conference in Philadelphia? REPLY

*Type new message here* e.g., Private Direct Message Channel

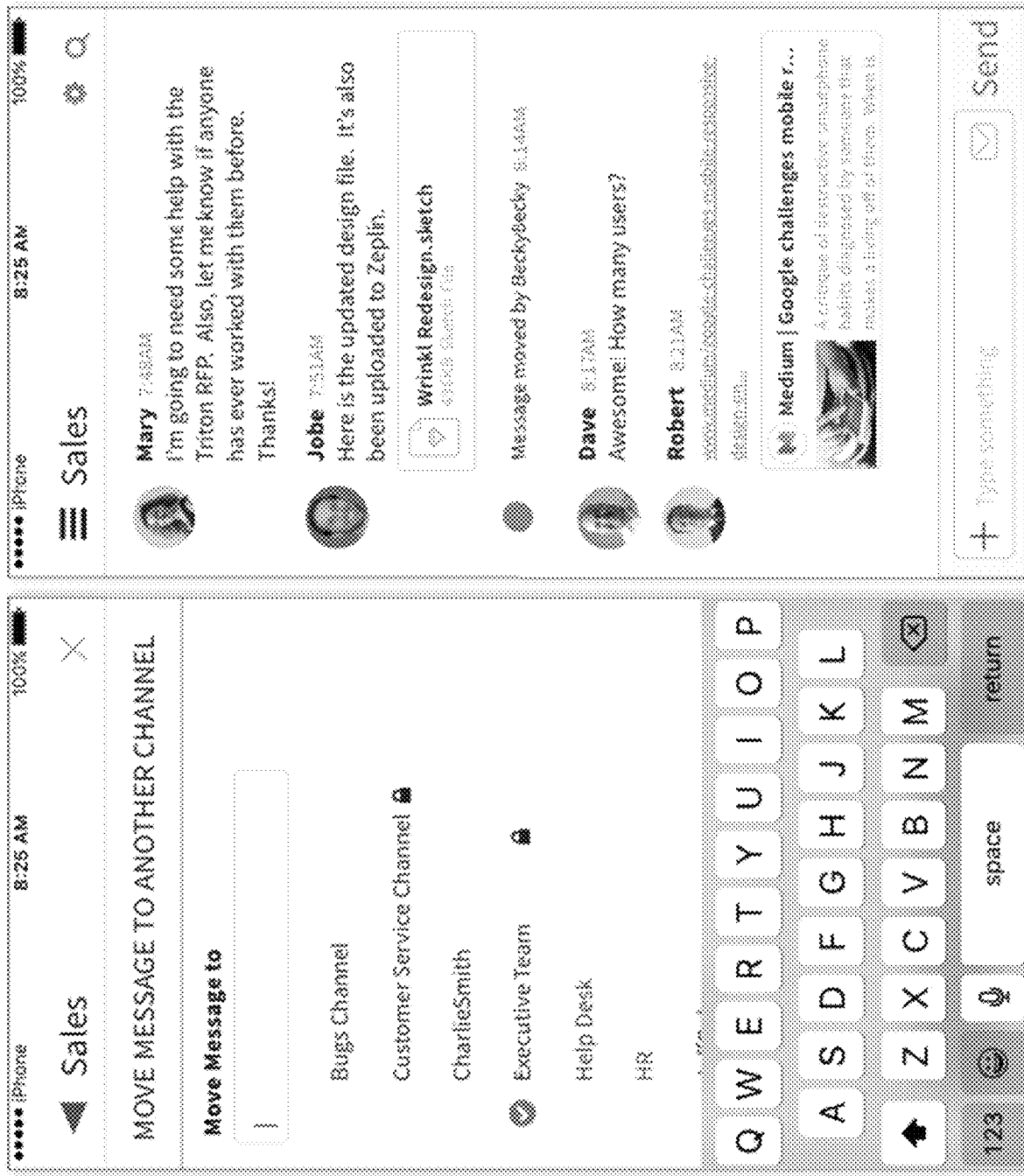

PARALLEL MESSAGING APPARATUS AND METHOD THEREOF

CROSS REFERENCE TO RELATED APPLICATIONS

This application is a Continuation-In-Part of U.S. patent application Ser. No. 15/609,663, filed May 31, 2017, which is a Continuation of U.S. patent application Ser. No. 15/293,620, which claims the benefit under 35 U.S.C. § 119(e) of U.S. Provisional Patent Application No. 62/358,719, filed Jul. 6, 2016, and U.S. Provisional Patent Application No. 62/253,229, filed Nov. 10, 2015, the disclosures of all of which are incorporated by reference herein in their entireties.

This application is also a Continuation-In-Part of U.S. patent application Ser. No. 15/858,696 filed on Dec. 29, 2017, which a) is a Continuation-In-Part of U.S. patent application Ser. No. 15/431,077 filed Feb. 13, 2017, which claims the benefit of priority under 35 U.S.C. § 119(e) to U.S. Provisional Patent Application 62/446,067 filed Jan. 13, 2017, and b) also claims the benefit of priority under 35 U.S.C. § 119(e) of U.S. Provisional Patent Application 62/518,905 filed on Jun. 13, 2017, the disclosures of all of which are incorporated by reference herein in their entireties.

This application claims the benefit under 35 U.S.C. 119(e) of U.S. Provisional Patent Application 62/666,137, filed May 3, 2018, the disclosure of which is incorporated by reference herein in its entirety.

TECHNICAL FIELD

Implementations of the current disclosure relate generally to real-time electronic communications, and more specifically, for integrating actionable objects into an on-line chat communications platform.

BACKGROUND

Electronic chat communications (which include chat room communications, instant messaging and text messaging, etc.) are an increasingly popular way for two or more people to communicate on-line in virtual real time. For example, chat sessions for conveying a quick note are often used in the workplace in lieu of have a phone call with multiple individuals. In some situations, an ability to quickly communicate with more than one person using chat communications often saves time and avoids costly mistakes in collaborative efforts, such as team projects. When multiple people, however, are participating in a chat session that may be established for a large project, current electronic chat communications are limited due the sequential, read-only, chronological presentation of exchanges between individuals or groups individuals associated with the electronic chat session.

BRIEF DESCRIPTION OF THE DRAWINGS

The disclosure is illustrated by way of example, and not by way of limitation, and will become apparent upon consideration of the following detailed description, taken in conjunction with the accompanying drawings, in which like reference characters refer to like parts throughout, and in which:

FIGS. 11A-11D are screenshots that illustrate one or more exemplary embodiments of the present invention.

FIGS. 12A-12E are screenshots that illustrate one or more exemplary embodiments of the present invention.

FIGS. 16A-16D are screenshots that illustrate one or more exemplary embodiments of the present invention.

FIGS. 17A-17B are screenshots that illustrate one or more exemplary embodiments of the present invention.

SUMMARY OF THE INVENTION

Figure 1:
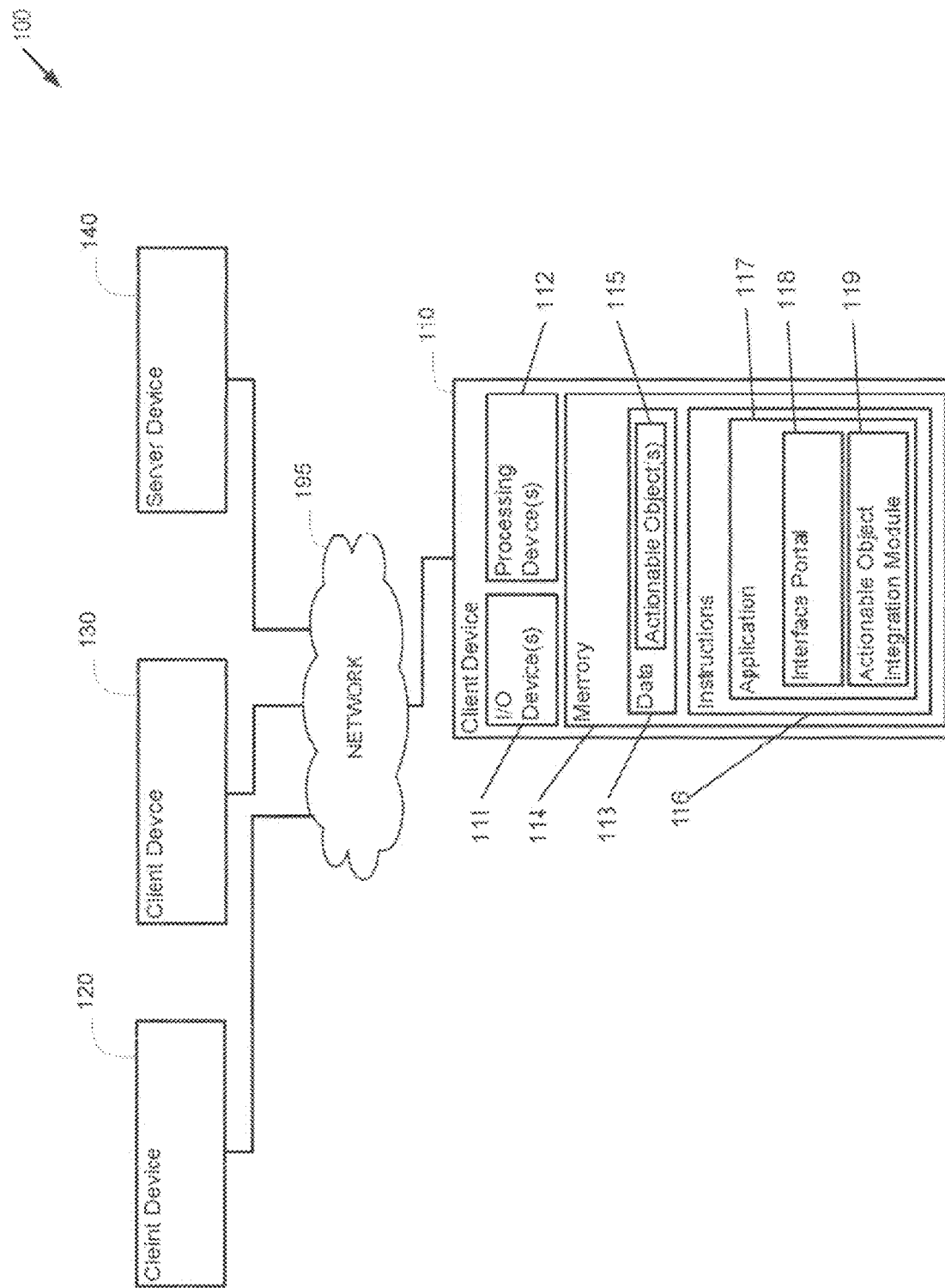
FIG. 1 is a block diagram illustrating a system in which implementations of the disclosure may operate.

An apparatus is for providing display of exchanged messages, wherein the apparatus comprises a memory for storing the messages; and at least one processor for providing display of messages exchanged between a plurality of participants, the messages are exchanged within channels, wherein each of said participants exchanges messages with others of the participants in one or more channels in which message exchange between the plurality of participants is authorized; and any of the participants are prevented from exchanging messages in one or more channels when message exchange between the plurality of participants is not authorized; and allowing one of the participants sending one of the messages in one of the channels to send the one of the messages in parallel to another one of the channels.

DETAILED DESCRIPTION

Implementations of the disclosure provide techniques for integrating actionable objects into an on-line chat communications platform. This may be advantageous in improving chat messaging technology by providing user perceivable actionable objects in a chat session that are executed by a client device to enhance communications between participants of the session.

To communicate typically, various different mediums use a number of different applications resulting in a loss of context and continuity in the communications. For example, some users may not be able to keep track of whether a message that was sent to or received from another user using different modes of communication (e.g., chat/email, etc.). In such cases, there is no organization flow associated with the messages nor is it possible to determine a response came before or after another message sent or received. Furthermore in traditional chat technology, information is extremely perishable. For example, once a message is off the top of the screen, it is rarely seen again, thus making it even harder to maintain the context of the message stream.

In accordance with the present disclosure a system is provided that can be used as a system of record for an organization, work group, social group, etc., using various combinations of communication techniques. In some aspects, the system addresses the problems in chat technology of disjointed, ad hoc electronic communications. For example, by allowing one-to-one private messaging within a group chat channel this disclosure addresses a common problem of reply-to-all clutter while retaining context and continuity (place, time, meaning), and the flow of the conversation for each unique user. Further, by integrating a system of identifying and grouping together past messages from within a channel and even allowing those messages to be combined with other past messages from other channels, this disclosure addresses the problem of discussion archival and retrieval and by further still integrating actionable objects such as "Tasks", "Ideas", "Events", "Surveys", etc., into the system. This allows messages (e.g., chat messages) to be "typed" making them organized, searchable, referenceable, context oriented and actionable thereby enhancing communications, saving time and increasing productivity of users. The elements of this disclosure provide additional advantages that are further enhanced when the elements are combined and integrated together making possible a comprehensive and dynamic system of record. In some implementations, the disclosure can be implemented in accordance with numerous aspects consistent with the techniques presented herein.

Several Definitions May be Helpful:

User—an entity (person, participant, organization, computer, algorithm, etc.) that plays a role in having a message displayed in a channel (e.g. communications channel) The user may not necessarily be what directly caused the message to be displayed, but may have a more indirect influence on causing the message to be displayed. The user, for example, may not necessarily be a member of a network or a channel in which messages are posted on the user's behalf. Thus, while a user may play some role in a message being posted to a channel, the user may not have access to that channel, i.e. the user may not be able to see messages in a channel (the user's messages or other channel participant's messages).

Select/Selectable—Some form of [automated or physical] interaction with a display. Examples include: click, hover, movement, biometrics, touch sensitivity, voice, brainwaves (e.g. brain/machine interface), etc.

Channel—a physical or virtual computer environment in which posting or exchange of messages is permitted (and may occur) between one or more participants that are authorized to exchange messages; and prevention of exchange of messages occurs between one or more participants that are not authorized to exchange messages. Messages within a channel may be displayed in a continuous stream. The messages may be displayed in the stream in chronological order. In one exemplary embodiment, when a new message is received in a channel, the message is displayed at the bottom of the stream of previously displayed messages, and the previously displayed messages are automatically scrolled upwards to make room for display of the new message. In addition, the oldest message (or portion thereof) that was previously displayed is scrolled "off" the display. In one embodiment this means that the display of actual text of the new message occurs below the display of actual text of previously displayed messages. There may be one or more channels in use with respectively different "permissions" for access thereto for respectively different users. In one embodiment, only one channel (or portion thereof) is displayed at a time. In another embodiment, multiple channels (or portions thereof) are displayed at a time.

In one or more exemplary embodiments of the present invention, various possible attributes of a channel may be relevant:

Channels are generally named and are formed to serve the purpose of facilitating and encapsulate conversation [often] associated with a particular topic, group or location or goal. Even a channel named "General" is instructive as to the channels purpose.

Channels may have specific attributes associated with them, e.g., a channel member may be sent notifications when certain conditions are met, such as, when that user is specifically mentioned in a message post, or if a particular key word is posted.

In some systems channels can be configured to appear more or less prominently (i.e., "Favorited" or hidden. In some systems, channels can be "muted" (no notifications sent).

Channels can be public (anyone can join) or private (by invitation or other means of limiting access)

In some case, channels can be configured by one or more administrators, which can result in the allowance or limitation of certain functionality and user permissions.

In some systems, channel names or other identifying attributes are altered to inform or to encourage a user action. A bold channel name for example may serve to indicate that new message activity in the channel has occurred. A red bubble with a number next to a channel name may serve to indicate that a certain number of messages of particular relevance to the particular user have been posted.

Channels can be implemented in such a way as to contain or restrict conversation to a select group of users. The restriction could be in terms of a finite period of time (e.g., Q1 sales goals channel), group (e.g., Sales team), location (e.g., Philadelphia office), or topic (Suggestions channel)

Channels can be implemented in such a way as to encourage discourse about a certain topic (Diversity channel)

In some implementations Channels may be configured to hide the identity of participants (anonymous channel) or to reveal and associate comments with users.

In some implementations Channels are configured in such a way so that all posts are visible to all of the channel members.

The above attributes are merely exemplary and are provided for illustrative purposes only.

Message—a discreet quantity of data that is sent between one or more users. The data may be of any type, including, audio, video, text, code, etc. A message may include attachments to additional data or resources such as files and/or may include links to, for example, one or more URLs (Uniform Resource Locator) or some form of executable code (e.g. IoT control of a device such as a garage door opener).

Although implementations of the disclosure may be particularly beneficial in certain types of communication platforms (e.g., chat room communications), other types of communication platforms can be utilized in conjunction with the disclosure. For example, some of these communication platforms may include platforms for text messages, short message services (SMS), e-mails and other types of similar on-line communication platforms for facilitating information exchanges between client devices of a plurality of participants.

In the following description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to a system for performing the operations herein. This system may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

In some implementations, the computer program product, or software may include a non-transitory machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

In one implementation, the computer program product may be installed and/or a service may be selected from a cloud-computing environment in order to obtain the benefits of the techniques described herein. In an implementation, the computer program product may be downloaded onto a client device. For example, a participant may elect to download the computer program product from a service associated with an online server. The client device may transmit a request for the computer program product over a network and, in response, receive the computer program product from the service. The computer program product may be installed locally on the client device or stored at the service and may be accessed through the client device, for example, via a mobile web browser.

I. Example Systems

FIG. 1 is a block diagram illustrating a system 100 in which implementations of the disclosure may operate. In some implementations, the system 100 may facilitate the transfer of electronic communications between computing devices of two or more users or participants over a communication network. The system 100 can include one or more servers (e.g. server device 140), which provide access or a communication link between a plurality of client devices (e.g., client devices 110, 120 and 130) in order to facilitate communication between two or more client devices.

As shown in FIG. 1, the system 100 may include a plurality of client computing devices, such as client devices 110, 120 and 130, coupled to network 195, and one or more server computing devices, such as server device 140, capable of communicating with the client computing devices 110, 120 and 130 over the network 195. In some implementations, the network 195 may be a private network (e.g., a local area network (LAN), Wi-Fi, Bluetooth, Radio Frequency), a wide area network (WAN), intranet, etc.), or a public network (e.g., the Internet).

Server device 140 may be at one node of network 195 and capable of directly and indirectly communicating with other nodes of the network 195. For example, the server device 140 may include a web server that may be capable of communicating with client devices 110, 120 and 130 via network 195 such that it uses the network 195 to transmit and display information to a participant on a display associated with client devices. In some implementations, the server device 140 may also include a plurality of computers that exchange information with different nodes of a network for the purpose of receiving, processing and transmitting data to the client devices 110, 120 and 130.

Referring to FIG. 1, the computing devices of system 100, such as client device 110, may include one or more I/O (input/output) devices 111, processors 112, memory 114, and other components typically present in general purpose computers. "Processor" or "Processing device" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 112 is depicted in FIG. 1, in some other implementations computer system 100 may comprise a plurality of processors. Similarly, in some other implementations computer system 100 may comprise a plurality of I/O devices, rather than a single I/O device 111.

Instructions 116 of the client device 110 may be a set of instructions to be executed directly (such as machine code) or indirectly (such as scripts) by the processor 112. In that regard, the terms "instructions," "steps" and "programs"

may be used interchangeably herein. The instructions 116 may be stored in object code format for direct processing by the processors 112, or in another computer language including scripts or collections of independent source code modules that are interpreted on demand or compiled in advance.

Data 118 may be retrieved, stored or modified by processors 112 in accordance with the instructions 116. For instance, although the present disclosure is not limited by a particular data structure, the data 118 may be stored in computer registers, in a relational database as a table having a plurality of different fields and records, XML documents, or flat files. The data 118 may also be formatted in a computer-readable format such as, but not limited to, binary values, ASCII or Unicode. By further way of example only, the data 118 may comprise information sufficient to identify the relevant information, such as numbers, descriptive text, proprietary codes, pointers, references to data stored in memory or information that is used by a function to calculate the relevant data. For example, the data 118 may include actionable objects 115 that may identify user perceivable action that can be included in a chat session.

Each of the actionable objects 115 may comprise an adjustable data structure (e.g., a memory array) comprising a plurality of fields that characterize a type category to associate with a chat message. By incorporating the actionable objects 115 into the creation of the chat messages, the system 100 is able to ascribe a value "type" to each message. In one implementation, when one or more actionable objects 115 are added or inserted into a chat message of the chat session, the actionable object executes a series of steps to be performed by a corresponding user perceivable action. The series of steps can be preprogrammed or variable based on the context of the type category for that action.

In some implementations, each client device may include an application 117 to facilitate different types of electronic communications between each client device and one or more other client devices via network 195, including providing interactive interface portals 118 for facilitating various operating functions of the disclosure. In one implementation, the application 117 may be installed and/or a service may be selected in order to obtain the benefits of the techniques described herein. In an implementation, the application 117 may be downloaded onto the client device 110. For example, a participant may elect to download the application from a service associated with an online server. The client device 110 may transmit a request for the application 117 over network 195 and, in response, receive the application 117 from the service.

The application 117 may be installed locally on the client device 110. Alternatively, the application 117 can be stored at the service and may be accessed through the client device 110, for example, via a mobile web browser. By using the application 117, the client device 110 may integrate into a chat session user perceivable actionable objects, such as actionable objects 115, which can be executed by the client device 110 to enhance communications between participants of that session. In an alternative implementation, the application 117 may be a firmware embedded in communication device.

As shown in FIG. 1, the instructions 116 may include an interface portal 118 for displaying network data and to allow a participant associated with the client device 110 to interactively navigate over the display of data. The interface portal 118 provides for the display of network content, such as chat messages of a chat session or any other type of network data, to an I/O device 111 (e.g., a touch screen display) of the client device 110 by sending and receiving data across the network 195. The network data may be received in response to a transmitted chat message that includes one or more actions objects 115.

To facilitate integrating actionable objects into a chat session, the instructions 116 of the client device 110 may include actionable object integration module 119. The actionable object integration module 119 may generate and transmit user perceivable actionable objects in a chat session that can be executed by the client devices of system 100. The functionality of the module 119 can exist in a fewer or greater number of modules than what is shown, with such modules residing at one or more computing devices, which may be geographically dispersed. The systems may be operable in conjunction with components of the client device 110 from which it may receive chat message related data and other relevant information regarding the device 110.

Figure 2:
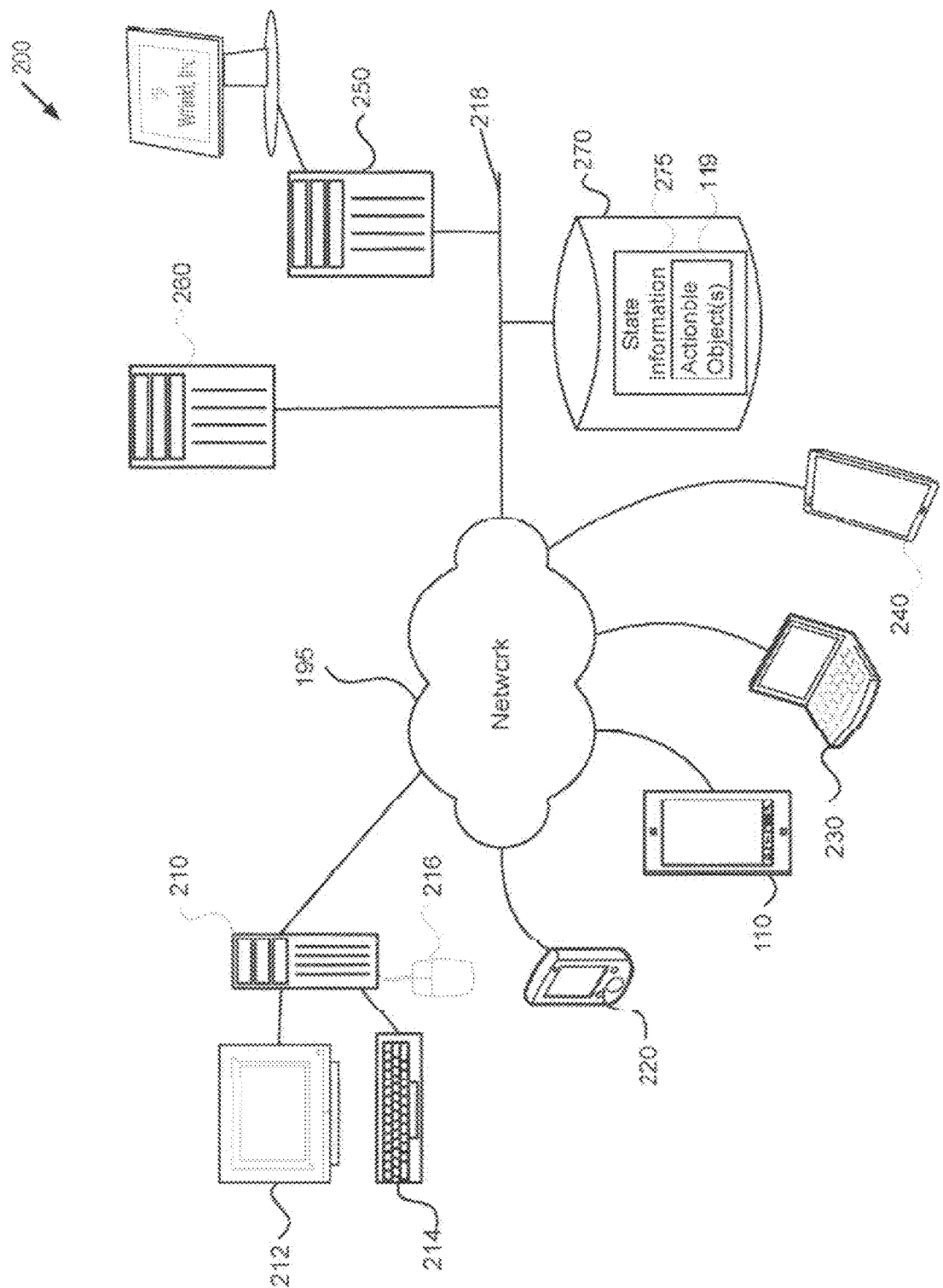
FIG. 2 is a pictorial diagram of a system including a plurality of client devices in accordance with aspects of the disclosure.

FIG. 2 is a pictorial diagram of a system 200 including a plurality of computing devices in accordance with aspects of the disclosure. In some implementations of system 200 two or more computing devices (e.g., participant/client devices) may engage in an electronic communication session (e.g., chat session) with each other. In some implementations, a first participant/client device may engage in a chat session with a second participant/client device via a network 195. As shown, FIG. 2 illustrates network 195 having a plurality of computing devices, such as client device 110, and other types of computing devices, a base station 210, a personal data assistant (PDA) 220, a laptop/netbook 230 and a tablet 240 as well as computing server devices 250 and 260 (e.g., computing devices that can be located at a number of different receiving stations). The various devices may be interconnected via a network or direct connection 218 and/or may be coupled via a communications network 195 (e.g., a LAN, WAN, the Internet, etc. that may be wired or wireless). In some implementations, the computing devices may communicate with each other before accessing the communication network 195.

Each device may include, for example, user input devices such as a keyboard 214 and mouse 216 and/or various other types of input devices such as pen-inputs, joysticks, buttons, touch screens, etc., as well as a display, which could include, for instance, a CRT, LCD, plasma screen monitor, TV, projector, touch screen, etc. Each device may be a personal computer, application server, etc. By way of example only, computing device 110 may be a mobile phone while computing device 260 may be a server. Databases, such as database 270, may be accessible to one or more of the computing devices or other devices of system 200. The database 270 may comprise data, such as state information 275, associated a chat session implemented on the client devices as well as store chat messages transmitted via system 200.

In one implementation, a resource associated with the system 200 may be used to maintain a consistency of the state information 275 and in such cases when there is a system failure. This is so that the chat session can continue uninterrupted without losing chat participant details. For example, a state manager (not shown) may maintain and transfer the state information 275 to state backup storage (not shown) for later retrieval. State backup storage may be accessible by any of the computing devices of system 200 via network connection 218 so that the chat session between the participants may be rerouted while the state information 275 is maintained, if a computing device of system 200 fails.

In some implementations, the state information 275 may correspond to a chat session between participants associated with the client devices of system 200. In some implementations, the state information 275 may be stored in database 270 by the state manager running on the server device 260 and/or the client devices or some combination thereof. In one implementation, the state information 275 may include, for example, information regarding the identity of participants of the chat session, the number of chat participants, actionable objects 119 that are applied to the chat session, a unique identifier associated with each of the action objects 119 and/or the chat message or session, and an order in which chat messages are received as well as other relevant information. When an actionable object 119 is applied in a particular chat session, the state information 275 for that session may be updated in accordance with the user perceivable action associated with the actionable object 119. This updating of the state information 275 in accordance with the actionable object 119 applied therein is further discussed below with respect to various interactive interfaces of the disclosure.

II. Example Interactive Interfaces

Embodiments of the disclosure provide actionable functionality to the contents of chat messages to distill and extract central elements of a single, one-to-one or group chat conversation. A participant of the chat sessions may be provided with a variety of different interactive interfaces to facilitate the transfer of an electronic communications between participants in a chat session. In some implementations, the interfaces allow the participants to integrate actionable objects, such as actionable objects 119 into the chat session to enhance the electronic communications between the participants. The interfaces may be flexibly configured to include various types of buttons, cursors, and tools as well as formatted content on a display on a client device. In one implementation, an application, such as application 117 of FIG. 1, on the client device of the participant may present the participant with a graphical user interface (GUI) that allows the participant to direct messages comprising the actionable objects 119 to other selected participants of the chat session.

Figure 3:
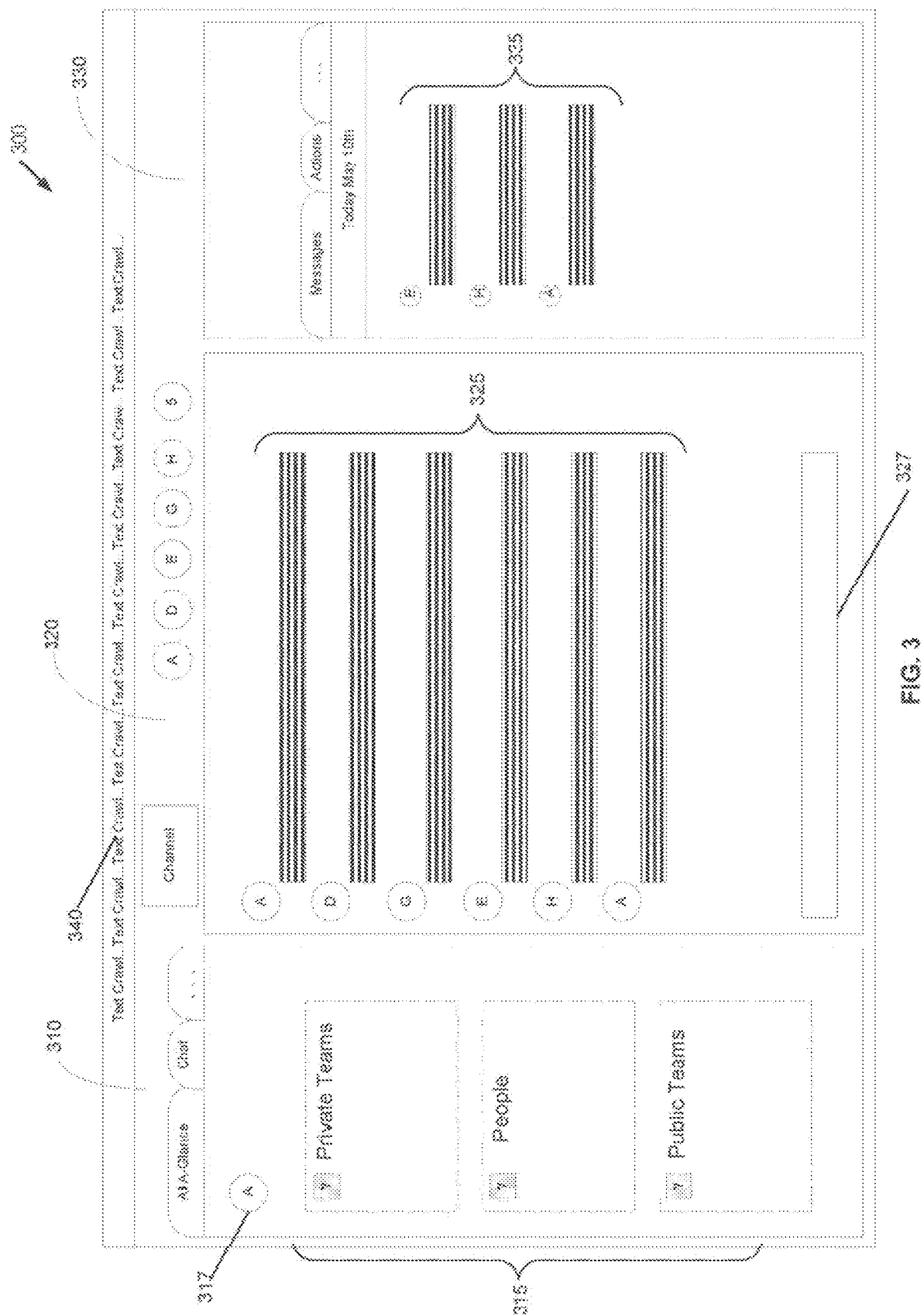
FIG. 3 is an example of a landing interface portal of a client device in accordance with aspects of the disclosure.

With regards to FIG. 3, an example of a landing interface portal 300 of a client device is shown. In some implementations, the landing interface portal 300 may correspond to the interface portal 118 in system 100 of FIG. 1. The landing interface portal 300 provides an example interface in which a chat messaging session can be engaged by a number of participants that are represented by the participant icons A-H on the portal 300. In some implementations, the interface portal 300 may include several panels that include a channel/dialog panel 310, a message window panel 320 and a side panel 330. The channel/dialog panel 310 displays the different chat session groups 315 that a particular participant 317 has joined. The message window panel 320 displays the chat messages 325 exchanged by the participants. In some implementations, the message window panel 320 also includes a count of the current participants 323 and a text entry region 327 that allows the participants to insert and reformat the text (i.e., bold, italics, color), add a link (hypertext link) or file, or insert an actionable object or bundle communications into a chat session. The side panel 330 can be adjusted to dynamically display elements regarding various messages or groups of messages 335 and other information to the actionable objects as disclosed herein.

Each message that is entered into the text entry region 327 is displayed in the message window panel 320. In some implementations, the messages 325 can be flagged or marked (for example, by color) to isolate the message for later use. An advantage of marking individual messages is that it provides participants with a way to indicate, highlight or associate messages, for current use or future recall for themselves or others.

In some implementations, the interface portal 300 provides context relevant searching to display messages that match an inputted search criterion while simultaneously affording the search originator necessary message context. In one example, the participant taps on a control associated to a particular message in the message window 320 to bring up a palette of color tags. One or more colors may be used to tag the message. The user can select, add, delete and name colors in user settings. In some implementations, the search criterion can be typed, tapped, moved, imported, loaded from a saved file, written, spoken (entered by any known means) through the interface portal 300. The search criterion can be a single or combination of and/or Boolean search term (word, #tag, name, color, texture), color tags that may be defined and/or reserved. In one implementation, the context relevant searching allows for the discovery of messages that come before and after the "found" instances ("context") to enhance search results. For example, when a User selects a found message, the message is displayed (for example, in the side panel 330) with messages that came immediately before and immediately after that message.

In some implementations, from time to time a user may wish to initiate or continue a dialog/thread/conversation with another member and may want to quickly identify all of the "mutual" chats/conversations, that is, chats they have in common with the other person. Quickly ascertaining mutual chats can save time and frustration for chat participants. In accordance with the present disclosure, a user can ascertain mutual chats, which allows the user to switch between chat groups, dialogs, threads or conversations. For example, the user can activate a control on a particular message in the message window 320 that in turn displays a list of "mutual" dialogs/conversations (e.g., in the side panel 330.) User can then select any dialog from the list to immediately switch to that conversation to be displayed in the message window 320.

In some implementations, the interface portal includes a text crawl region 340 where messages sent to one or more intended recipients are displayed. The text crawl region 340 may contain text, graphics, sounds or recorded messages (or any combination thereof). The text crawl region 340 can be placed, sized and/or moved to call attention or notice to the participants of the messages. For example, the text crawl region 340 may be enlarged, shrunken, hidden, tagged, named, saved, deleted, forwarded, edited, or remain a static size, random size or variable. Text and/or graphics the text crawl region 340 of the can appear in any color or combination of colors.

Users may have the option of defining the types and conditions under which they will accept, view or have the text crawl region 340 visible to them. A text crawl may be accompanied by a sound or vibration. Associated sounds can be varied depending upon the context and/or content and/or originator of the crawl. Some crawl message can be generated as a result of a subscription, membership or affiliation (e.g., based on defined criteria and linked to a social media account, feed or the like). Text crawl messages may also be automatically generated based upon certain criteria being met such as, for example, a location or proximity to a person, place, thing or an event, date or time. The crawl can be spawned by other third party applications as a result of a search being performed, an inquiry made or a purchase being made. In some implementations, text crawl can be a reminder, an alert, a message, an advertisement, an award, a receipt, a ticket, or other indication. A hypertext or other link can be embedded in the text crawl region 340. By moving a mouse cursor on the text crawl region 340 or selecting a particular message in the region 340 more information relating to the text crawl may be revealed and acted upon.

In some implementations, the text crawl may include a listing of text that meets a search criterion. For example, when by interacting with the text crawl region 340 (e.g., with a mouse cursor), the search criterion may automatically include all messages/objects that are tagged as "Crawl" objects. In one implementation, the search may be further refined to include text crawl messages that are included in the dialog chat messages between participants. Initially, the text crawl region 340 may display messages from a particular work group (e.g., that is subscribed to, accepted or originated by a current user to public or social or unknown users). Users may turn on or turn off the text crawl region 340 and can further set parameters such as (but not limited to) the type of crawls the user is willing to accept to be displayed in the text crawl region 340

In some implementations, crawl "objects" are tagged and can be linked to a single dialog or more than one dialog in the chat message panel 320. The crawl objects can be sent to one or more recipients, such as registered and non-registered participant. Some participant may receive a notification of the crawl object through mechanisms other than the interface portal 300, for example, email, text message or other mechanism. A link may be provided in the notification directing the participant to activate the crawl object. If the email or chat software of the recipient is capable with the interface portal 300, the crawl message may be displayed from within the recipient's email or chat service.

In some implementations, the creator of the crawl message may have the option to name the crawl message. The color of the text may be selected and can vary from character to character. The crawl message creator may choose to animate the text (e.g., text flashing). When receiving a crawl notification for the first time, the recipient may be prompted to with several options, such as to "Accept Crawls from the Sender Once, Reject Crawls from the Sender Once, Always accept Crawls from the Sender or Never accept crawls from the Sender." The settings for the text crawl region 340 of interface portal 300 regarding crawl notifications may be set and later modified by the recipient.

III. Chat with Actionable Objects

FIGS. 4A-4E are examples illustrating an interactive interface portal 400. For example, the interface portal 400 may correspond to interface portal 118 of system 100 in FIG. 1. Interface portal 400 may be compared to interface portal 300 of FIG. 3. For example, the interface portal 400 includes several panels that include a channel/dialog panel 410 (which may be compared to channel/dialog panel 410, a message window panel 420 (which may be compared to message window panel 420) and a side panel 430 (which may be compared to side panel 330). The interface portal 400 provides an example interface in which a chat messaging session can be engaged by a number of participants that are represented by the participant icons A-H on the portal 400. In this example, the interface portal 400 allows participants to integrate user perceivable actionable objects in a chat session channel 425, which can be executed by a client device to enhance communications between participants of the session channel 425. In some aspects, by integrating actionable object such as "Tasks", "Ideas", "Events", "Tokens", "Surveys", etc., into chat channels, it allows messages (e.g., chat messages) to be organized, searchable, referenceable and context oriented to enhance communications and increase productivity of users.

Figure 4A:
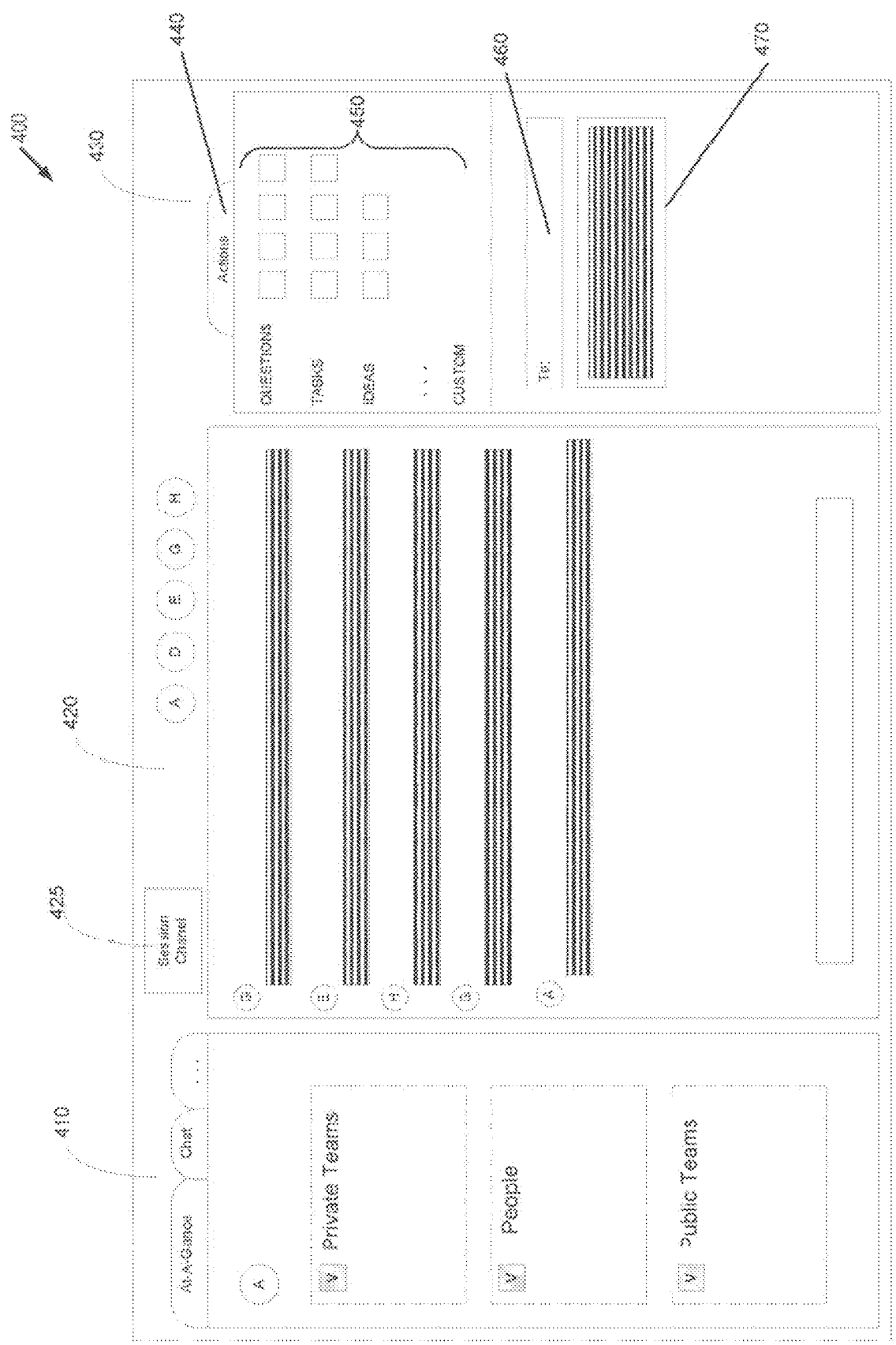
FIGS. 4A-4E are examples illustrating an interactive interface portal in accordance with aspects of the disclosure.

In some implementations, a control (e.g., a window tab) on the portal 400 may be activated to display a listing of actionable objects 440 that can be utilized. For example, as shown in FIG. 4A, the listing of actionable objects 440 can be display in the side panel 430 of the interface portal 400. Each actionable object 440 corresponds to a data structure, such as actionable object 115, which may include a type category indicator to characterize a user perceivable action associated with the actionable object. For example, the type categories may include, but are not limited to, a question indicator, a task indicator or an idea indicator, a finance indicator, a tokens indicator, a custom category indicator and various of type of indicators associated with a work group or participants of a chat session. When one or more of the actionable objects 440 are added or inserted into a chat message of the chat session, the actionable object executes a series of steps to be performed by a client device executing a corresponding user perceivable action. The series of steps can be preprogrammed or variable based on the context of the type category for that action.

Each actionable object 440 is associated with one or more data structures that provide enhanced functionality to chat communications. In some implementations, a user may select an icon, such as one of icons 450, associated with an actionable object to insert into the chat session. An advantage of inserting the actionable object 440 into chat messages is that it provides the basis of order and structure to the chat session to provide an interactive presentment of messaging activity. In some implementations, the actionable object 440 can be selected using various mechanisms, such as such as keyboard shortcuts.

Responsive to the selection an actionable object to insert into a chat session, at least one participant of a plurality of participants may be associated with the actionable object. For example, a user may add one or more participants to a dialog box 460 of the interface portal 400. The association indicates that the actionable object is directed to the identified participants, which may be presented on the participant's client device when the actionable object is transmitted, for example, by using network 195. In one implementation, the interface portal 400 provides a text input section 470 that may be used to add additional information 470 regarding the user perceivable action to be executed in accordance with the selected actionable object.

When a participant, via the interface portal 400, creates and sends a communication including the actionable object to the client device of a receiving participant, the receiving participant receives the communication (e.g., in the form of an actionable object control) in the chat session in which the participants are currently engaged. The application, such as application 117 of the receiving client device acts to initiate or enable the actionable object at the receiving participant end by executing the user perceivable action associated with the object. In this regard, the sending participant by sending the actionable object is requesting to escalate the chat session to a more content enriched form of communication. A recipient participant can activate the actionable object control or activate a communication session at the recipient client device in accordance with the user perceivable action of the actionable objects 440.

In some implementations, the actionable objects 440 may be used in combination. For example, the interface portal 400 may receive a selection of additional actionable objects from the plurality of actionable objects and combine these additional actionable objects with the actionable object in the chat session. The combination may change the characteristics of the user perceivable action to be performed based on a relative order of the inserted actionable objects 440 and other actionable objects 440 appearing elsewhere in the message flow of the chat session.

In one example, the interface portal 400 may detect the presence of two or more task type actionable objects, separated by three question type actionable objects. In this example, the order and/or grouping of the actions performed by the client device with regards to the questions may be adjusted. For example, the interface portal 400 may detect that one question objection has been inserted, which causes the portal 400 to prompt the user for further information. In some implementations, the presentation, input, characterization, appearance, or non-appearance of the actionable objects can vary based on the combination (or absence of) various actionable objects in a specific chat messages and/or chat session.

A. Question Objects

Figure 4B:
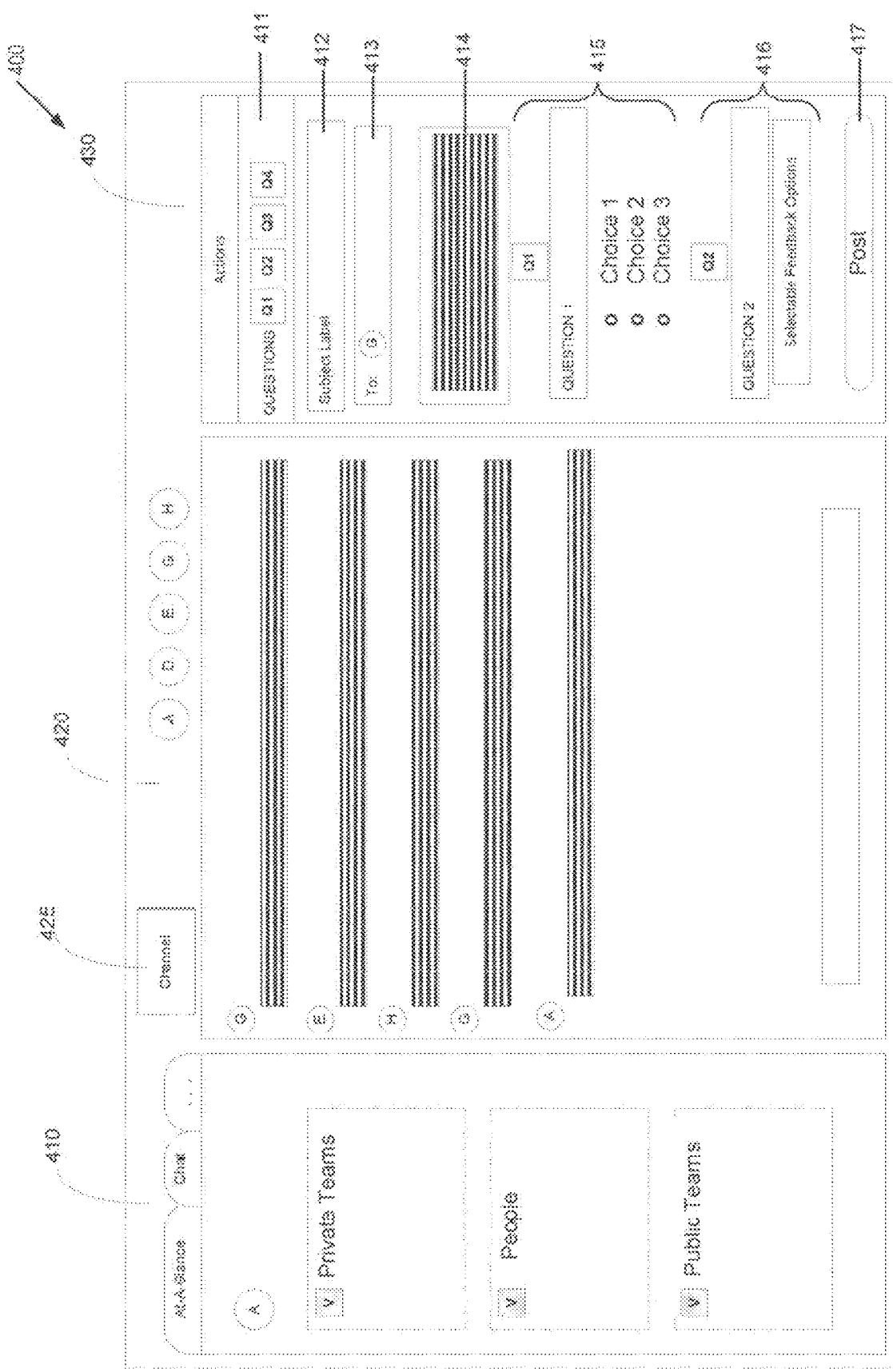

Turning to FIG. 4B another view of the interactive interface portal 400 is shown. In this example, if the user selects the question actionable object, the interface 400 may adjust the side panel 430 to provide characteristics relating to a specific type of survey question. For example, the user seeks to add a question to their message to poll for responses from other participants to a chat session in a particular form. When the sending participant initiates this actionable object, several fields are displayed in the side panel 430 in which the sending participant can characterize certain aspects of the question actionable object. As shown in FIG. 4B merely as an illustrative example, these fields may include, a plurality of control objects 411 to select a particular question for the chat session, a label field 412, a recipient field 413 to add particular recipients, a message field 414 as well as other relevant fields regarding the polling question.

In some implementations, the plurality of control objects 411 allows the sending participant to select a combination of different polling questions to provide to the chat session. In one implementation, the particular questions may be displayed in a questions region, such as questions region 415 and 416, of the side panel 430 for further adjusts by the sending participants. Although only two question regions are shown in FIG. 4B, the interface portal 400 may include a number of additional questions regions for configuring polling questions in the side panel 430.

In some implementations, these polling question actionable objects may include, but not limited to, 1) a multiple/single choice object, 2) a ranking object, 3) a slider object, and 4) a narrative response, etc. If the multiple/single choice object is selected, this object provides one or more customizable fields. This object also allows the sending participants to upload, via the interface portal 400, a media or other file which is associated with the specific choice, such as choice 1 2 or 3 in questions region 415, which can be presented with the polling question. If the ranking object is selected, this object inserts or references a polling question into the side panel 430 along with inputted configuration settings on how the chat session is to display, categorize, and associate this polling question with regards to other polling questions in the chat session.

If the slider object is selected, the object inserts or references a polling question into the side panel 430 along with pull-down menu options (as shown in questions region 416) to allow the individual to customize selectable feedback options. For example, the selectable feedback options may include a determined list of slider attributes to allow the sending participant to customize the slider left, center and right attributes (e.g., Strongly Agree, Neither Agree nor Disagree or Strongly agree) to correspond with responses from the receiving participant. It should be noted that this is merely a few examples as other polling questions and question settings can be customized by the sending participant. An advantage of providing a slider object that can be incorporated into the chat session is that the responses can be structured and also viewed numerically (e.g., with reference to a specific position along a slider) as opposed to receiving unstructured narrative responses from the receiving participants that may be difficult to interpret.

In some implementations, the question actionable object can be associated or assigned to one or more receiving participants. For example, information regarding the receiving participants may be inserted into recipient field 413. In one implementation, the sending participant may send the question actionable objects to receiving participants in the chat session by activating a control 417 on the interface portal 400. In some implementations, the receiving participants of the polling question can include members and non-members of the chat session, or another team or participant in the chat system that is not in the chat session. In one implementation, non-members may be notified by through an electronic transmission, such as email that a polling question is waiting. A link may be provided in the email notification directing the non-member to move into a browser to view/participate in the polling question. In addition to being notified that a polling question is waiting, the non-member may be provided with other information regarding the polling question, such the identity of the sending participant. The link to the polling question may remain active until a determined period of time, such as an expiration date for the polling questions set by the sending participant.

Once the fields of the selected polling question actionable objects in the side panel 430 are completed, the sending participants may preview the objects before submitting them to the chat session. The polling question actionable objects are then embedded in the chat message as a "structured" data object that can be executed by the client device of a receiving participant. In some implementations, the objects of the side panel 430 can be associated or assigned to one or more receiving participants. For example, information regarding the receiving participants may be inserted into recipient field 413. In one implementation, the sending participant may send the polling question actionable object to receiving participant in the chat session by activating a control 417 on the interface portal 400. In some implementations, the receiving participants may configure certain preferences regarding receiving polling question actionable objects, such as a type of polling questions the participant is willing to accept, a minimum compensation for accepting and/or answering the polling questions, etc.

Responses to the polling questions by members as well as non-members are made available to the sending participants and other authorized members of the chat session. The sending participant may choose whether to make the results available to a respondent immediately after the respondent responds to the polling questions or only once the expiration date and time has passed. In some situations, the sending participants can reward the receiving participants with recognition points or other type of tokens that will be discussed later in the disclosure.

Figure 4C:
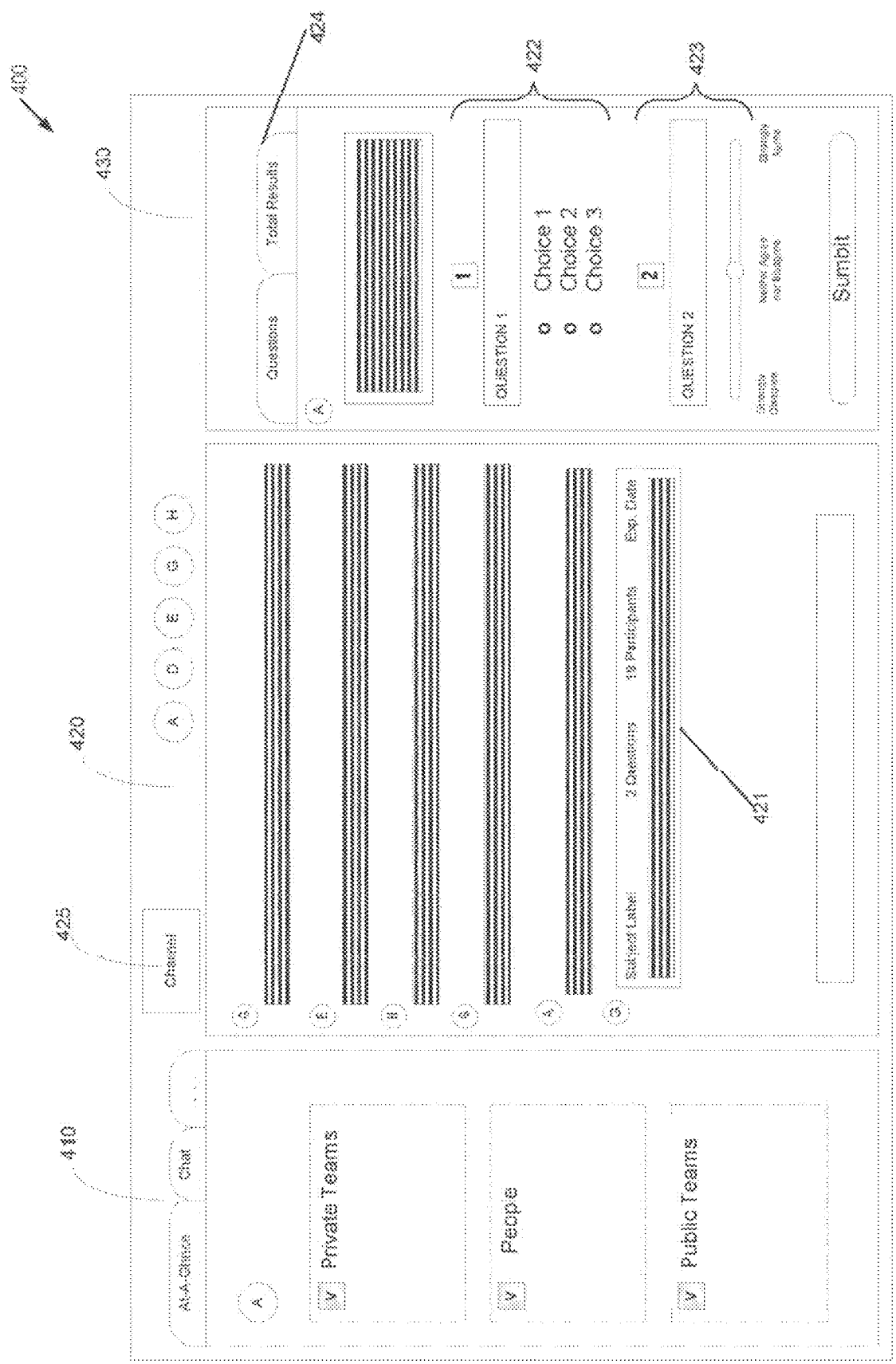

In FIG. 4C, another view of the interactive interface portal 400 is shown. In this example, a receiving participant in the chat session may receive a control object 421 that can be activated to display the polling questions, participant information, expiration dates, etc., and be provided with the options for responding. In some implementations, the control object may be highlighted with version colors to indicate that the polling questions are reaching an expiration date in which responses can be received. The receiving participant may selectively execute (e.g., by clicking on the object on the display) the control object 421 to view and respond to the polling questions. In some implementations, the side panel 430 may display in a polling region, such as polling regions 422 and 423, the polling questions and options for the recipient to respond. In alternative implementations, the polling questions and options may be included in the main window 420 of the interface portal along with messages in the chat session. When a determined number of the receiving participants have responded, the sending participant may receive the results, for example, as a message within the same chat session, in a results section 424 of the side panel 430. These results of the polling question can also be shared with the other participants.

B. Task Objects

Figure 4D:
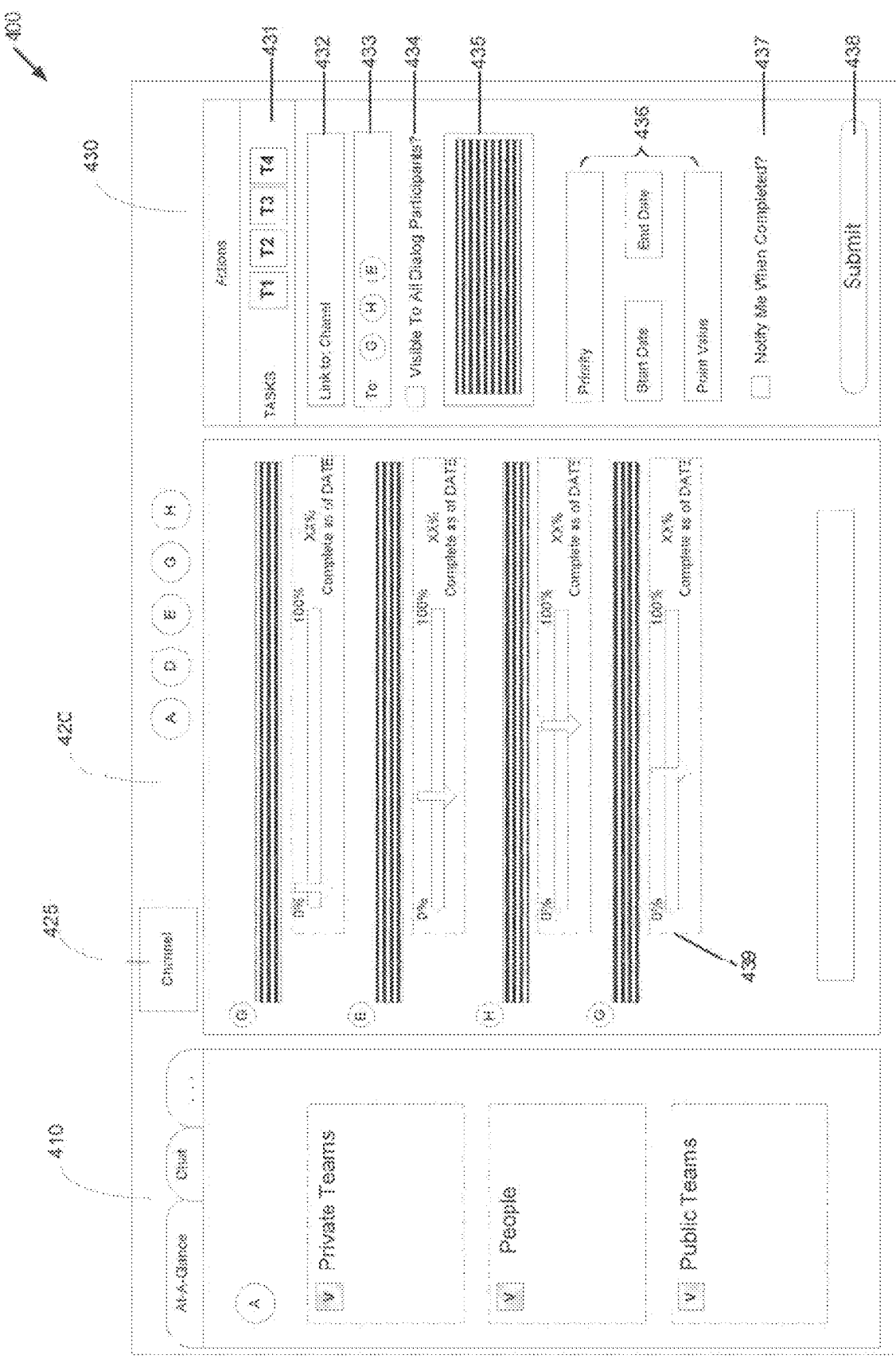

In FIG. 4D, another view of the interactive interface portal 400 is shown. In this example, if the user selects the tasks actionable object, the interface 400 may adjust the side panel 430 to provide characteristics relating to a specific type of tasks for participants of the chat session. For example, the participants may be part of a work group and the sending participant seeks information to manage the process of the work group. When the sending participant initiates this actionable object, several fields are displayed in the side panel 430 in which the sending participant can characterize certain aspects of the tasks actionable object.

As shown in FIG. 4D merely as an illustrative example, these fields may include a plurality of control objects 431 to select a particular task for the chat session, a channel field 432 to identify a channel identifier selected by the sending participant, a recipient field 433 to add particular recipients, a visibility field 434 to indicate whether the assigned task are made visible to other participants, a message field 435, task entry fields 436 to enter relevant information regarding the assigned task, a notification field 437 to indicate that the sending participant is to be notified when the task is completed as well as other relevant fields regarding the process of the work group. In some implementation, some participants may be able to setup preferences regarding tasks received. These other relevant fields may include, but not limited to, estimated time to complete a task, requisite qualifications, minimum compensation for accepting, etc.

Once the task entry fields 436 are completed, the sending participants may preview the task before submitting the tasks actionable object 431 to the chat session. The tasks actionable object is then embedded in the chat message as a "structured" data object that can be executed by the client device of a receiving participant. In some implementations, the tasks actionable object 431 can be associated or assigned to one or more receiving participants. For example, information regarding the receiving participants may be inserted into recipient field 433. In one implementation, the sending participant may send the tasks actionable object 431 to receiving participant in the chat session by activating a control 438 on the interface portal 400. In some implementations, the receiving participants may configure certain preferences regarding receiving task actionable objects, such as a type of task the participant is willing to accept, a minimum compensation for accepting the task, etc.

In some implementations, the receiving participants can include members and non-members of the chat session, or another team or participant in the chat system that is not in the chat session. In one implementation, non-members may be notified by through an electronic transmission, such as email that a task is waiting. A link may be provided in the email notification directing the non-member to move into a browser to view the task. In addition to being notified that a task is waiting, the non-member may be provided with other information regarding the task, such the identity of the sending participant.

In some implementations, a control object 439 (e.g., a slider display object) to control an input of response information is inserted into the chat session related to the actionable object executed on the client device of the participants. If an individual task is assigned to more than one participant than multiple control objects, such as slider object 439, may be displayed indicating the progress (% completed) of that corresponding participant. The control objects are adjustable only by the intended participant. In some implementations, the "Task" percent complete along with the date that the slider is last updated is shown in the control object. For example, a task 50% complete on a date that was 4 days prior to the current date may indicate something different than a note from the participant indicating that the task was 50% complete as of the current date. In some implementations, slider object 439 may appear in a certain color and can be adjusted by the receiving participant in accordance with a process status of the task, such as Green, Yellow and Red.

C. Idea Objects

Figure 4E:
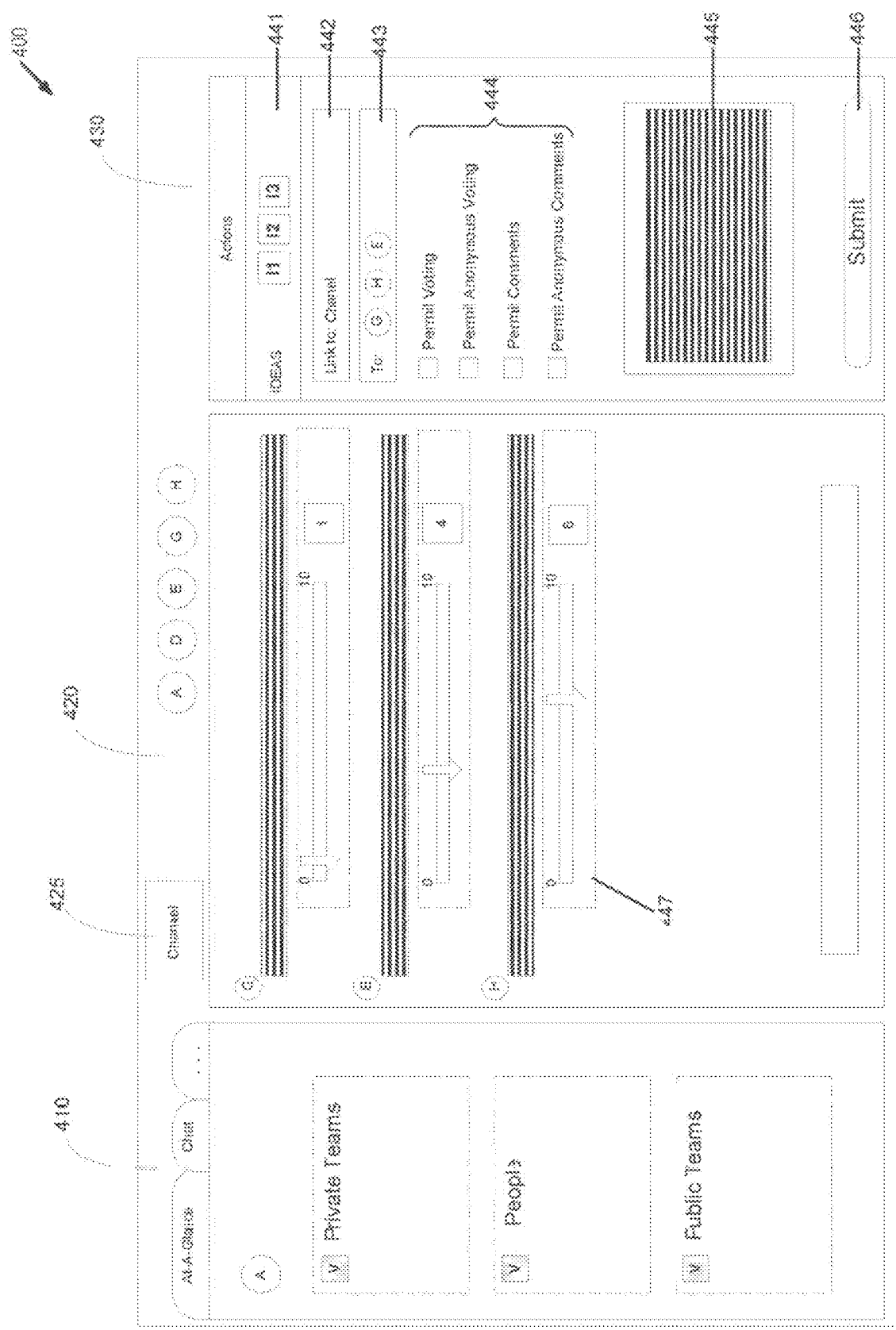

With regards to FIG. 4E, another view of the interactive interface portal 400 is shown. In this example, if the user selects the idea actionable object, the interface 400 may adjust the side panel 430 to provide characteristics relating to a specific type of input for an idea actionable object to include in the chat session. For example, the participants may be part of a work group and the sending participant wants to propose an idea to the work group. When the sending participant initiates this actionable object, several fields are displayed in the side panel 430 in which the sending participant can characterize certain aspects of the idea actionable object.

As shown in FIG. 4E, merely as an illustrative example, these fields may include a plurality of control objects 441 to select a particular idea type for the chat session, a channel field 442 to identify a channel identifier selected by the sending participant, a recipient field 443 to add particular recipients, idea entry fields 444 to provide for certain responses to the idea, a message field 445 to provide idea details as well as other possible fields. The idea actionable object can be embedded in the chat message as a "structured" data object that can be executed by the client device of a receiving participant. In some implementations, the idea actionable object 441 can be associated or assigned to one or more receiving participants. For example, information regarding the receiving participants may be inserted into recipient field 443. In one implementation, the sending participant may send the idea actionable object 441 to receiving participant in the chat session by activating a control 446 on the interface portal 400.

In some implementations, the receiving participants can include members and non-members of the chat session, or another team or participant in the chat system that is not in the chat session. In one implementation, non-members may be notified by through an electronic transmission, such as email that a task is waiting. A link may be provided in the email notification directing the non-member to move into a browser to view the task. In addition to being notified that a task is waiting, the non-member may be provided with other information regarding the task, such the identity of the sending participant.

In some implementations, a control object 447 (e.g., a slider display object) to control an input of response information into the chat session related to the actionable object executed on the client device of the participants. If an individual idea is assigned to more than one participant then multiple control objects, such as slider object 439, may be displayed. The control objects are adjustable only by the intended participant. In some implementations, the slider can be updated to provide a uniform numerical response for the participant rather that unstructured data. In some implementations, the interface portal 500 may provide an indicator (e.g., a display icon) of a total number of respondents to the idea as well as an average score of all responses received based on the control objects 447 associated with each receiving participant.

IV. Other Example Interactive Interfaces

FIGS. 5A-5D are examples illustrating an interactive interface portal 500. For example, the interface portal 500 may correspond to interface portal 118 in system 100 of FIG. 1. Interface portal 500 may be compared to interface portal 300 of FIG. 3 and interface portal 400 of FIG. 4. For example, the interface portal 500 includes several panels that include a channel/dialog panel 510 (which may be compared to channel/dialog panel 310 and channel/dialog panel 410, a message window panel 520 (which may be compared to message window panel 320 and message window panel 420) and a side panel 530 (which may be compared to side panel 330 and side panel 430). The interface portal 500 provides an example interface in which a chat messaging session can be engaged by a number of participants that are represented by the participant icons A-H on the portal 500. In this example, the interface portal 500 allows participants to integrate user perceivable actionable objects in a chat session channel 525, which can be executed by a client device to enhance communications between participants of the session channel 525.

A. Sidebar Selection

In some implementations, the system provides asymmetrical chat through chat channels that are generally visible to all or directed participants in an intended group. An advantage of this is that users can reply 1 to 1 to someone in a group chat rather than the typical limited and distracting Reply-To-All messaging technology. For example, a user can reply directly to someone in a group chat that can be kept private from other group members without having to engage the entire group, while retaining context and relativity to the broader conversation for the participants of the 1 to 1 conversation.

Figure 5A:
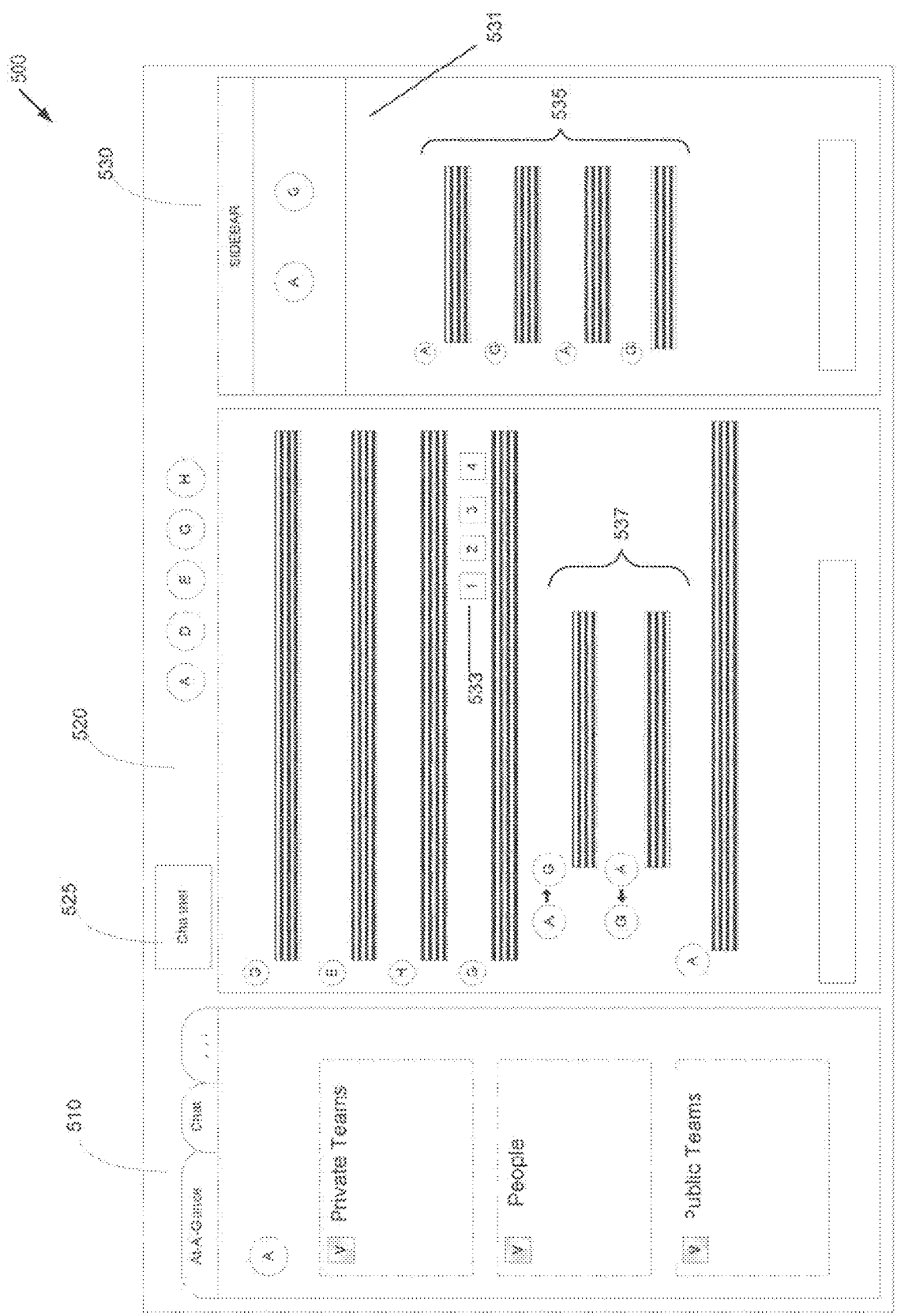
FIGS. 5A-5D are examples illustrating another interactive interface portal in accordance with aspects of the disclosure.

Turning to FIG. 5A, another view of the interactive interface portal 500 is shown. In this example, interactive interface portal 500 includes the capability of opening a sidebar selection 531 that allows two or more members, such as member A and G of a larger group session channel 525 to communicate privately in a private chat session 535. In some implementations, the private chat session 535 is hidden from display to the other participants of the larger group session. In one implementation, the interface portal 500 may include controls 533 to integrate some or all of the private chat session 537 into the larger group session channel 525 for display to other participants. In some implementations, the private chat session 535 in response to a request from the first participant or the second participant may permit a third participant to join the second chat session that is either currently in or not in the larger group session channel 525.

In some implementation, a first chat participant, such as participant A, clicks on and/or hovers over the display name for a second chat participant, such as participant G, in the main window 520, a sidebar session 531 opens. In some implementations, the first chat participant may also initiate the sidebar session 531 by activating a control 533 associated with a message from the second chat participant. The sidebar session 531 allows the first chat participant to interact directly with the second chat participant outside of larger group session channel 525 that includes the other participants. The sidebar session 531 includes functions available to users of interface portal 500. For example, sidebar session 531 allows the first and second chat participants to integrate actionable objects, such as actionable objects 119, into the private chat session 535 to enhance the electronic communications between the participants.

Figure 5B:
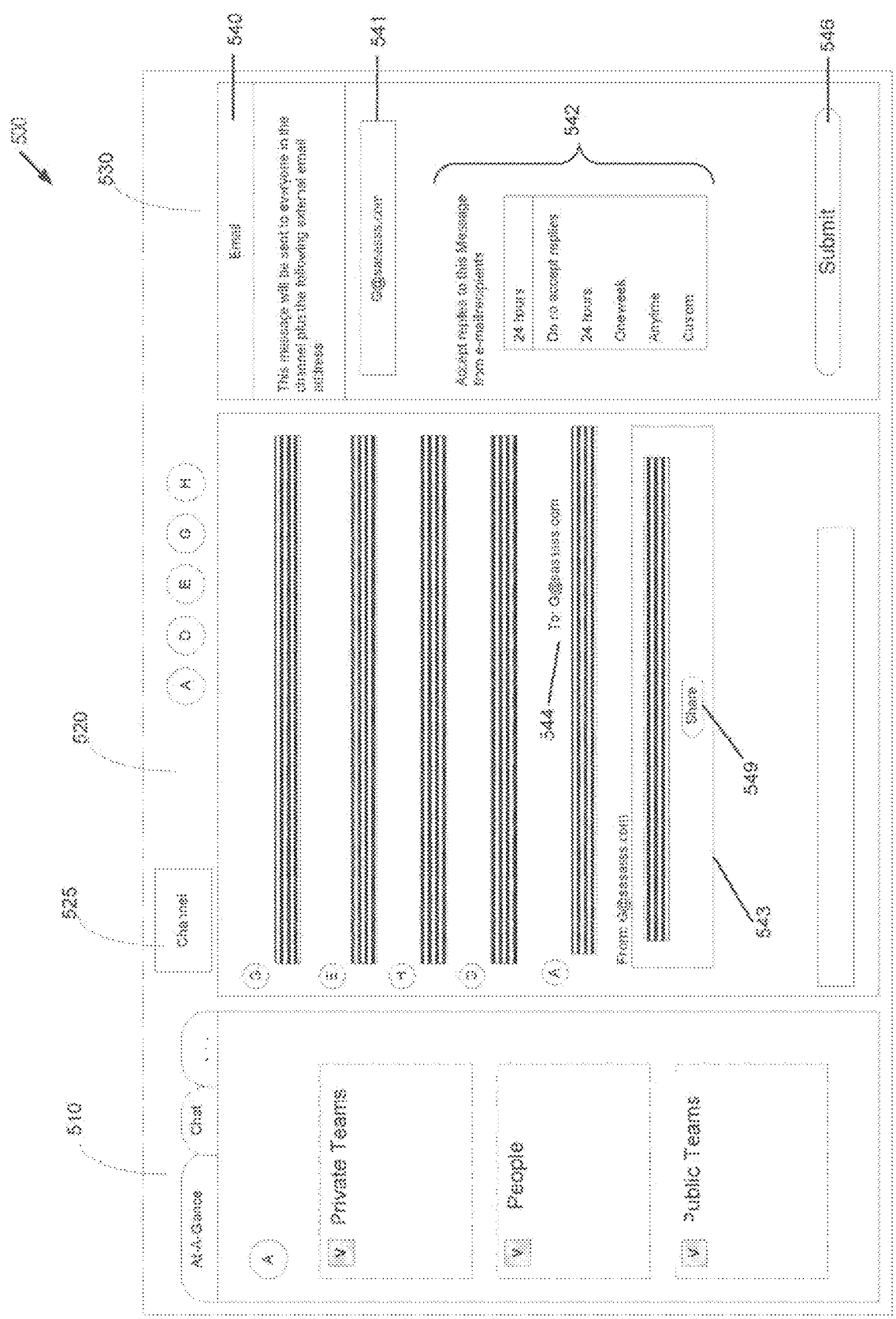
Figure 5C:
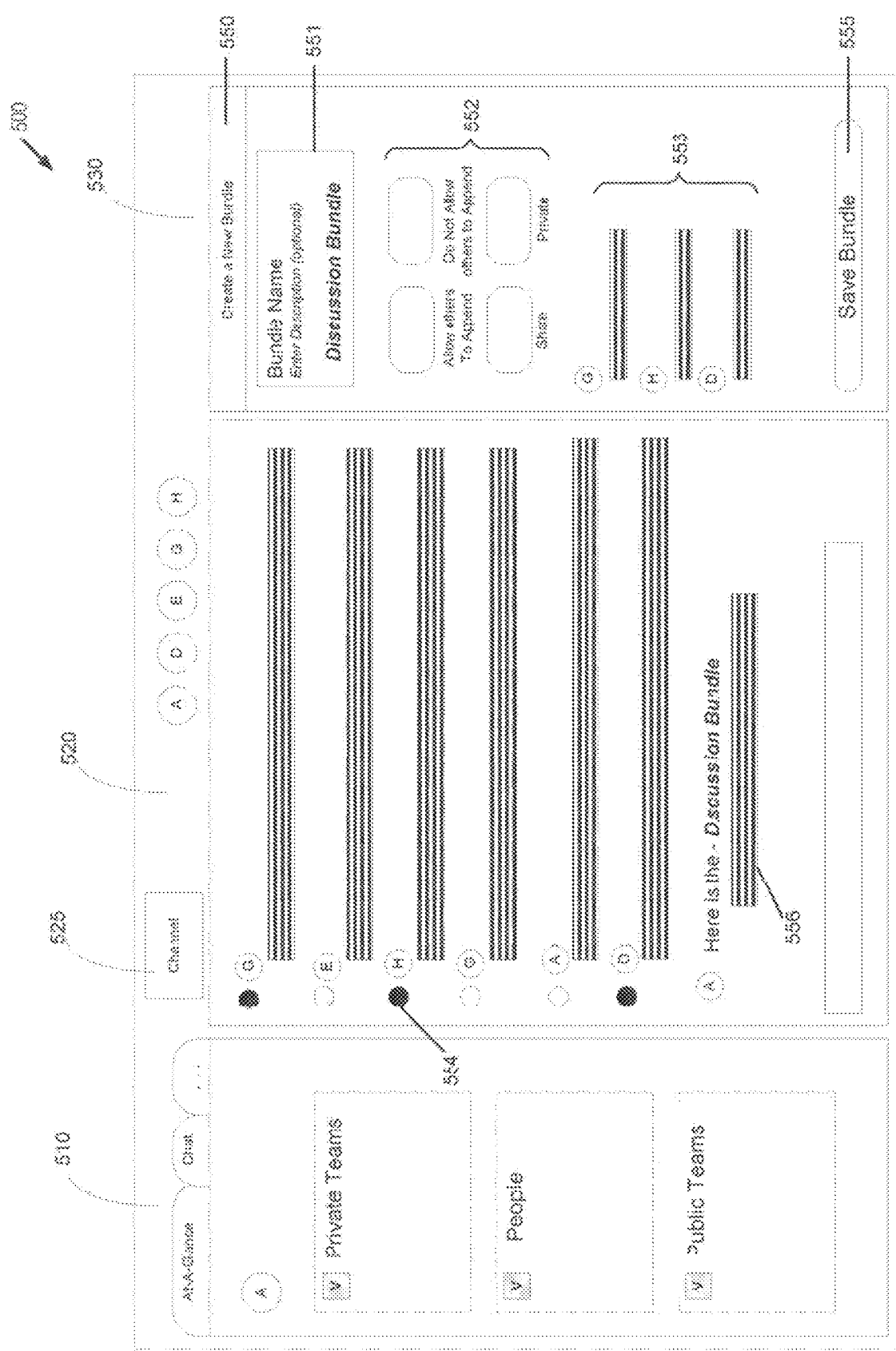
Figure 5D:
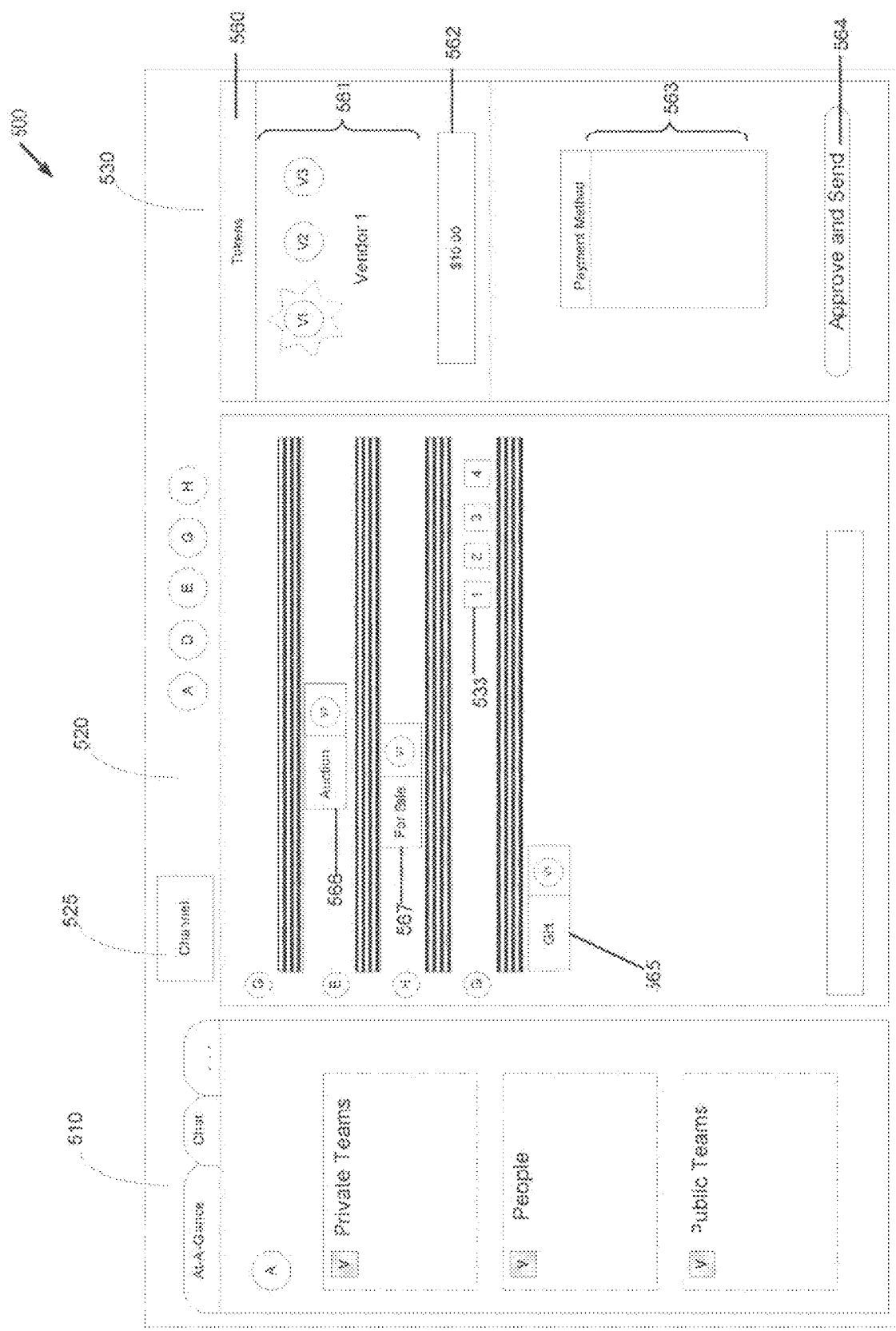
Figure 5E:
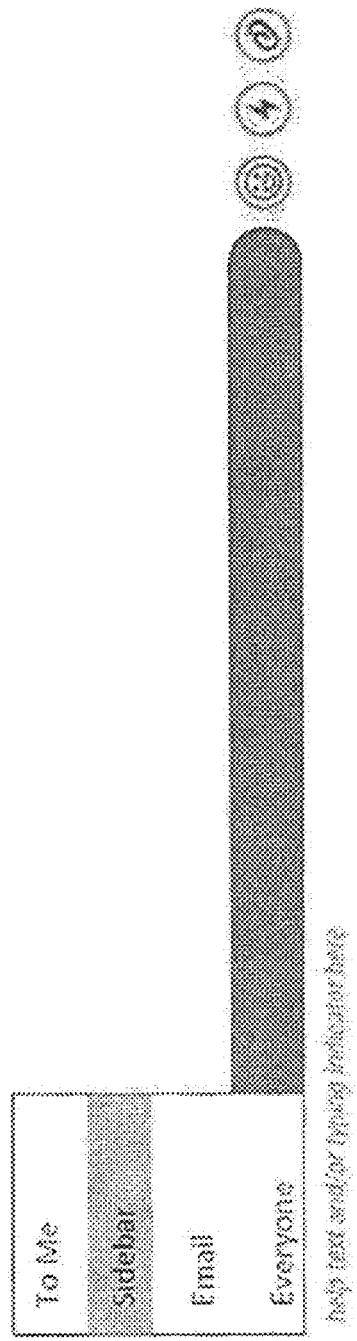
FIG. 5E illustrates an exemplary text entry bar that allows for sidebar selection.

FIG. 5E is an exemplary screen shot that illustrates one exemplary approach that allows users to initiate a Sidebar. A Sidebar may be a 1:1 private conversation between two (for example) members (or more) of a larger group conversation from within a group channel. Messages in the Sidebar are only visible to the parties to the Sidebar. This is further described below with reference to FIGS. 10A-10I.

B. Targeted Inclusion with Response Rules

In some implementations, the system of the present disclosure allows users to send and receive emails from a group chat channel. For example, a user may send a message to the e-mail address of someone outside of the system. When a response to the email comes back, the originator of the message can choose to share the entire incoming email or subset thereof with the group or directed participants of the group. To avoid unwanted, unsolicited messages and spam back into a chat channel, the system ascribes a unique identifier to each email sent and in combination with rules for the unique identifier. This permits the sender of an email from the system to define and associate response rules to outgoing messages for replying emails. These rules may be applied to accept or reject to the incoming emails and may include, but not limited to, only accepting a defined number of responses or only accepting responses that are received within a defined period of time (or any combination thereof), accepting a certain number of response (e.g., up to three responses even after the time period expires), accepting emails from associated accounts (e.g., an email may be sent to a user's work email but responses can still be accepted from another (personal) email account associated with the user in accordance with the rules) as well as other types of rules. By including the email message into the chat message stream at the time and place an email originated from and is received, the emails are placed into the discussion in context. Thus, the channel message stream retains meaning and immediate lasting context that is not available in typical chat technology.

In FIG. 5B, another view of the interactive interface portal 500 is shown. In this example, interactive interface portal 500 includes the capability of linking an e-mail session panel 540 to a chat session associated with the plurality of participants. In this regard, the email session may include an actionable object that can be integrated into the chat session. The email session panel 540 may include a plurality of fields to provide information regarding one or more email addresses in which data may be received and integrated into the chat session. The plurality of fields may include, but is not limited to, an email address field 541 to enter one or more email addresses and a time period field 542 that indicates the chat message session is active to receive data, via a network connection, from the email session during a predetermined time period. For example, the time period field 542 may include a drop down menu of time periods that can be associated with the e-mail session.

After entering the relevant information into the email session panel 540, the sending participant may integrate the email session into chat session by activating a control 546 on the interface portal 500. In this regard, an indicator 544 of the email session that is incorporated in the chat session may be displayed on the main window 520 of the interface portal 500. During the determined time period, data may be received from the email session to be incorporated into the chat session. For example, the data may be displayed in the main window 520 of the interface portal 500 as chat messages. If it is detected that the time period has expired, an alert may be provided by the system to the e-mail session to indicate that data received from the email session is rejected for inclusion in the chat message session.

As shown in FIG. 5B, data 543 received from the email address associated with the email session may be then incorporated into the chat session. In some implementations, this data 543 may include an actionable object, such as actionable object 119, comprising a type indicator to characterize a user perceivable action to be executed in the chat message session. In some implementations, the data 543 may include a control 549 that can be activated to incorporate all or a portion of the data received from the email session into the chat session. In one implementation, the actionable object received from the email session may be combined with a second actionable object in the chat session to adjust characteristics of the user perceivable action to be executed as discussed above. In some implementations, action object can be sent to the email session. In such cases, the email session may receive a link that would direct the user back to the system to complete the action associated with the action object. For example, if the action is a polling question object, the response for the e-mail session may be incorporated into the overall results associated with the object in the chat session. In other cases, if the task object is sent to the email session, the recipient may update a status of the task to indicate their completion status. This update is then recorded and reflected in the action object related to the chat session.

C. Bundle Communications

With bundle communications, the system of the present disclosure allows users to parse through a previous channel discussion and assemble those messages and actions that the user desires to be saved for future reference. These Bundles can be appended to messages in the chat channel, for example by the creator or others participants if so constructed. In one example, the bundle communications can include a bundle message associated with a particular topic, such as a bundle of best practices or a bundle consisting of an important team discussion or decisions.

In FIG. 5C, another view of the interactive interface portal 500 is shown. In this example, interactive interface portal 500 includes the capability of selecting particular messages from a chat session to include in a discussion bundle 550. The discussion bundle 550 may include plurality fields that include, but not limited to, a name field 551, one or more display/update option fields 552 that may indicate whether the discussion bundle 550 can be shared, is private or updatable by other participants, and an indicator of the messages 553 included in the bundle. For example, a participant may select an icon, such as indicator 554, at each of the messages to be included in the discussion bundle 550. After identifying the message to be included discussion bundle 550, the sending participant may integrate discussion bundle 550 into chat session by activating a control 555 on the interface portal 500. In this regard, an indicator 556 of the messages incorporated in the chat session may be displayed on the main window 520 of the interface portal 500.

D. Token Items

With regards to FIG. 5D, an example of the interactive interface portal 500 is shown. In this example, the interface portal 500 includes the capability of transmitting token items 560 of a certain value to participants or groups of participants through a chat session. Each token item is associated with a vendor from a list of vendors 561 that provides a particular service or product. In some implementations, a participant may select a token item 560 to transmit to another participant in the chat session. An indicator (such as icon indicators 565, 566 and 567) of the token item 560 may be inserted into the main window 520 of the interface portal. The token item 560 may include, but not limited to, an intended recipient, a value field 562 associated with the token, and a payment method field 563 (e.g., banking or credit card information).

In some implementations, a participant may enter or select a value in the value field 562 to be associated with the token item 560. The sending participant may integrate the token item into chat session by activating a control 564 on the interface portal 500. When the sending participant activates the control 564, a transaction is registered with the system regarding the token item 560. A confirmation screen may appear along with legal disclaimer information, terms and conditions and/or requesting that the form of payment. If a form of payment is previously entered and saved in the payment method field 563 then the participant may be asked to confirm the saved information. Alternatively, if a credit balance exists in the sending participant's account may be debited. In one implementation, a bank account associated with the sending participant may be established and funded by credit, cash or otherwise. If the account is pre-funded with an amount, for example $50, then subsequent selected token item 560 and their corresponding costs would be debited from the account balance.

Each token item 560 is assigned a transaction identifier and encoded with a unique identifier and authentication code to ensure the token's authenticity. In some implementations, techniques of disclosure for providing the token items 560 can be directly integrated into the point-of-purchase payment system utilized by any specific vendor. In one implementation, the token items 560 can be linked to a physical card (e.g., gift card) associated with the vendor. In other implementations, an exchange system may be employed so that if a user wants to (for example) exchange their token items 560 for another type of token item. In this regard, the exchange may include determining an exchange rate to convert a value of one token item to an equivalent value of the other token, such as converting dollars to their equivalent miles.

In some implementations, a participant may select a token item from the vendor list 561. In one implementation, the participant may send a token as a reaction to a chat message by selecting the chat message in the main window 520 and selecting a control icon 533 associated with gifting the token items 560. In this example the participant selects to gift the token item to a recipient as represented by the gift token icon 565 in the chat session. In some implementations, the receiving participant may identify certain selections to indicate their preferred gift choices. In this manner, the sending participant of a gift is able to identify the gift preferences of the intended recipient. In one implementation, the sending participant may override the receiving participant preferred gifts and select a different gift to provide to the recipient. Some gifts may have monetary value while others may be associated with, for example, a points system of the specific vendor. In some implementations, the gift token icon 565 may display a group of gifts to select from that are provided by the sending participant.

In some implementations, the recipient of the token does not have to be member of the chat session. For example, the recipients may be selected by a charity or other entities engaged in fundraising. In this example, the sending participant may conduct a funding campaign to solicit donations from receiving participants, who may be members or non-members, in the chat session. The receiving participants may receive the token item and choose to contribute an amount towards to recipient. The total amount raised and/or goal may be indicated in the token item as displayed on the interface portal 500.

In some implementations, the token items 560 may represent items up for auction as indicated by the auction token icon 566. In this example, a product or item may be shown along with a current bid amount. Users can bid on items being offered. In this regard, certain rules can be established to represent what constitutes a winning bid and how many winners there can be amongst the participants. User can click on the auction token icon 566 to view more details, conditions, reviews, etc., regarding the auction. Bidding for an item may end based on the rules as well as the rules defined by the sending participant and related to the item being offered. Users and/or authorized 3rd party vendors or companies can post items to be auctioned.

In some implementations, the token items 560 may represent items up for sale as indicated by the sale token icon 567. In some implementations, users may select a group sale or flash sale associated with the sale token icon 567 or direct the sale of the item to a particular participant in the chat session. Receiving participants may hover over, select, click or otherwise activate the sale token icon 567 to indicate an interest in a specific message. The user may be able to view additional information about the item being offered for sale by hovering or clicking (selecting) the sale token icon 567. When the user activates the sale token icon 567, several choices may be displayed for the user to indicate an interest and how the pay for the item. For example, the payment options may include, but not limited to, "buy now", "buy", "finance", etc. In an alternative implementation, the payment options may be pre-configured and associated with a credit card, debit card, ACH or another type of payment account.

V. Example Flow Diagrams

To better aid in understanding implementations of some of the aspects described above that are, for example, related to integrating actionable objects into an on-line chat communications platform, reference is now made to the following flow diagrams. It should be noted that the following operations do not have to be performed in the precise order described below. Rather, various operations can be handled in a different order or simultaneously, and operations may be added or omitted.

Figure 6:
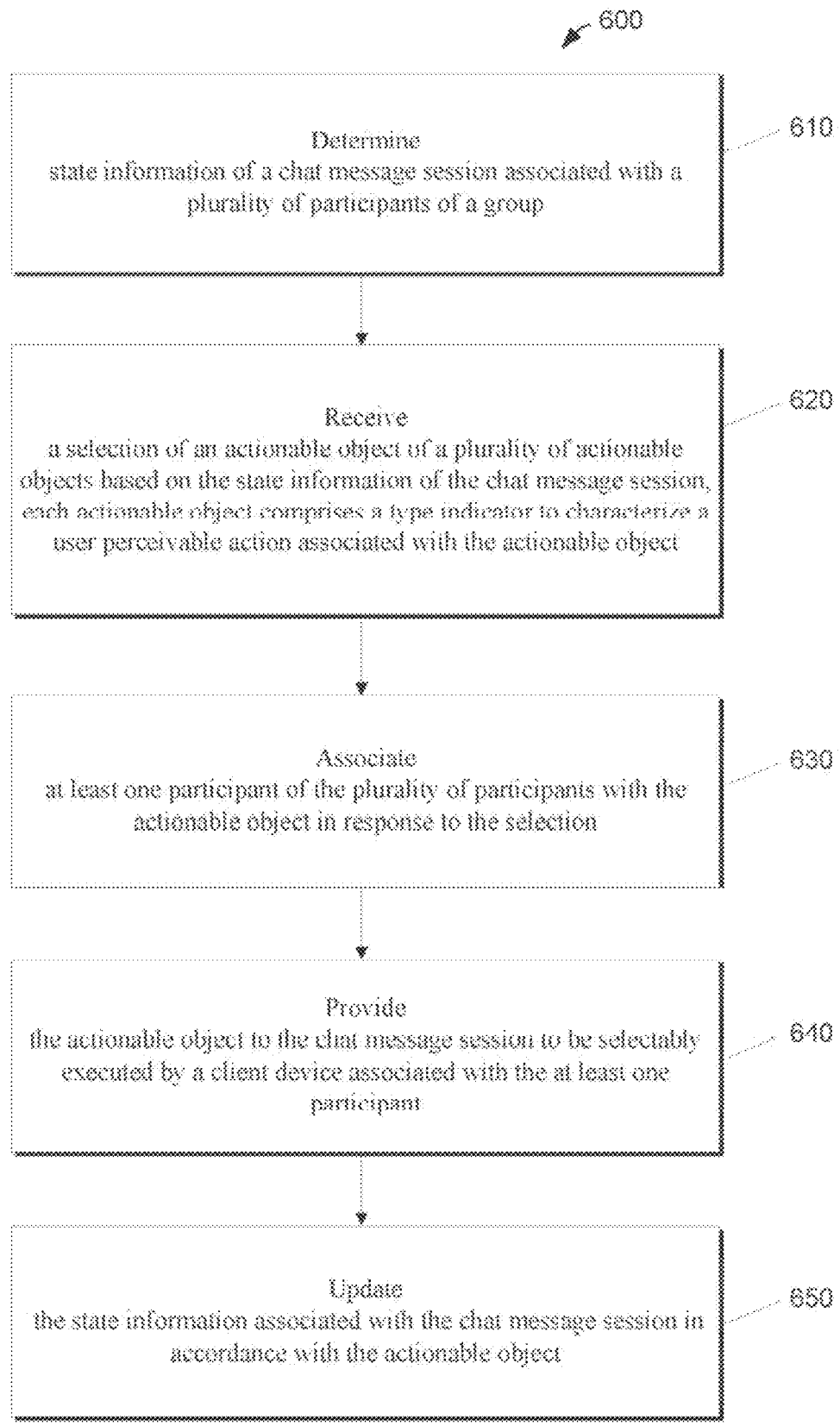
FIG. 6 is an example of a flow diagram illustrating an implementation of a method in accordance with implementations of the disclosure.

FIG. 6 depicts a flow diagram of a method 600 in accordance with one or more aspects of the disclosure. In one implementation, the processing device 112 of FIG. 1 may perform method 600. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of a shared storage system. It should be noted that blocks depicted in FIG. 6 can be performed simultaneously or in a different order than that depicted.

Method 600 begins at block 610 where state information of a chat message session associated with a plurality of participants of a group is determined. In block 620, an actionable object of a plurality of actionable objects is selected based on the state information of the chat message session. Each actionable object comprises a type indicator to characterize a user perceivable action associated with the actionable object. In this regard, the type indicator comprises at least one of: a question indicator, a task indicator or an idea indicator associated with the group. At least one participant of the plurality of participants is associated with the actionable object in block 630. Thereupon, the actionable object is provided to the chat message session to be selectably executed by a client device associated with the at least one participant in block 640. In block 650, the state information associated with the chat message session is updated in accordance with the actionable object.

Figure 7:
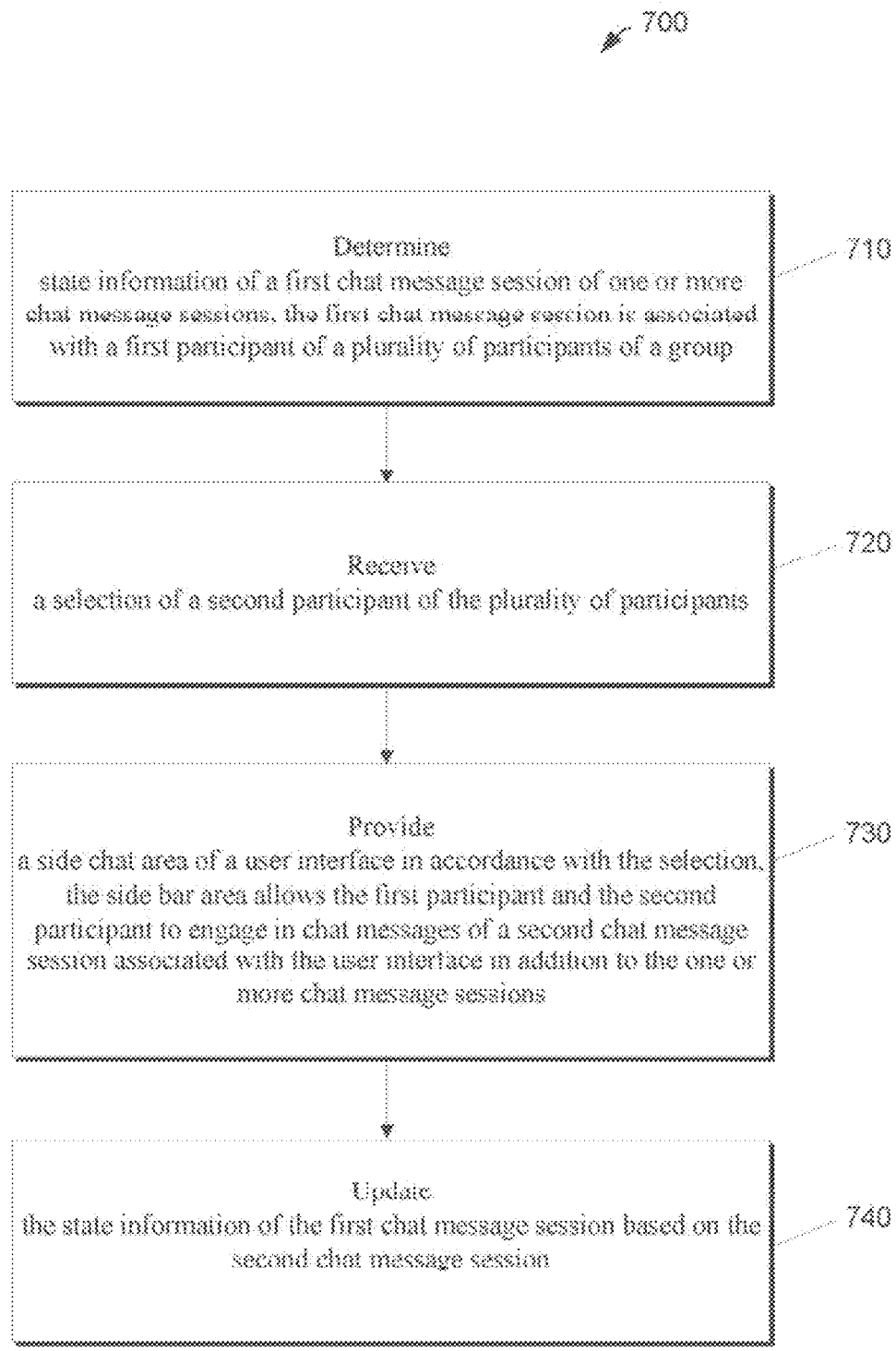
FIG. 7 is an example of a flow diagram illustrating an implementation of a method in accordance with implementations of the disclosure.

FIG. 7 depicts a flow diagram of a method 700 in accordance with one or more aspects of the disclosure. In one implementation, the processing device 112 of FIG. 1 may perform method 700. The method 700 may be performed by processing logic that may comprise hardware (circuitry, dedicated logic, etc.), software (e.g., software executed by a general purpose computer system or a dedicated machine), or a combination of both. In alternative implementations, some or all of the method 700 may be performed by other components of a shared storage system. It should be noted that blocks depicted in FIG. 7 can be performed simultaneously or in a different order than that depicted.

Method 700 begins at block 710 where state information of a first chat message session of one or more chat message sessions. The first chat message session is associated with a first participant for a plurality of participants of a group is determined. In block 720, a selection of a second participant of the plurality of participants is received. A side chat area of a user interface is provided in block 730 in accordance with the selection. The side bar area allows the first participant and the second participant to engage in chat messages of a second chat message session associated with the user interface in addition to the one or more chat message sessions. In this regard, the second chat message session is hidden from display to other participants of the first chat message session. In block 740, the state information of the first chat message session is updated based on the second chat message session.

Figure 8:
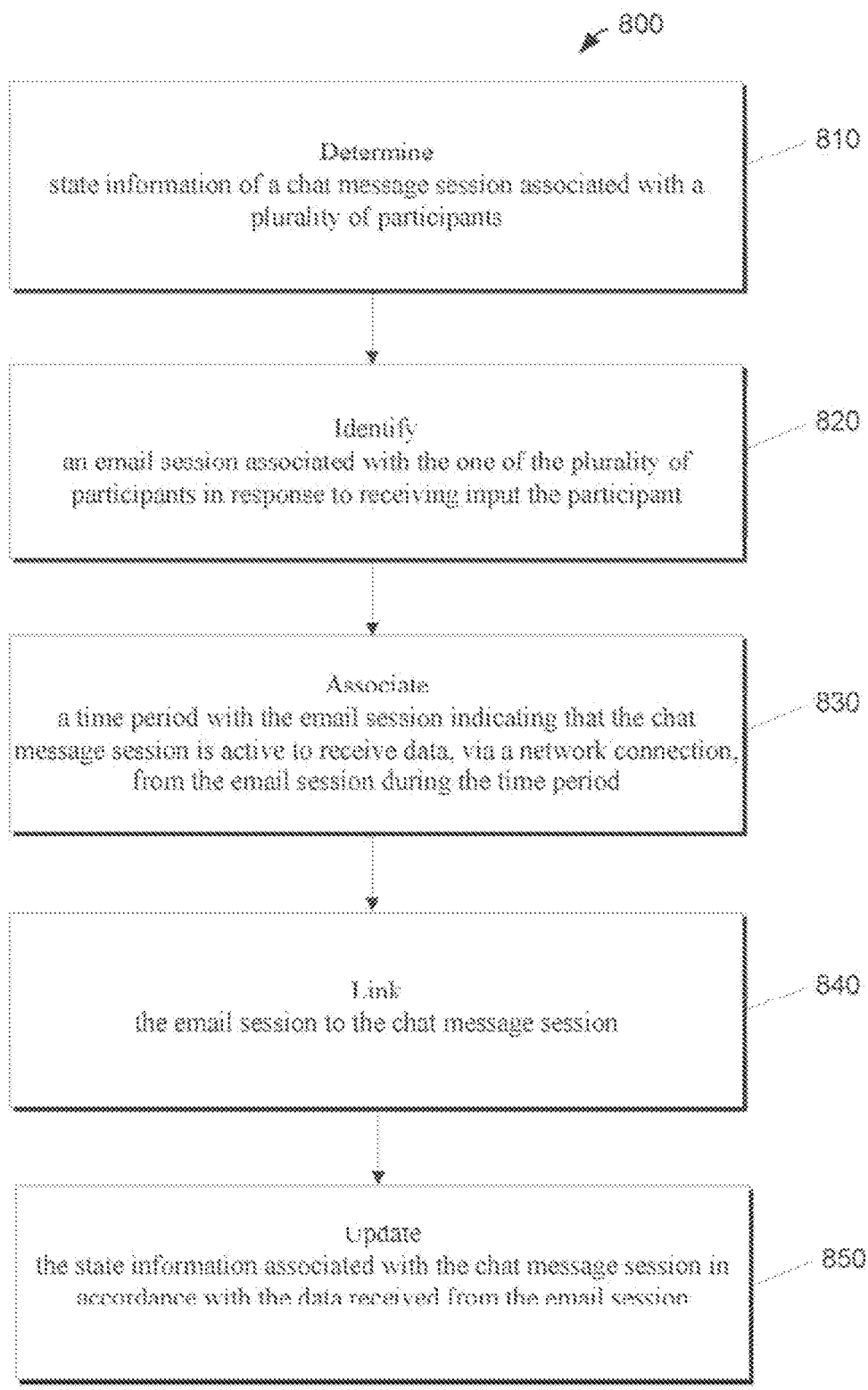
FIG. 8 is an example of a flow diagram illustrating an implementation of a method in accordance with implementations of the disclosure.

FIG. 8 depicts a flow diagram of a method 800 in accordance with one or more aspects of the disclosure. In one implementation, the processing device 112 of FIG. 1 may perform method 800. The method 800 may be performed by processing logic that may comprise hardware (circuitry, dedicated logic, etc.), software (e.g., software executed by a general purpose computer system or a dedicated machine), or a combination of both. In alternative implementations, some or all of the method 800 may be performed by other components of a shared storage system. It should be noted that blocks depicted in FIG. 8 can be performed simultaneously or in a different order than that depicted.

Method 800 begins at block 810 where state information of a chat message session associated with a plurality of participants is determined. In block 820, an email session associated with the one of the plurality of participants is identified in response to receiving input the participant. A time period is associated in block 830 with the email session indicating that the chat message session is active to receive data, via a network connection, from the email session during the time period. In block 840, the email session is link to the chat message session. In block 850, the state information associated with the chat message session is updated in accordance with the data received from the email session.

VI. Example Machine

Figure 9:
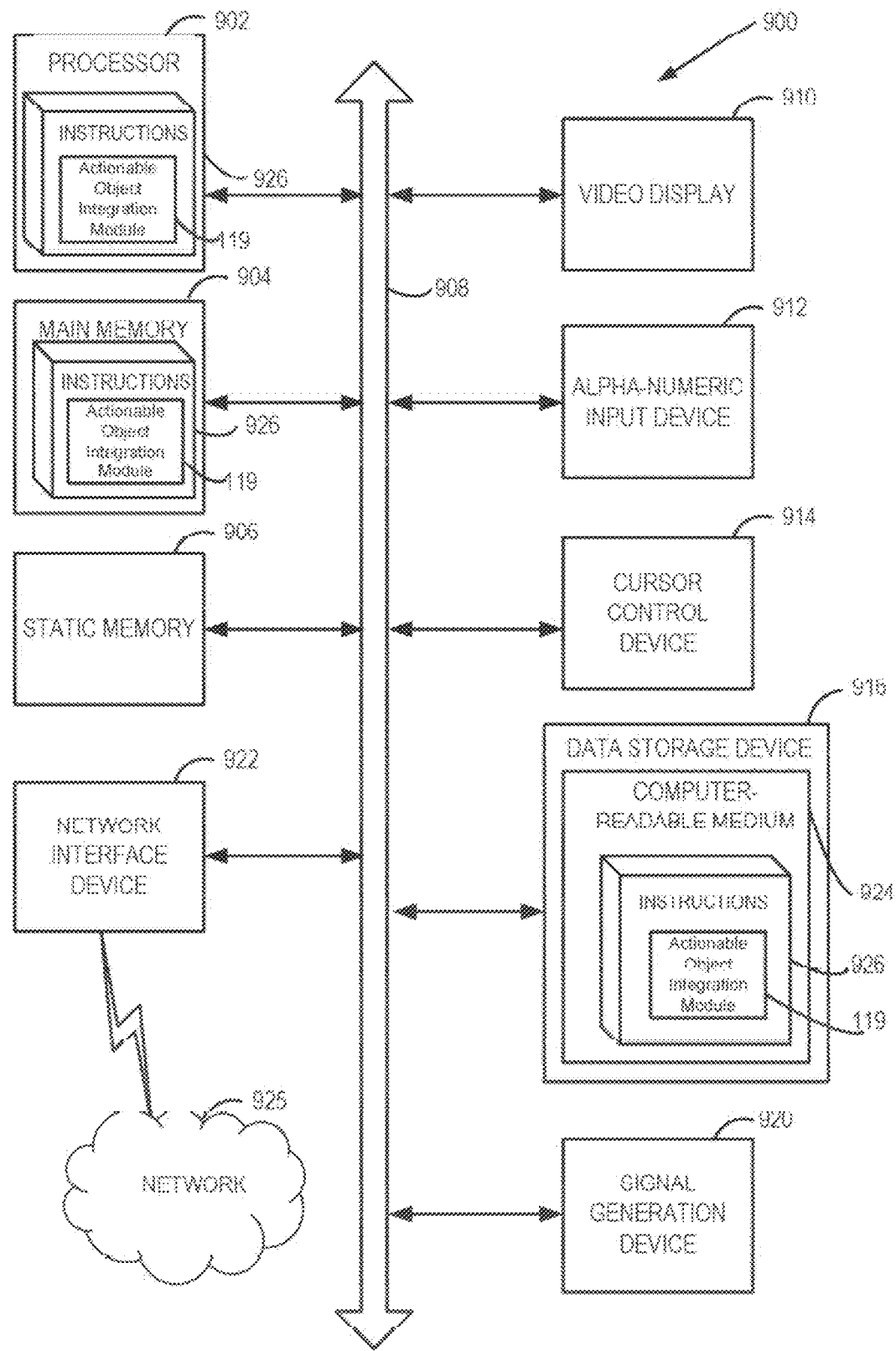
FIG. 9 illustrates a diagrammatic representation of a machine in the exemplary form of a computer system.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 may be comprised of a processing device 902 (which may correspond to a processing device 112 within system 100 of FIG. 1), a main memory 904 (e.g., read-only memory (ROM), flash memory, dynamic random access memory (DRAM) (such as synchronous DRAM (SDRAM) or Rambus DRAM (RDRAM), etc.), a static memory 906 (e.g., flash memory, static random access memory (SRAM), etc.), and a data storage device 916, which communicate with each other via a bus 908.

In a further aspect, the computer system 900 may include a processing device 902 (which may correspond to processing device 112), a volatile memory 904 (e.g., random access memory (RAM)), a non-volatile memory 906 (e.g., read-only memory (ROM) or electrically-erasable programmable ROM (EEPROM)), and a data storage domain 916, which may communicate with each other via a bus 908.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute processing logic 926 for performing the operations and steps discussed herein.

Computer system 900 may further include a network interface device 922. Computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

Data storage device 916 may include a machine-readable storage medium (or more specifically a computer-readable storage medium) 924 having one or more sets of instructions embodying any one or more of the methodologies of functions described herein, including instructions encoding the techniques including the actionable object integration module 119 of FIG. 1 for implementing method 600 of FIG. 6 and method 700 of FIG. 7 and method 800 of FIG. 8 for integrating actionable objects into an on-line chat communications platform. In some implementations, the actionable object integration module 119 may also reside, completely or at least partially, within main memory 904 and/or within processing device 902 during execution thereof by computer system 900; main memory 904 and processing device 902 also constituting machine-readable storage media. The actionable object integration module 119 may further be transmitted or received over a network 925 via network interface device 922.

Instructions 926 may also reside, completely or partially, within volatile memory 904 and/or within processing device 902 during execution thereof by computer system 900, hence, volatile memory 904 and processing device 902 may also constitute machine-readable storage media.

Sidebars and Asymmetrical Group Messaging Views

This explanation is further to the explanation above with regard to "SIDEBAR SELECTION" and FIG. 5A.

At present, group chat applications present all messages to all group participants. In fact, this is a basic premise of what group chat is. Inherent in this approach to group chat (channels, rooms, etc) is that unnecessary and meaningless messages are presented to all group participants (Symmetrical—everyone sees everything i.e. all messages). It would be desirable to participate in a group discussion without being subjected to or forced to read meaningless messages—and more to the point, it would be desirable for individual members to communicate privately with another member (or subset of members) from within a group channel. In order to retain situational context, the private messages are desirably viewed embedded within the general channel message stream but also to avoid possible confusion or lack of continuity, the related private messages are desirably also able to be viewed together without the noise of interspersed general channel messages. Presented here is a possible solution and attempt to achieve the aforementioned objectives. It reduces the channel clutter imposed by comments such as "Thanks" intended for one but forced upon all, and provides a mechanism to allow for private sidebar conversations among a subset of a group or channel—while retaining the situational context of the private comments within and related to the overall general conversation. In an exemplary embodiment of the present invention, only the parties to a sidebar conversation see the messages related to the sidebar conversation (unless other action is taken).

Figure 10A:
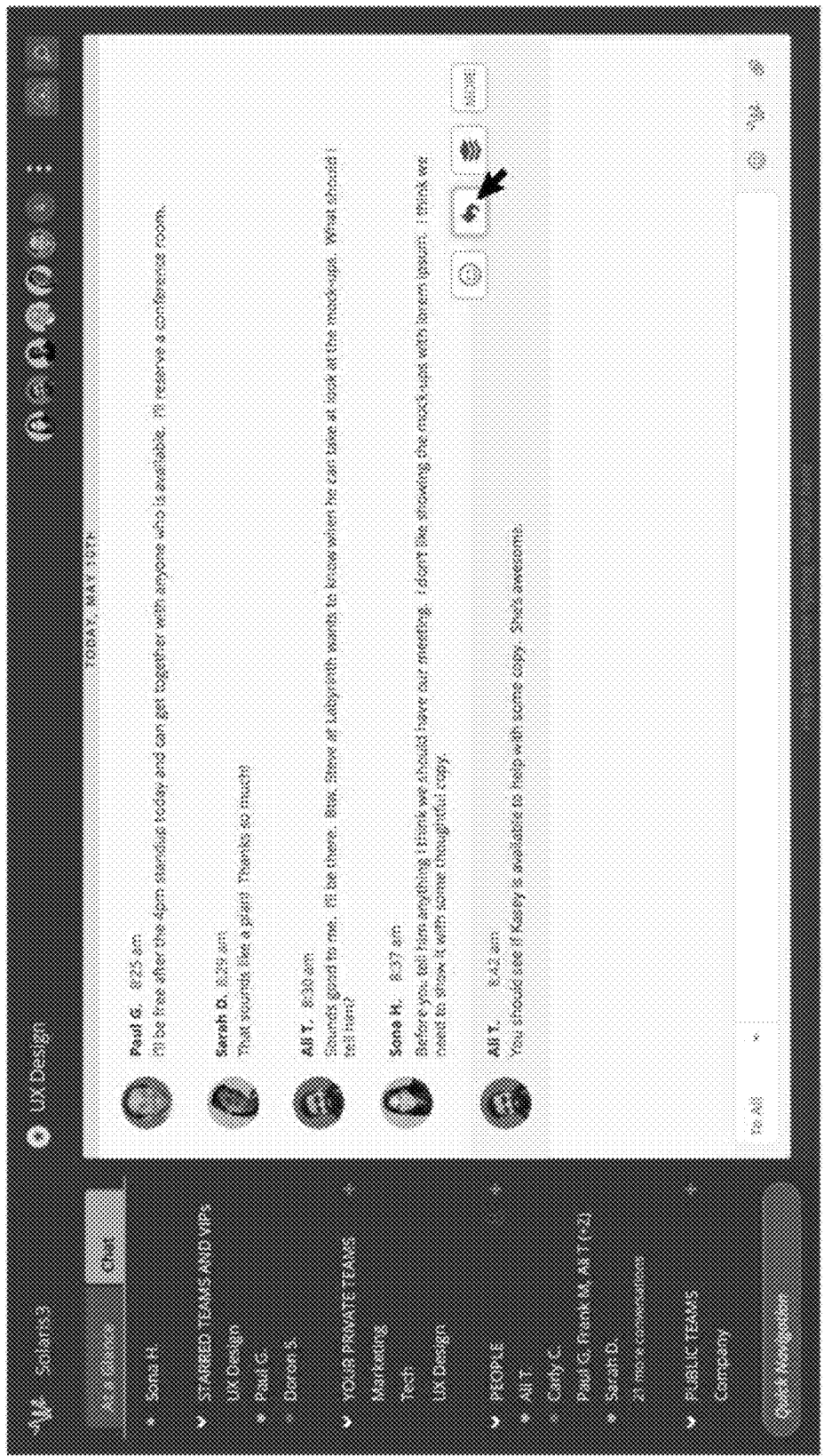
FIGS. 10A-10I are screenshots that illustrate one or more exemplary embodiments of the present invention.
Figure 10B:
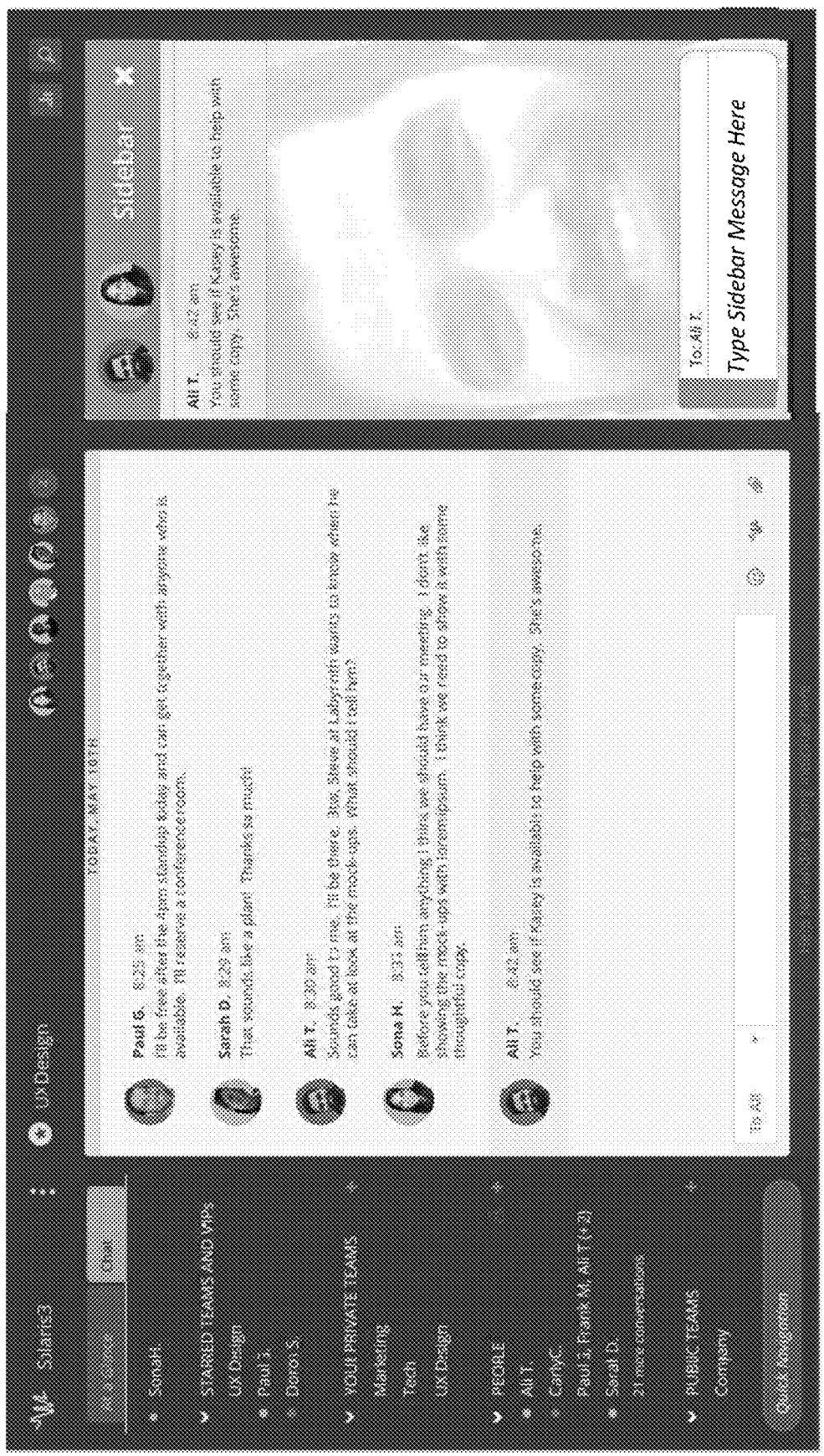
Figure 10C:
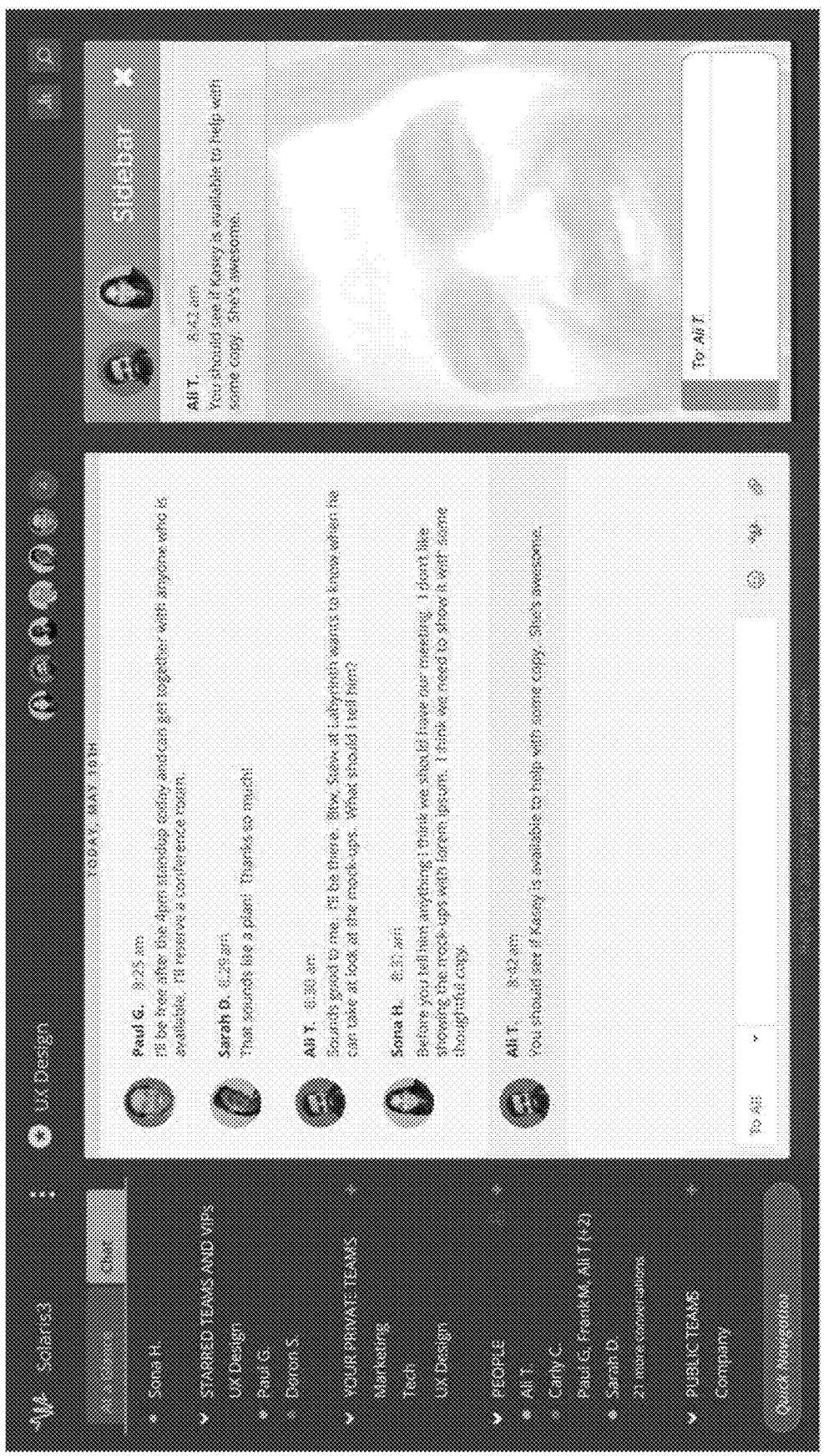
Figure 10D:
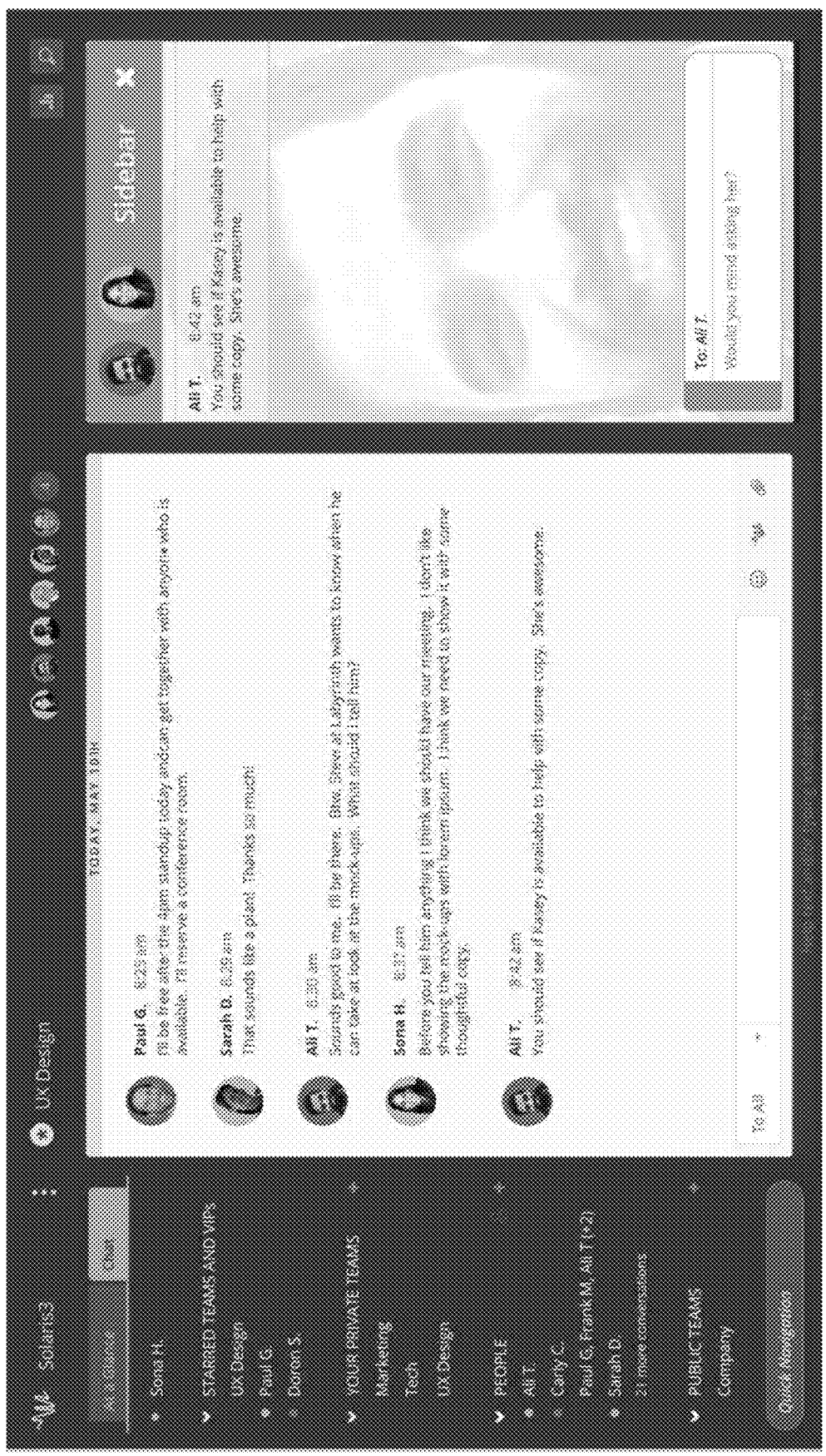
Figure 10E:
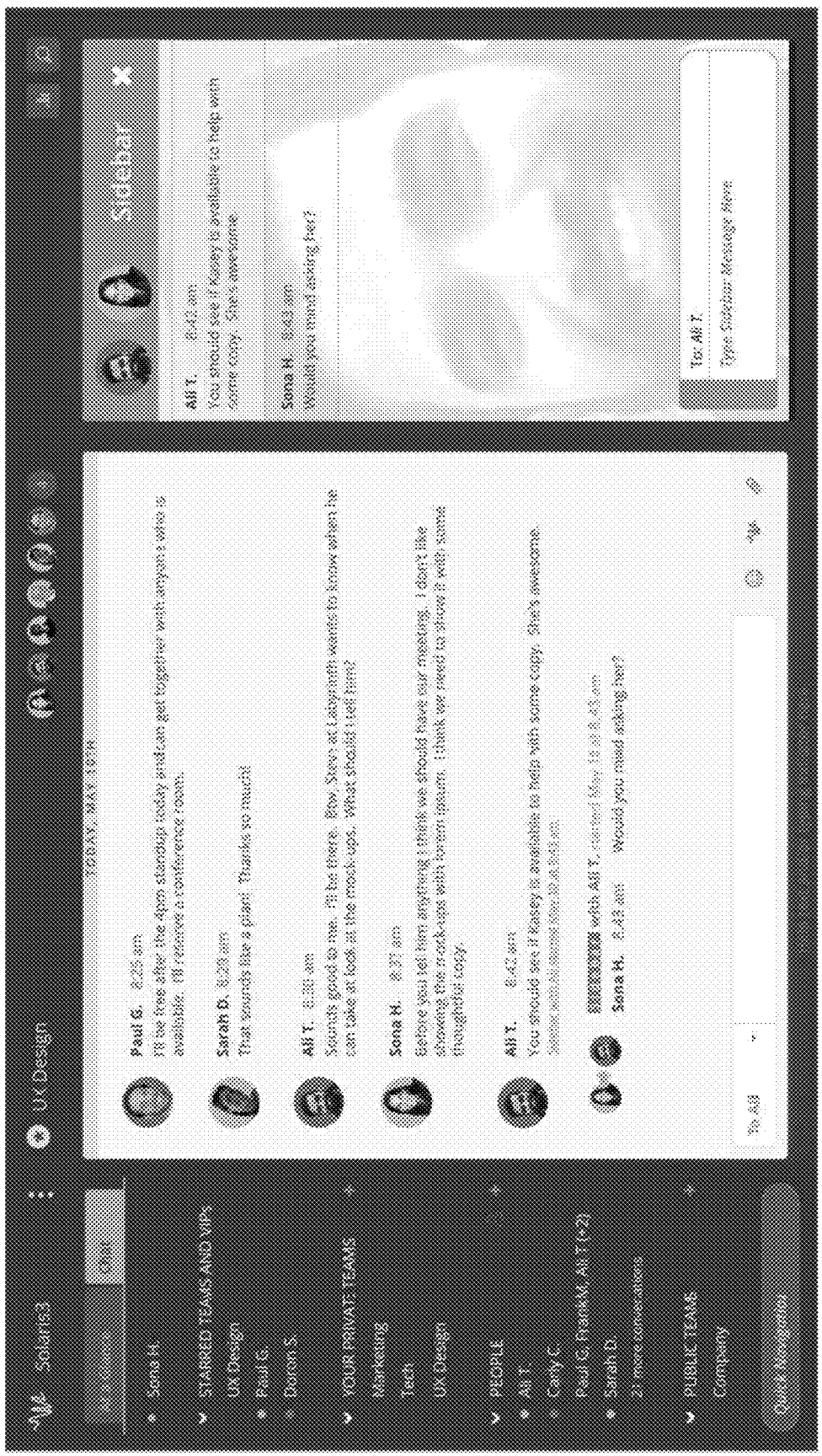
Figure 10F:
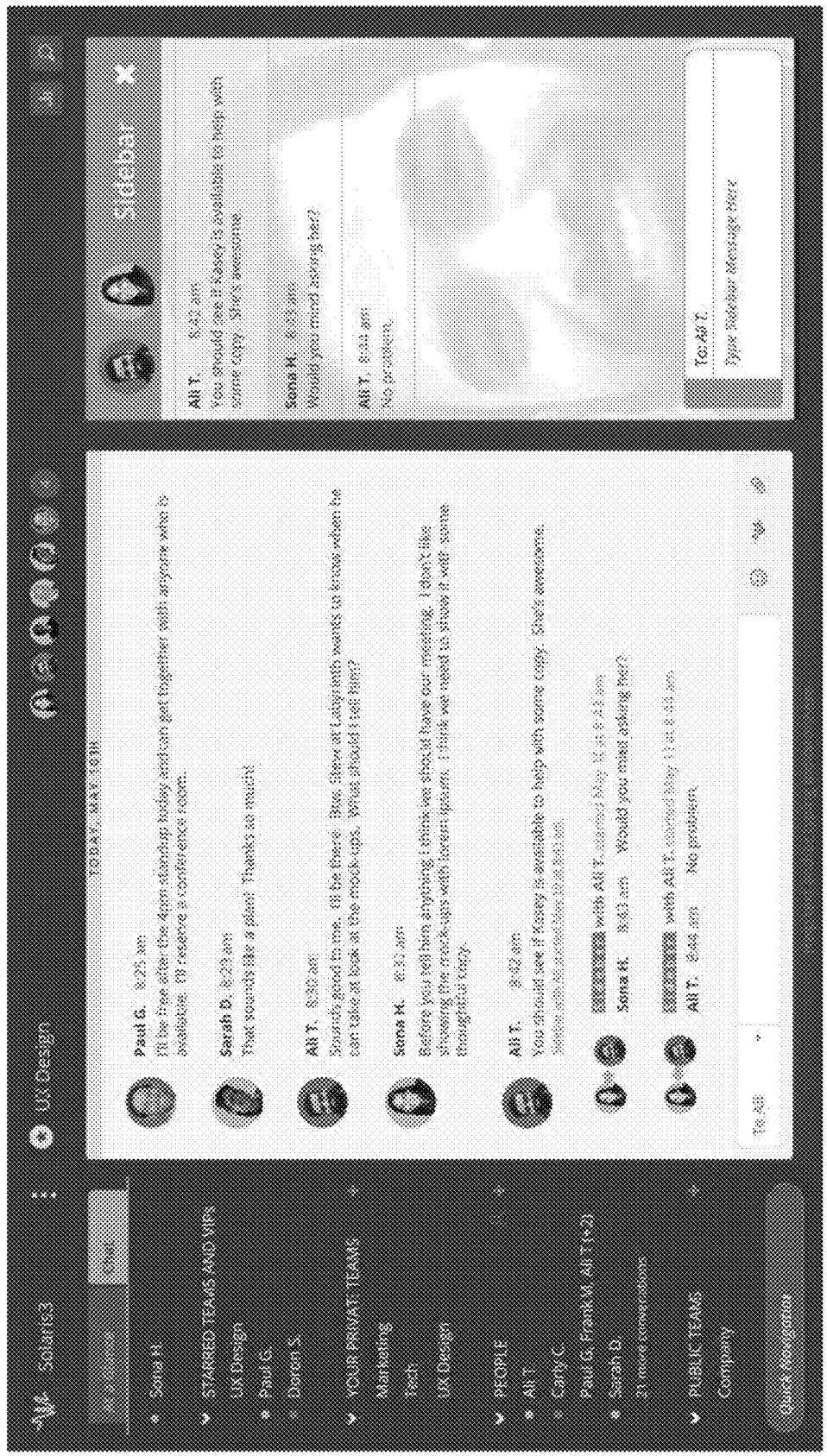
Figure 10G:
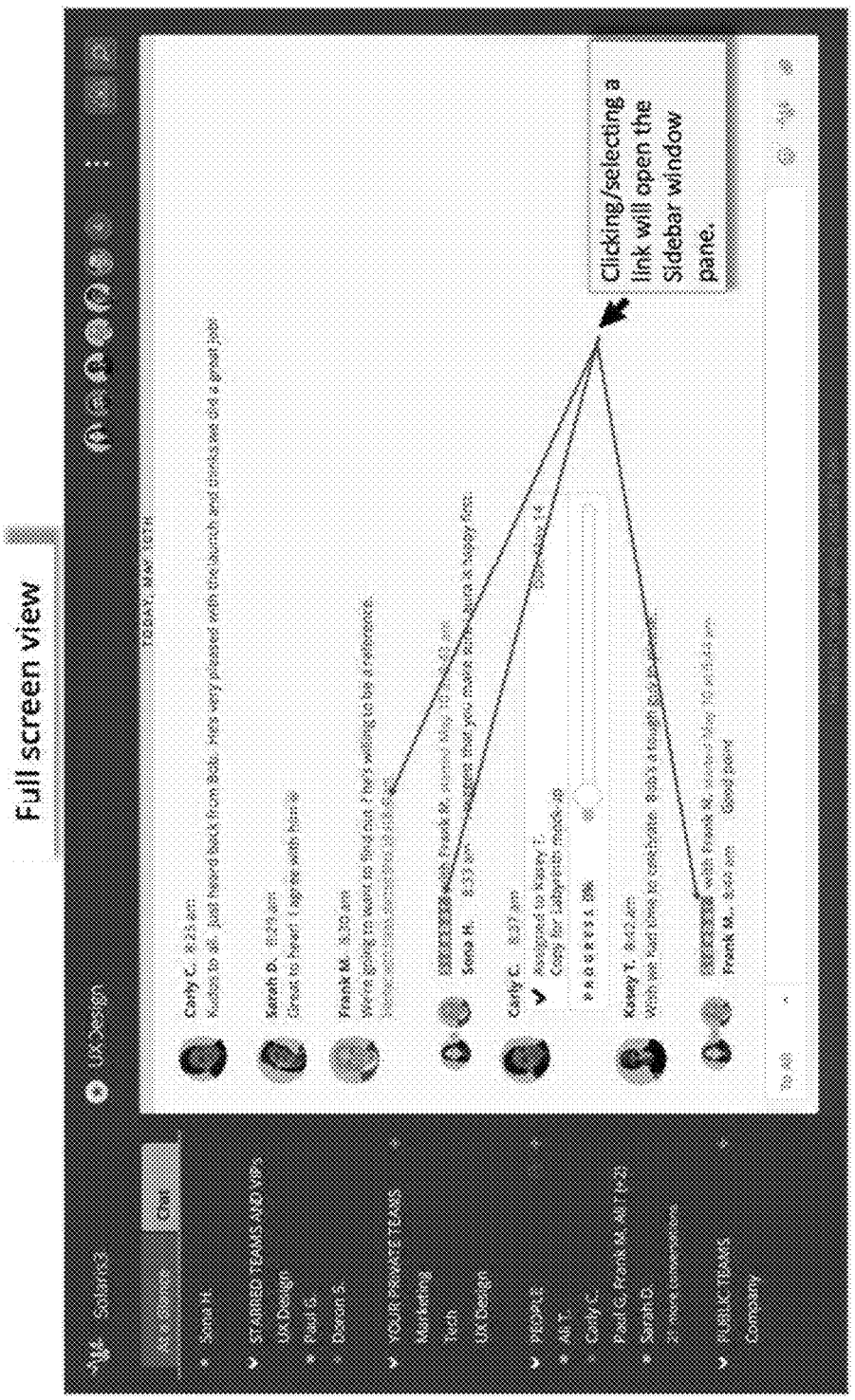
Figure 10H:
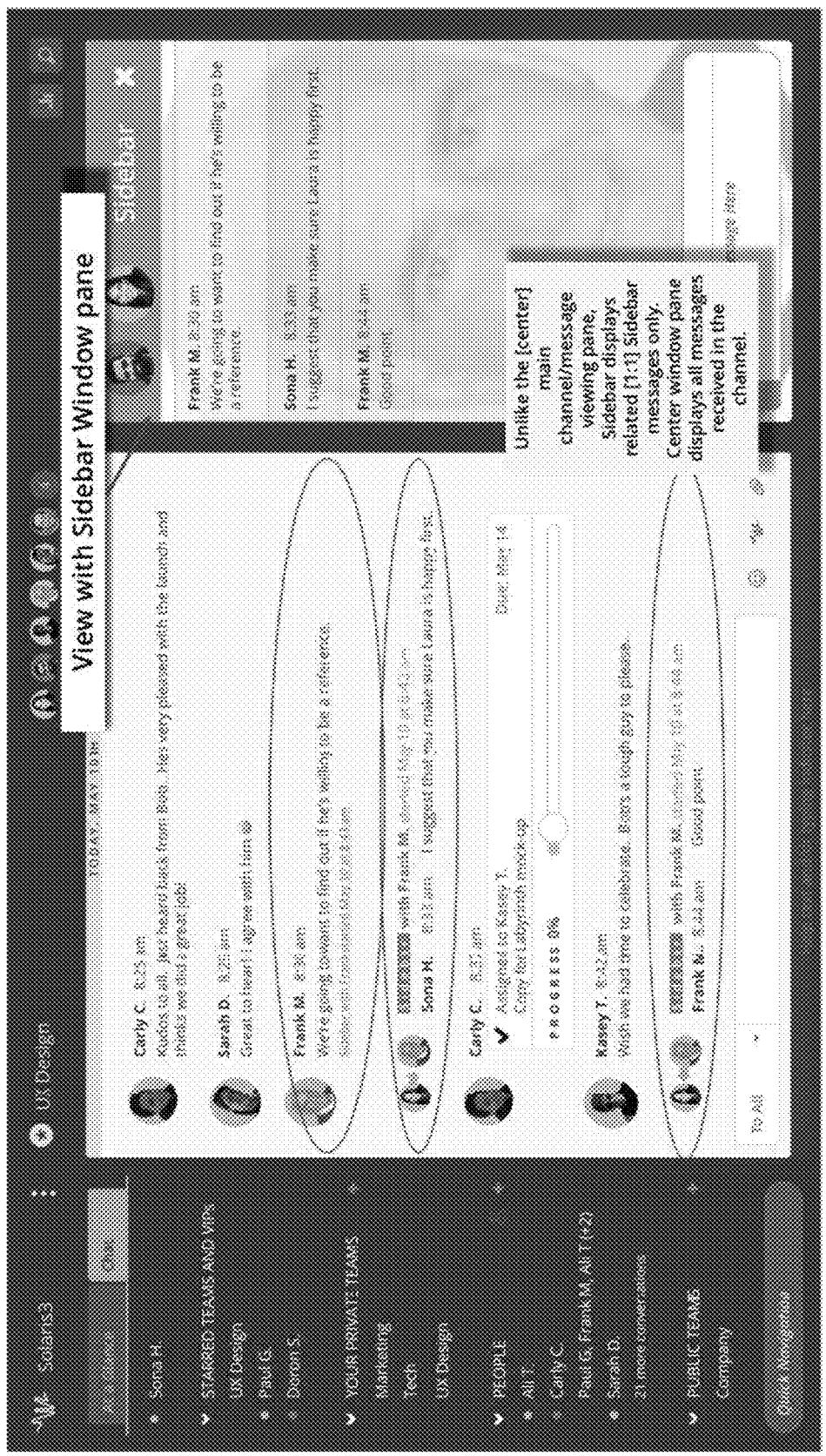
Figure 10I:
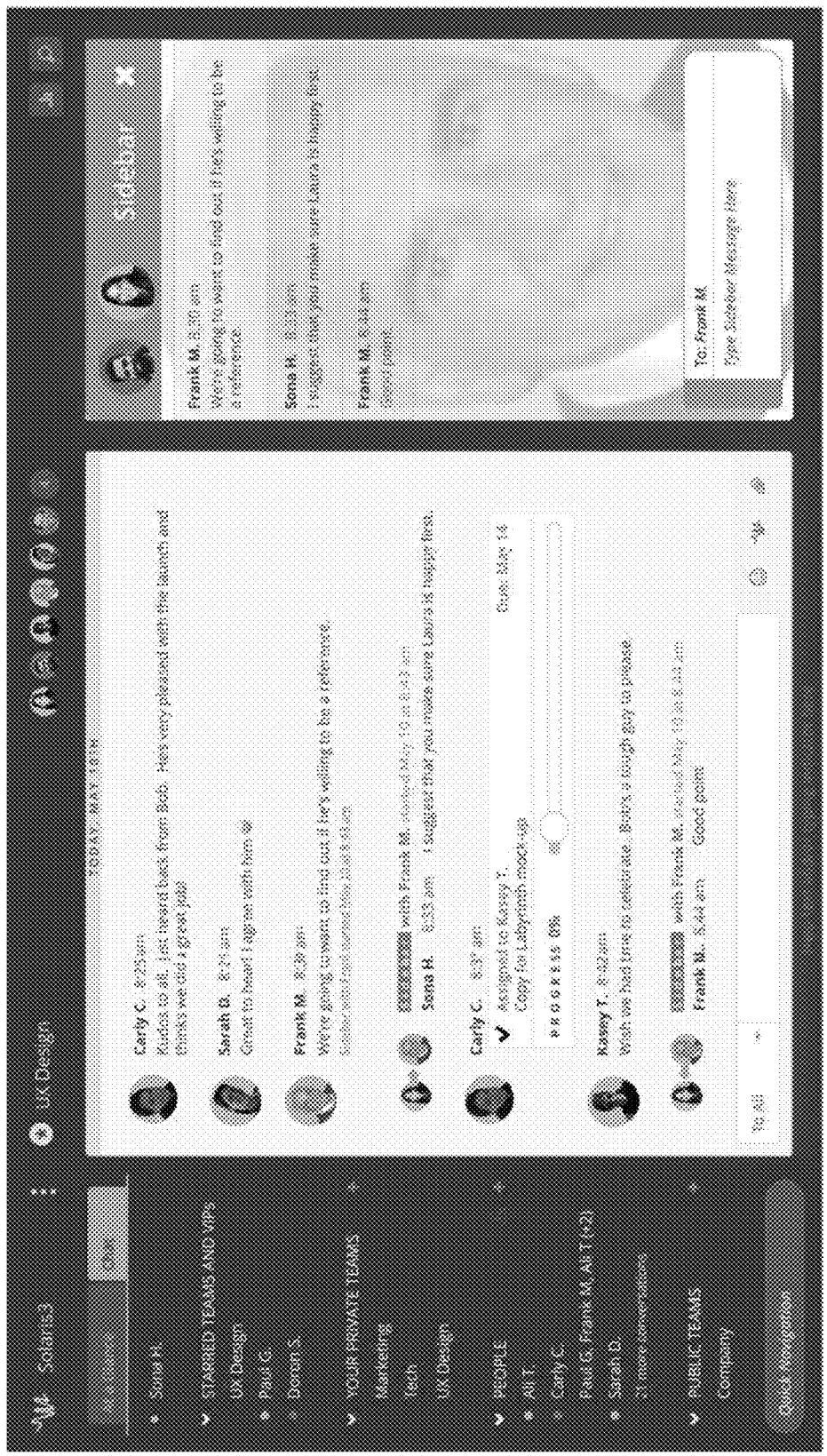

FIGS. 10A-10I are a plurality of screenshots that illustrate operation of an exemplary embodiment of the present invention. In FIG. 10A, a plurality of messages that are exchanged between a plurality of participants are displayed. For ease of identification, the messages that are exchanged between the plurality of participants are displayed in a portion of the screen that will be referred to as the main conversation pane. As in standard messaging, all participants of the messaging exchange in the main conversation pane are able to see each other's messages (which includes each other's responses to messages). In FIG. 10A, one of the participants to the message exchange (in this case, Sona, but it could be another participant) desires to have a private conversation with Ali. In this example, Sona and Ali will have a private 1:1 conversation, but in some exemplary embodiments the private conversation may be 1:N, N greater than 1, and the private conversation may exclude at least one person who is participating in the messaging that is displayed on the main conversation pane. Sona thus clicks on the exemplary "arrow" icon. Sona's action results in the message that was sent by Ali at 8:42 AM being designated an "anchor message." As shown in FIG. 10B, in an exemplary embodiment of the present invention, the act of designating Ali's message as an anchor message results in Ali's message being displayed in a separate pane (but this step is optional). For ease of identification, the separate pane displaying Ali's message will be referred to as a sidebar. As shown in FIG. 10B, a text message box appears with the words "type sidebar message here." In FIG. 10C, Sona begins to type a message that will be seen by Ali but will not be seen by the other participants to the messaging. In FIG. 10D, Sona types the message "would you mind asking her?" Upon pressing the enter key (or taking some other step that transmits the character just typed in) and as shown in FIG. 10E, Sona's response appears in the sidebar and is transmitted to Ali. Again, except for Ali and Sona, none of the other participants to the messaging in the main conversation pane see Sona's response. In FIG. 10F, Ali has typed his response to Sona, and Ali's response appears in the sidebar. Again, except for Ali and Sona, Ali's response is not seen by the other participants to the messaging in the main conversation pane. FIG. 10F illustrates that the conversation that appears in the sidebar can also (optionally) be displayed in the main conversation pane. For purposes of improving visual appearance, the messages that were entered in the sidebar and duplicated in the main conversation pane can be collapsed in the main conversation pane. FIG. 10G illustrates the main conversation pane with collapsed sidebar messages. Clicking/selecting one of the links corresponding to a collapsed sidebar message will open the sidebar and allow the conversation to continue in the sidebar (again limited to the participants in the conversation in the sidebar and excluding all other participants in the conversation in the main conversation pane). As shown in FIG. 10H, once a link to a particular message in the main conversation pane has been selected, the conversation associated with that link can continue in the sidebar. As shown in FIG. 10I, Ali is part of the conversation in the sidebar between Sona and Frank (while other participants of the conversation in the main conversation pane are excluded).

As shown, any participant to the conversation in the main conversation pane can respond to a message that has been designated as an anchor message, and the response can appear in the main conversation pane. The response to the anchor message that is entered into the main conversation pane ("a response) is visible to all other participants in the main conversation pane. Furthermore, a response to a message in the sidebar ("a further response") is seen by the participants participating in the sidebar conversation, but participants to the conversation in the main conversation pane that are not included in the sidebar conversation are excluded from seeing the message.

As shown in the figures, the anchor message and the response received to the anchor message in the main conversation pane may be simultaneously displayed. Furthermore, a response to the anchor message in the main conversation pane and a response to the message in the sidebar may be simultaneously displayed. As shown, the messages that appear in the main message pane are displayed one below the other. Furthermore, the messages displayed in the sidebar may be displayed one below the other.

A further exemplary embodiment of the present invention is illustrated by the screenshots that appear in FIG. 11A through FIG. 11D. These screenshots illustrate an exemplary embodiment of the present invention in which a participant to message exchange is sending a message to one channel and is sending the message in parallel to another channel.

Screenshot 1101 illustrates the display of exchanged messages prior to a participant of the message exchange sending a message in parallel to multiple channels. Exchanged messages may be stored, for example, in memory (i.e. one or more memory devices). Screenshot 1101 illustrates that the display is displaying (via a processor) a plurality of messages that are exchanged in a channel. At the bottom of the screen, a text entry bar appears. The text entry bar allows a participant to enter a message that is subsequently transmitted to multiple channels in parallel. In particular, text is being entered using a feature called hash mention. Furthermore, an exchange of text messages in channel A is illustrated. As shown, there are at least 3 participants that are exchanging messages in channel A. Participant MarcCohen will now post a message that will be posted in parallel to more than one channel. In the exemplary embodiment shown, Marc Cohen is one of the participants that is sending one of the messages in one of the channels in parallel to another one of the channels. Furthermore, in the exemplary embodiment shown, because channel A is currently active to MarcCohen, when MarcCohen sends a message, the message is automatically sent in channel A. However, in the illustrated exemplary embodiment, MarcCohen wishes that the message he is sending in channel A will also be sent in parallel to channel B and channel C. Thus, MarcCohen designates, for example, in the text entry bar, that transmission of the message to channel B and channel C is also desired. The sending of the message to multiple channels in parallel is accomplished with the aforementioned hash mention feature. Thus, in this example, before MarcCohen types in the text entry bar the message that he wants to send to various channels, MarcCohen indicates to which channels (in addition to channel A) the messages is to be sent.

In this manner, when messages are exchanged between a plurality of participants, the messages are exchanged within channels, and the messages are displayed. In particular, each of the participants exchanges messages with others of the participants in one or more channels in which message exchange between the plurality of participants is authorized. Any of the participants is prevented from exchanging messages in one or more channels when (or alternatively in which) message exchange between the plurality of participants is not authorized. One of the participants sending one of the messages in one of the channels is allowed to send the one of the messages in parallel to another one of the channels. Note that when sent in "parallel," this includes situations where the messages are sent at the same time, and where the messages are not sent at the same time.

In a further exemplary embodiment, a message posted in channel A will automatically include—without further specific direction—that the message be displayed in channel A. In yet another exemplary embodiment, a hash mentioned post in Channel A is not included in channel A, or the hash mentioned post in Channel A is also posted in Channel A, but is only posted and visible in Channel A to the poster of the message.

Returning to FIG. 11A, as shown, MarcCohen types the name of the channel and precedes the name of the channel with a character that indicates that the channels being designated as a recipient of the message. Thus, in the example shown, MarcCohen has typed "#ChannelB #ChannelC". In this manner, MarcCohen has indicated that channel B and channel C are also to receive the message.

Screenshot 1102 shows channel A after the previously described message has been sent. Screenshot 1103 illustrates channel B after the previously described message has been sent. Screenshot 1104 illustrates channel C after the previously described message has been sent. Thus, as shown, by designating channel B and channel C in the text entry bar of screenshot 1101, the messages is sent not only to channel A, but also to channel B and channel C.

Thus, in accordance with an exemplary embodiment of the present invention, a memory may be included for storing messages. Furthermore, a processor is included for providing display of messages exchanged between a plurality of participants, and allowing one of the participants that is sending one of the messages in one of the channels to send the one of the messages in parallel to another one of the channels. Furthermore, what has been described is an environment in which each of the participants exchanges messages with others of the participants in one or more channels in which message exchange between the plurality of participants is authorized. Furthermore, each of the participants is prevented from exchanging messages in one or more channels in which message exchange between the plurality of participants is not authorized. Thus, for example, if a participant to messaging in one channel is not authorized to participate in messaging in another channel, then that participant will not be authorized to communicate in that other channel.

Figure 11A:
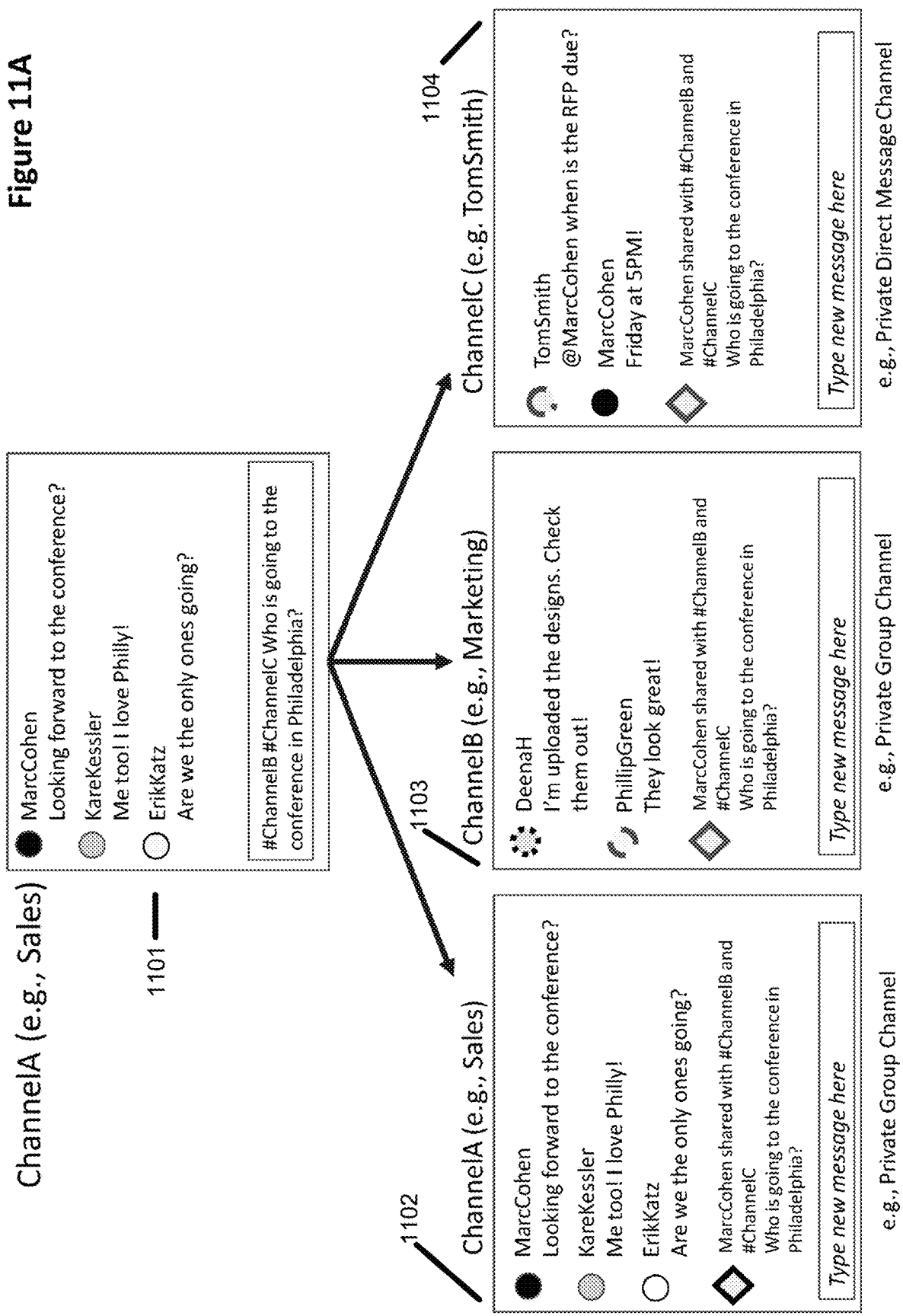
Figure 11B:
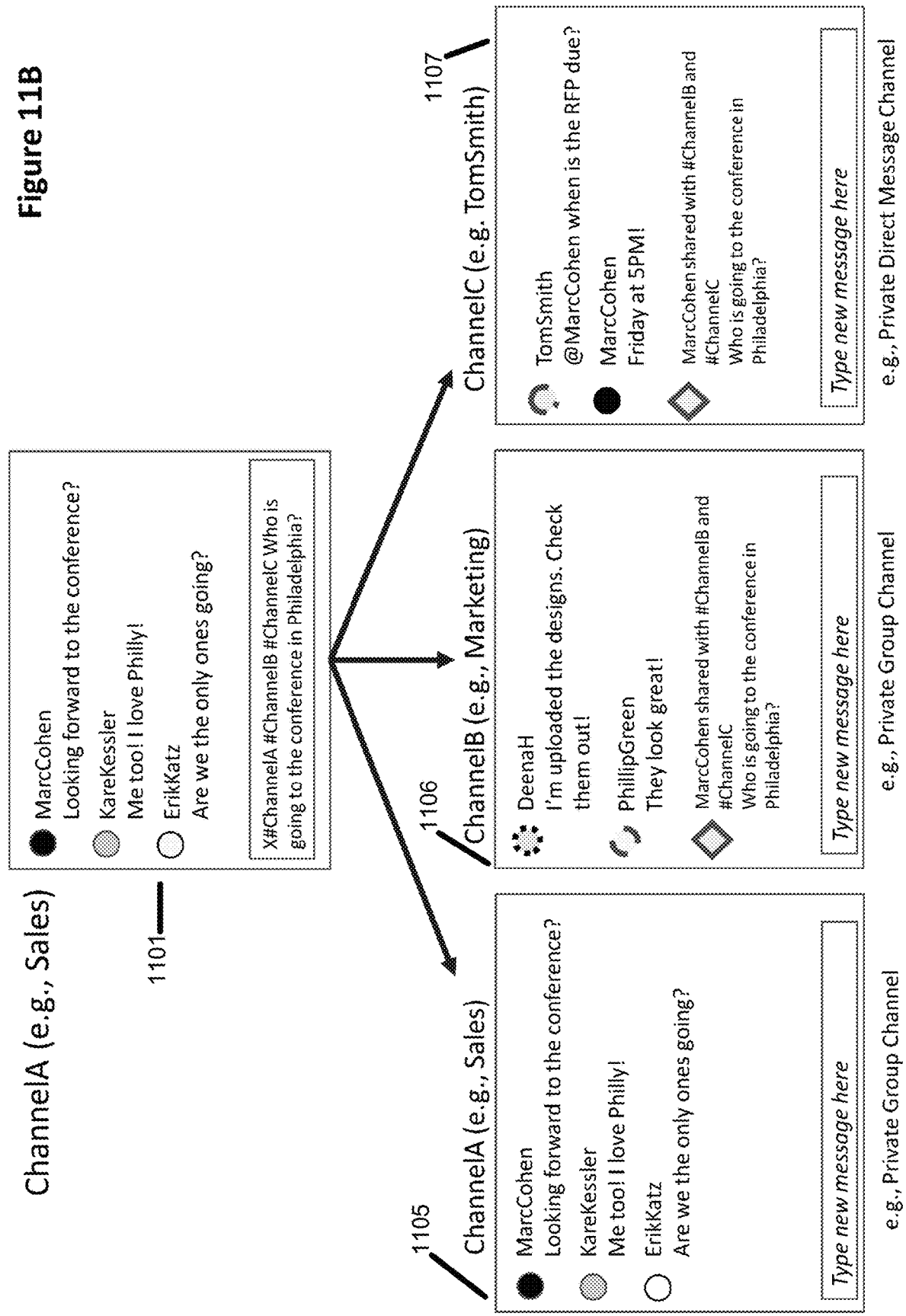

FIG. 11B illustrates screenshots that relate to a further exemplary embodiment of the present invention. In this exemplary embodiment, a participant to message exchange has sent a message to more than one channel; however, the message is excluded from display in the channel in which the message was posted.

Again, screenshot 1101 illustrates three participants that are participating in messaging within exemplary channel A. Participant MarcCohen has entered a message in the text entry bar. Although MarcCohen is currently viewing messages in channel A, the message that he has entered into the text entry bar will not be visible in channel A after that message is sent. However, that message will be visible in channel B and channel C. Screenshot 1105 shows channel A after the message has been sent by MarcCohen. As illustrated in screenshot 1105, the message that was just sent is not being displayed. However, as shown in screenshot 1106 which is a screenshot of channel B, the message that was just sent from channel A now appears in channel B. Furthermore, as shown in screenshot 1107, the message that was sent in channel A now appears in channel C.

FIG. 11C illustrates screenshots of an exemplary embodiment of the present invention in which, after a message is received in a channel, a reply to that message is permitted. Again, screenshot 1101 illustrates that participant MarcCohen has entered a message in the text entry bar. That message is then displayed in channel A as shown by screenshot 1108, channel B as shown by screenshot 1109, and channel C as shown by screenshot 1110. In particular, in each of the screenshots 1108, 1109, and 1110, the message that was previously sent appears with the word REPLY underneath the message to indicate that a reply to the message is permitted.

In a further exemplary embodiment, the word REPLY may be selectable. For example, interacting (clicking) on the word REPLY initiates a REPLY process.

Figure 11D:
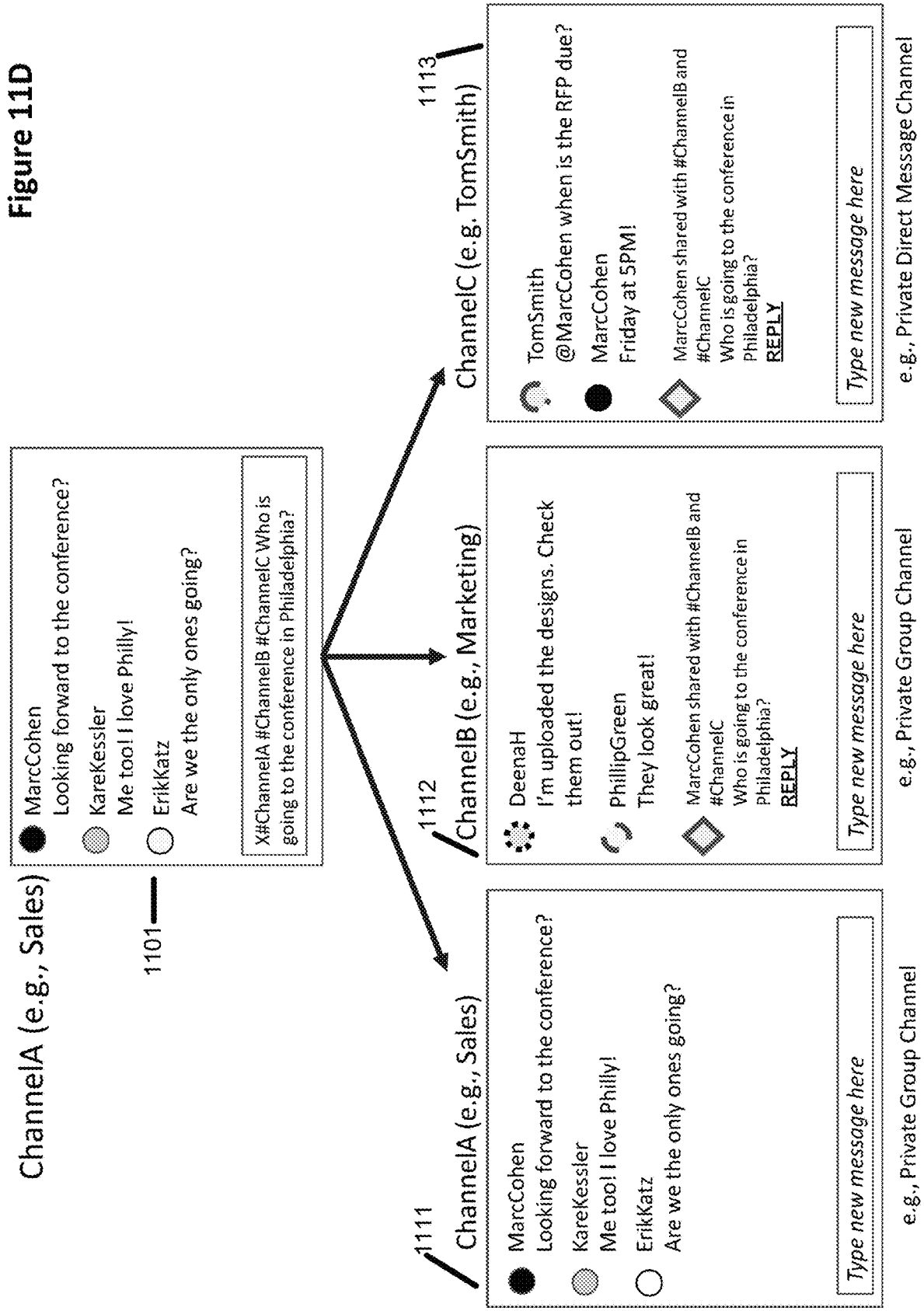

FIG. 11D illustrates further screenshots in accordance with a further exemplary embodiment of the present invention in which the channel from which a message has been sent is excluded from displaying that message while other channels are permitted to display that message. Again, screenshot 1101 illustrates that MarcCohen has entered the message into the text entry bar. As shown, channel B and channel C are to receive the message. Furthermore, in this exemplary embodiment, channel A is not to receive the message. Thus, as shown in screenshot 1111, the message that was just sent as shown in screenshot 1101 does not appear in channel A. However, the message that was sent in channel A does appear in channel B and channel C as shown by screenshots 1112 and 1113 respectively. Furthermore, the message that is being displayed in channel B and channel C can be replied to. It is understood that the message that was received in channel B and channel C can be replied to because in each of channel B and channel C the word REPLY appears below the message that was received.

Thus, in this exemplary embodiment, the message is removed/deleted from originating [channel A] by inserting an "X" character before the "#"[channelname]. Other instructions can be included to specify or exclude the visibility of a post within a channel or channels for example [#ChannelB/+Fred and +Wilma] could instruct the system to include just two specified users in channel B. In some exemplary embodiments a cross channel post may, by default, exclude all but the cross channel message poster while in other embodiments, the cross channel post may, by default, be visible to everyone in the channel. Further [default] variation could be applied, for example, to include or exclude a subset of users within specified channels.

FIG. 12A-FIG. 12E illustrate a further exemplary embodiment of the present invention in which a message can be quickly and easily moved from one channel to another. For example, a message that is in channel A can be moved into channel B. Furthermore, a message that is in channel B can be moved into channel A. In this example, a message is deleted in the Sales channel; copied and posted into a different channel. A message can be quickly and easily moved from channel A to channel B (or to Channel B and Channel (n) i.e. more than one channel).

Figure 12B:
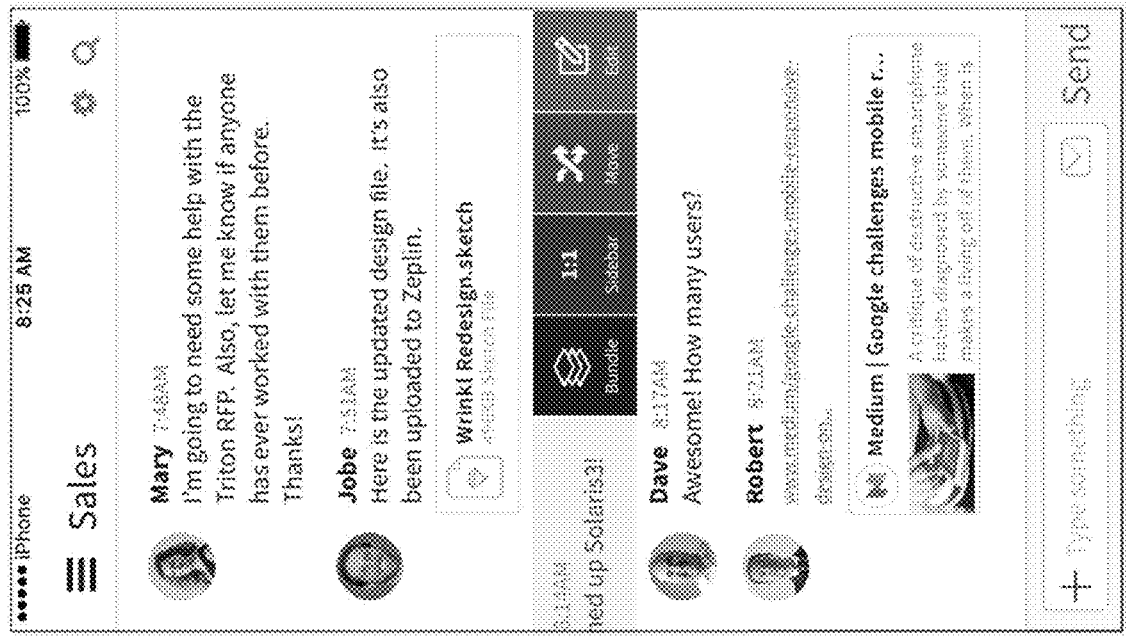
Figure 12A:
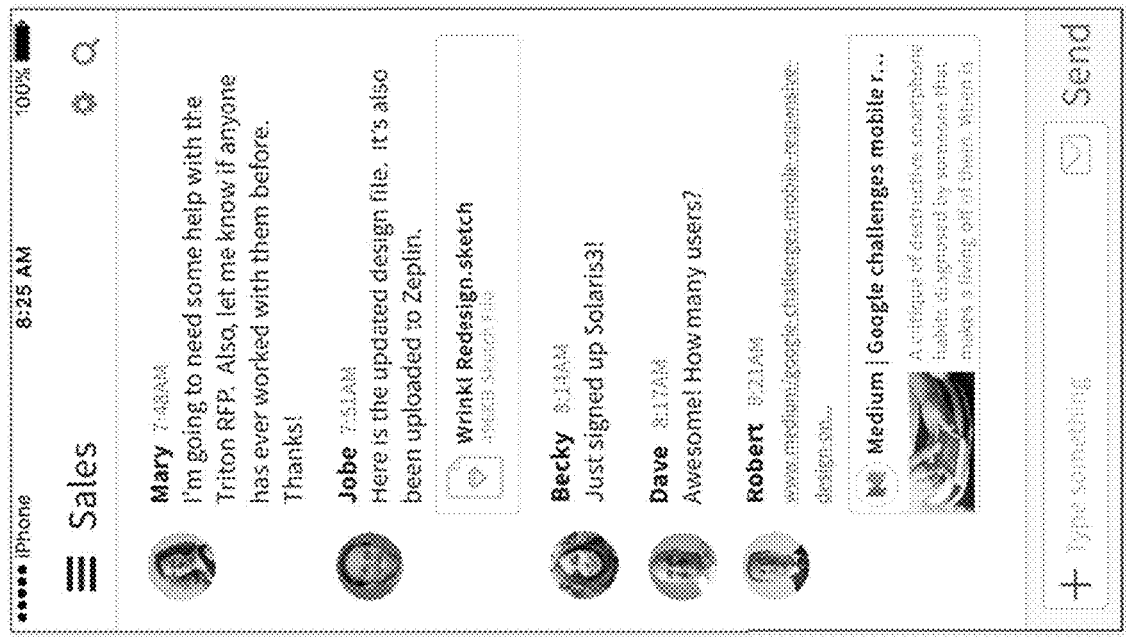

FIG. 12A is a screenshot that illustrates a plurality of messages that have been exchanged in channel SALES. Assume that a participant of the messaging shown in FIG. 12A wishes to move the message from Becky ("Just signed up Solaris3!"). One way to move this message is by using a finger to make a left swipe of that message. As shown in the screenshot illustrated in FIG. 12B, as a result of that swipe, the menu option MOVE appears. After that menu option is selected, processing can proceed to the screenshot shown in FIG. 12C.

In FIG. 12C, the destination of the message selected FIG. 12B is selected. In this example, the message can be moved to one or more other channels. Furthermore, the message can be removed from the current channel or alternatively simply copied to an additional channel or channels.

FIG. 12D illustrates a screenshot of an exemplary embodiment of the present invention in which the fact that a message has been moved is indicated in the channel. This feature is optional.

Figure 12E:
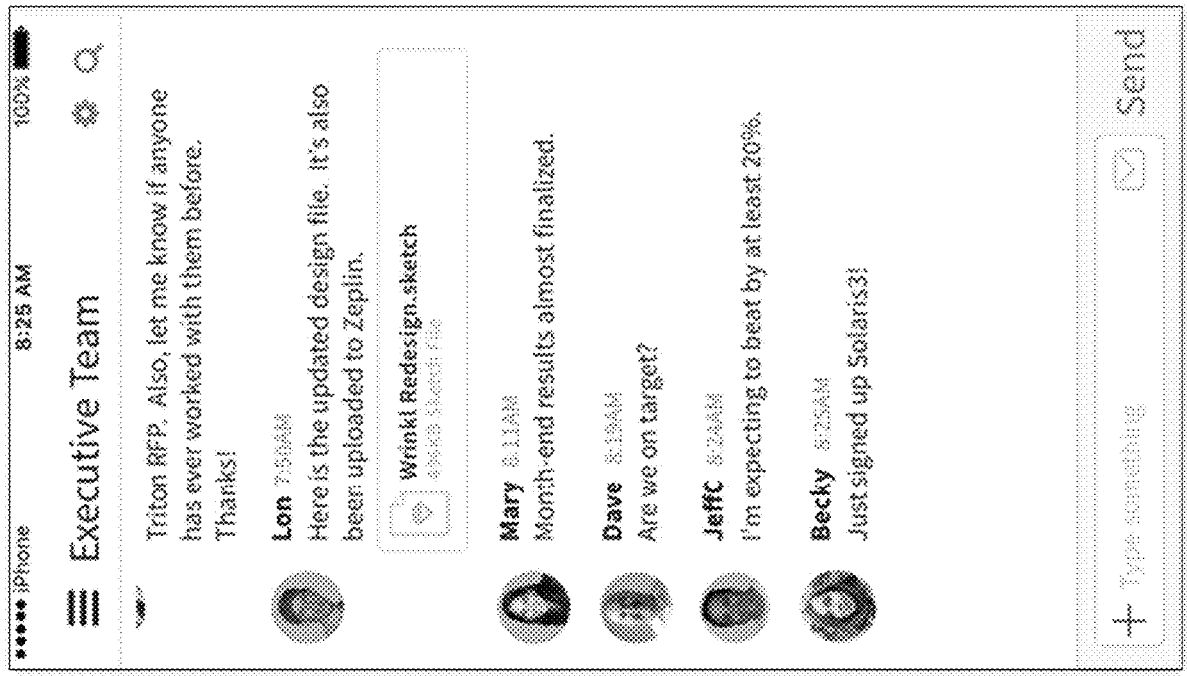

FIG. 12E is a screenshot of a different channel than what was shown in the previous figures, namely channel EXECUTIVE TEAM. As shown in FIG. 12E, the message has been moved and a timestamp is updated to reflect date and time the message was moved. The moved message could retain original metadata, update, add to or replace it. In this example the message Becky's 8:14 AM post was deleted from the Sales channel and moved into the Executive Team channel. The time that the message was originally posted in the Sales channel was replaced with the time the message was moved in the Executive Team channel.

FIG. 13A through FIG. 13I are screenshots that illustrate a further exemplary embodiment of the present invention. In particular, the screenshots illustrate the ability to bundle together multiple messages. In one exemplary embodiment, the multiple messages are bundled together from across respectively different channels.

Figure 13A:
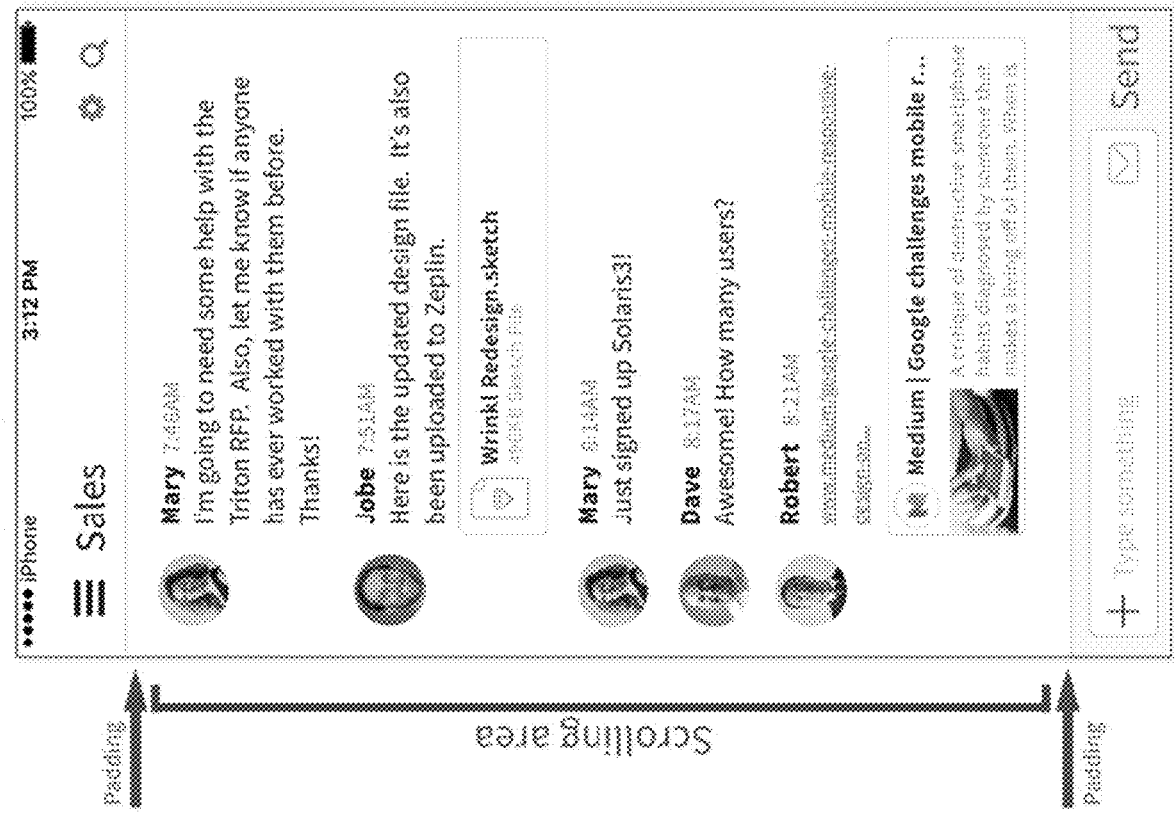
FIGS. 13A-13I are screenshots that illustrate one or more exemplary embodiments of the present invention.

FIG. 13A is a screenshot that illustrates a plurality of participants that are exchanging messages in channel SALES.

Figure 13B:
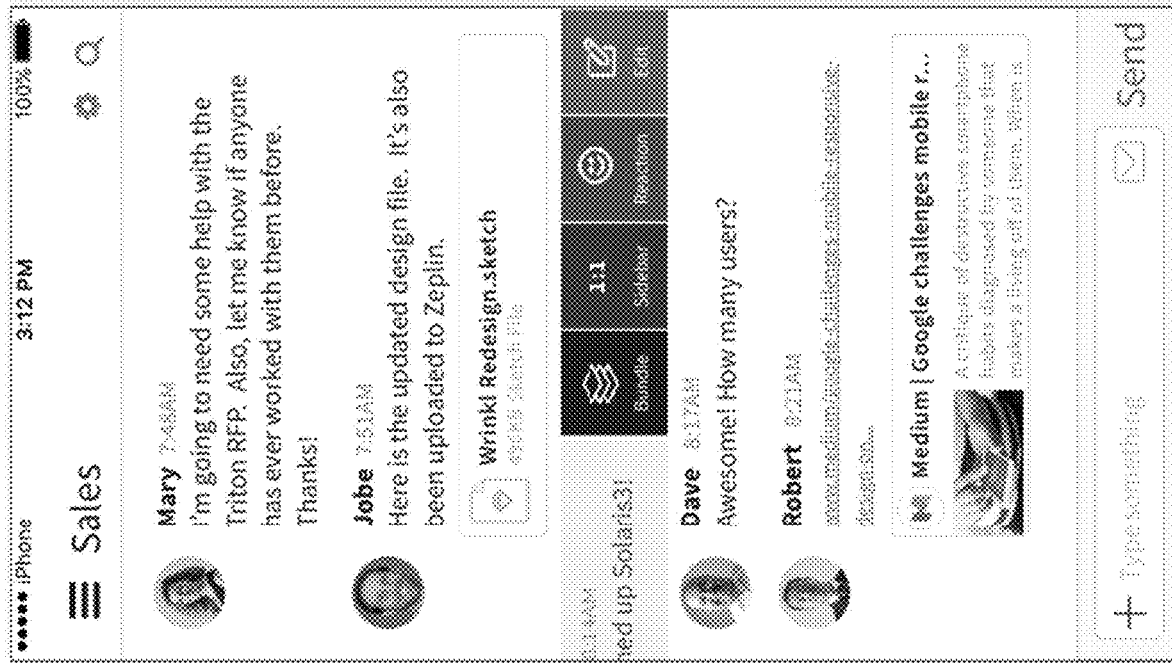

FIG. 13B illustrates how a plurality of messages may be bundled together. FIG. 13B illustrates one exemplary embodiment. It is understood to one of ordinary skill in the art that there may be other methods of bundling together multiple messages.

In FIG. 13B, the message has been selected by using the left swipe. The message that was selected is the message from Mary ("Just signed up Solaris3!"). By making a left swipe, the menu button BUNDLE appears. By selecting the BUNDLE button, the message from Mary is selected as one of the messages that the bundled together with other messages. While a swipe was described as a method of selecting the message, the message can be selected in other ways. For example, a long press may be used, a verbal command may be used, or another method of selection may be used. In any event, by selecting the BUNDLE option, the bundled creation process is initiated. Note that a "bundle" may include one message. In an exemplary embodiment, a bundle contains zero messages (i.e. the bundle is analogous to an empty file folder).

Figure 13C:
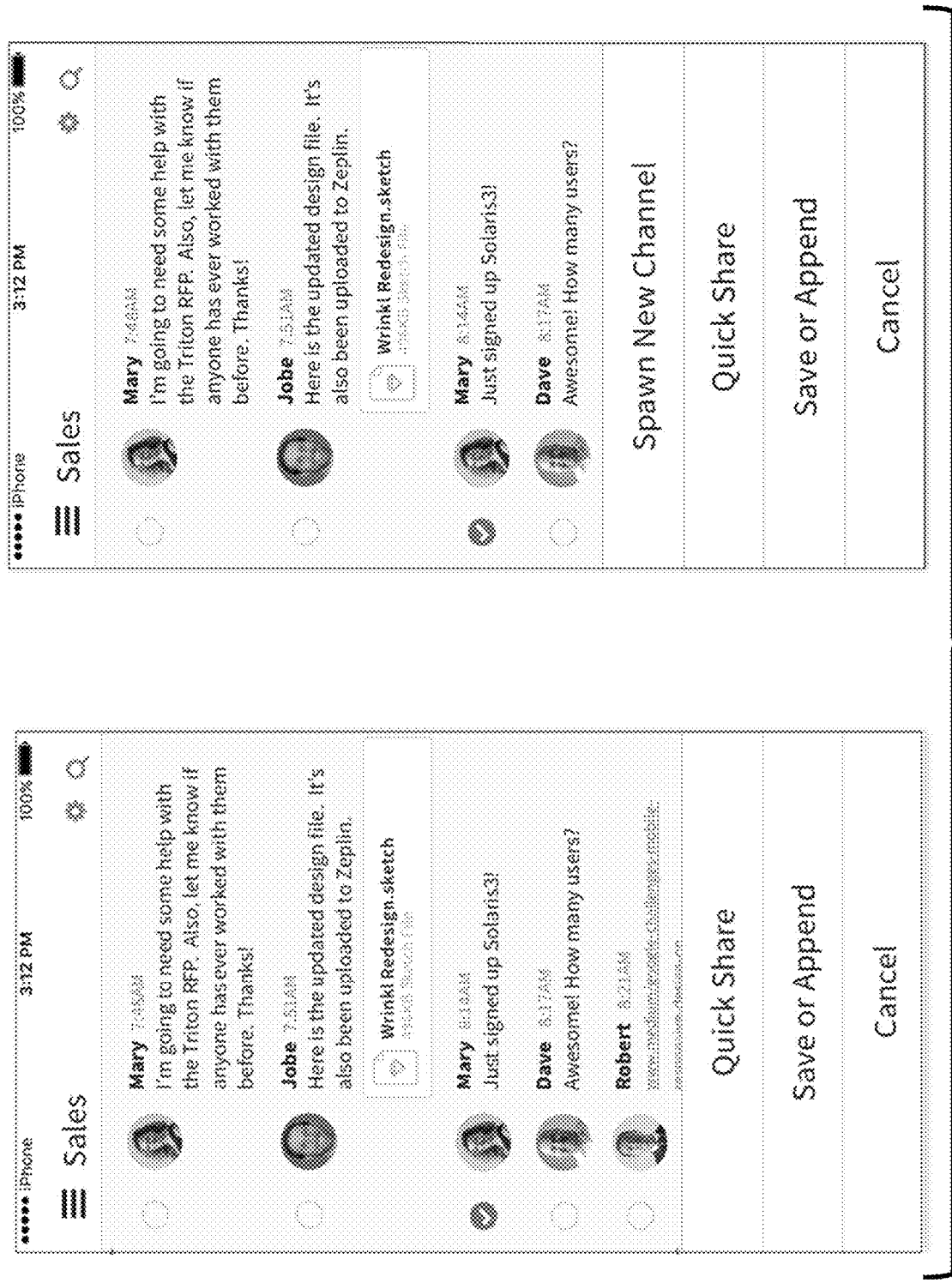

FIG. 13C illustrates an exemplary method of message selection so that a plurality of messages can be bundled together. In this exemplary embodiment, circle checkboxes are presented and the user taps an empty circle to indicate selection of a message to be included in the bundle. Alternatively, a user can tap a circle again to deselect a previously selected message. In other exemplary embodiments, the message itself could be tapped/selected and the background color could change. Additionally, a method could be provided to select a range of consecutive messages, or other forms of selection may be permitted. For example, a particular word in a message is tapped resulting in all the messages in the channel containing that word being selected (in this example, the selected messages would not necessarily be consecutive)].

FIG. 13C also illustrates an alternative design that provides an additional option of allowing a user to spawn a new channel directly. The user identifies the messages from the one or more channels and then selects SPAWN NEW CHANNEL. In this example, a new channel would be created that initially contains the selected messages. Thus, a method of message selection is provided. In this example, a circle check is presented and the user taps an empty circle to indicate selection of a message to be included in the Bundle, or can tap again to deselect a previously selected message. In other exemplary embodiments, the message itself could be tapped/selected and the background color could change. Additionally, a method could be provided to select a range of messages. In one example, the range may relate to consecutive messages.

FIG. 13C illustrates an additional option of allowing a user to spawn a new channel directly. The user identifies the messages from the one or more channels and selects "Spawn New Channel." If selected, a dialog is presented asking the user to Name the New Channel. In this example, a new channel is created that initially contains the selected messages.

In a further example, when spawning a new channel from a bundle, the selected messages could remain in the channel or channels from which they were selected or alternatively, the selected messages could be removed from the channels from which they were selected and posted exclusively to the newly created channel.

Figure 13D:

FIG. 13D is a screenshot that illustrates a screen that allows a user to select which channels are to receive the bundled messages. This screen may be accessed, for example, by selecting the QUICK SHARE menu option that appears in FIG. 13C. Then, as shown in FIG. 13D, one or more channels can be selected to receive bundled messages. In an exemplary embodiment, the QUICK SHARE button may be inactive unless one or more channels are selected.

Figure 13E:
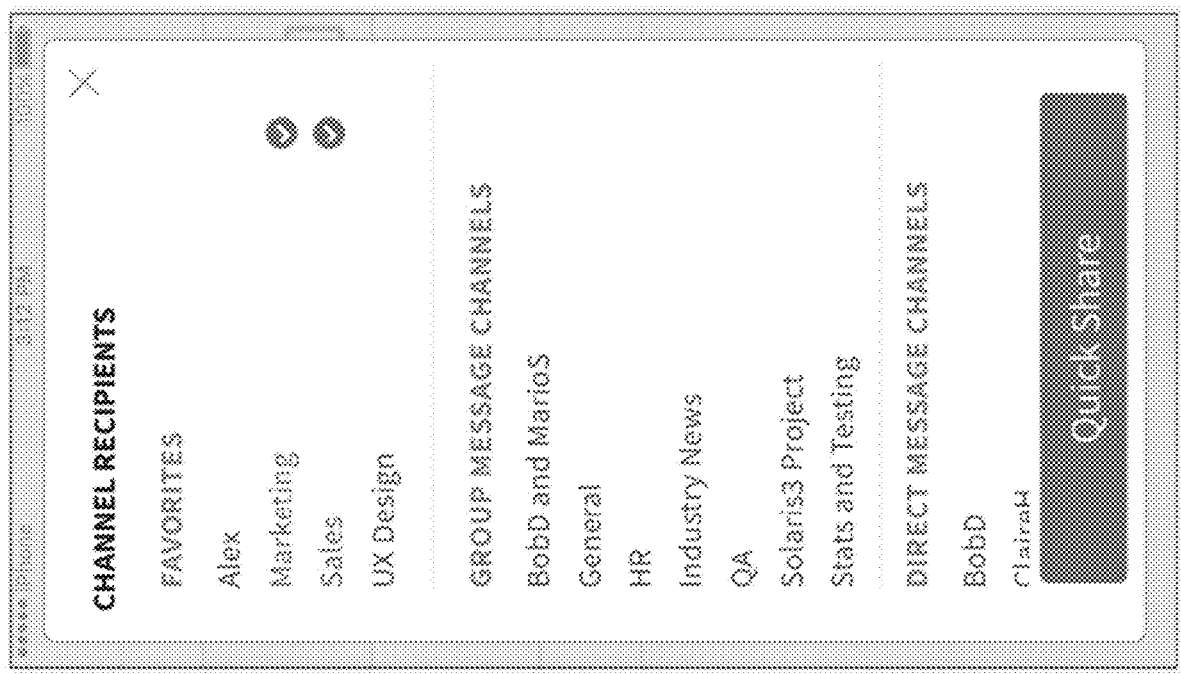

As illustrated in FIG. 13E, bundle messages can be shared in parallel across channels. Bundles messages can optionally in place of, or in addition, be sent to additional recipients, for example via email, SMS, text, etc.

Figure 13F:

In FIG. 13F, after a plurality of messages have been selected, and those messages have been bundled together, the bundle of messages can then be saved. In the example shown in FIG. 13F, the bundle of messages can be saved as follows. First, the bundle of messages can be saved as a new bundle with a unique name. Second, and/or as an alternative, the bundle of messages can be appended to a previously saved bundle of messages.

Figure 13G:
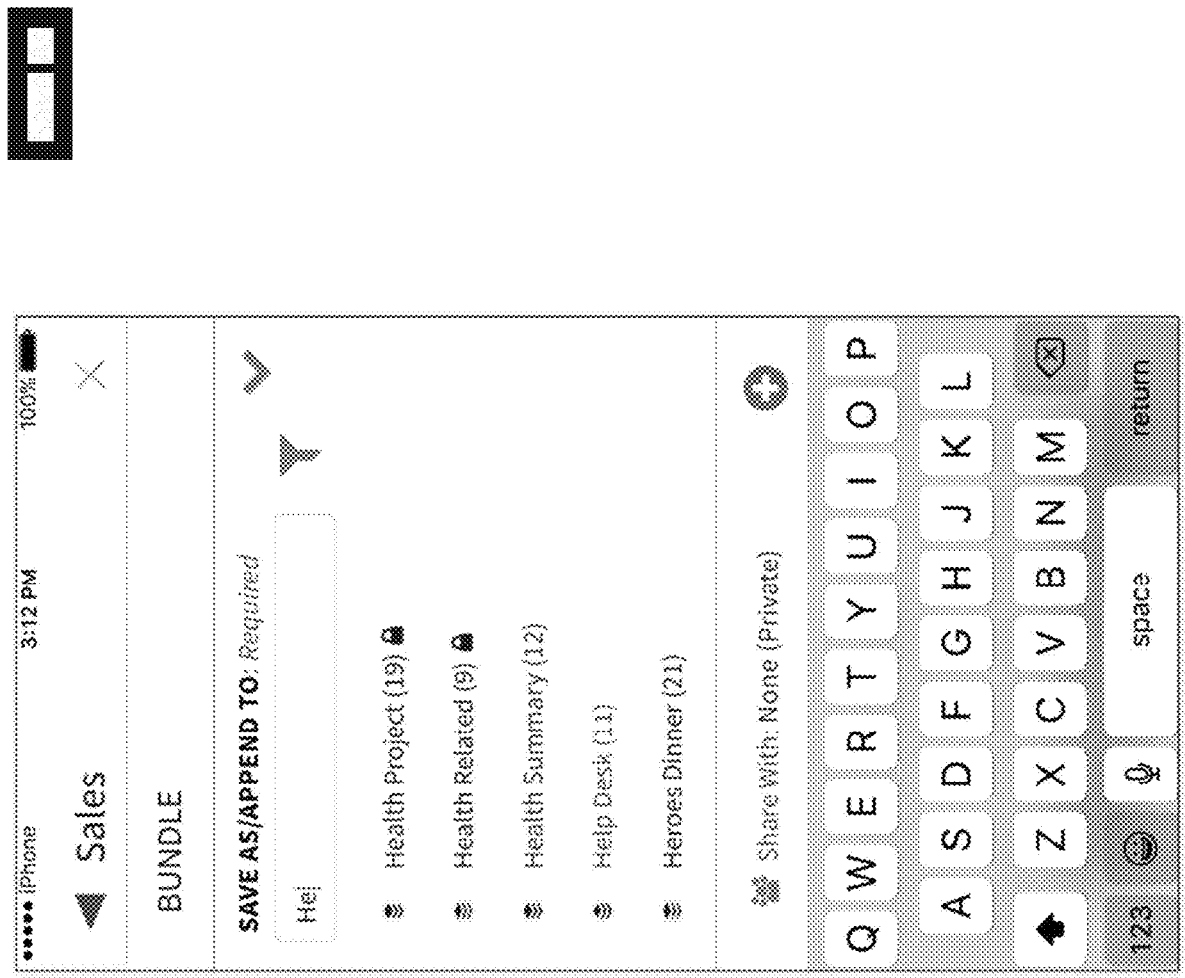

FIG. 13G further illustrates a screenshot of the software that allows a bundle of messages to be newly named or to be appended to a previously named bundle of messages. In FIG. 13G, text entry of the name of the bundle of messages currently being saved occurs. As the name of a bundle is entered using text, matches to that name appear. In this manner, it is possible to see the current names of existing bundles and to decide if a plurality of messages that have just been bundled should be appended to a previously created bundle of messages. Alternatively, if the name of the bundle that is being entered using text does not match any previously named bundle of messages, then the bundle of messages is assumed to be a new bundle of messages and the new bundle is created with the new name that has just been entered.

Figure 13H:
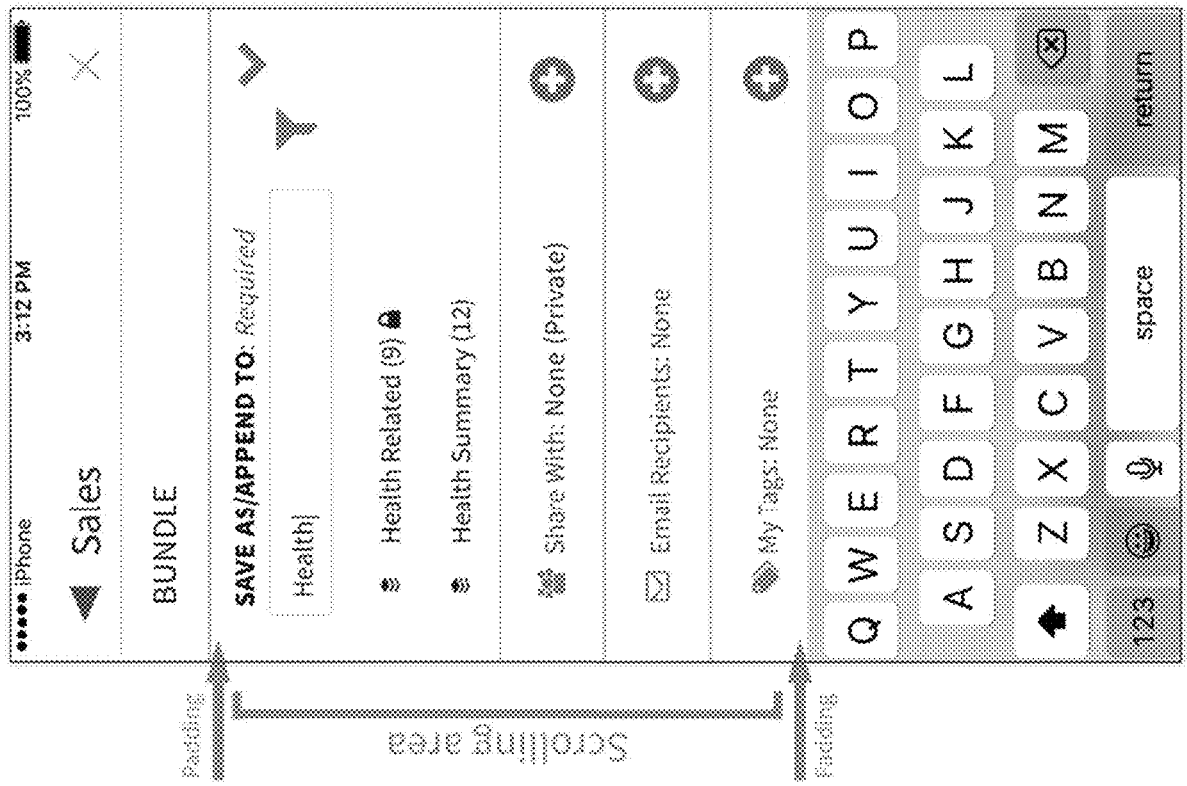

FIG. 13H is a further screenshot that illustrates creating a bundle. If the user presses return (and if the text entered is not an exact match to an existing bundle name) then this is treated as a Save As, meaning that this is treated as the formation of a new bundle of messages with a new name. Thus, as shown, a user may enter text. If the user enters "health" for example, the results will include all the bundle names that include the character string "health".

A user may wish to name a bundle something that is a subset of an existing bundle name. As soon as the user begins typing, the user will see a list of all existing bundles that incorporate the typed character sequence, however it is possible that the user wishes to name a New Bundle something that happens to be a subset of an existing named bundle. This example shows that the user has the option of pressing "enter" in which case a new bundled named "health" is created where the user could On any of the existing bundles in the list that contain the text "health" in which case the selected bundle will be appended.

Figure 13I:
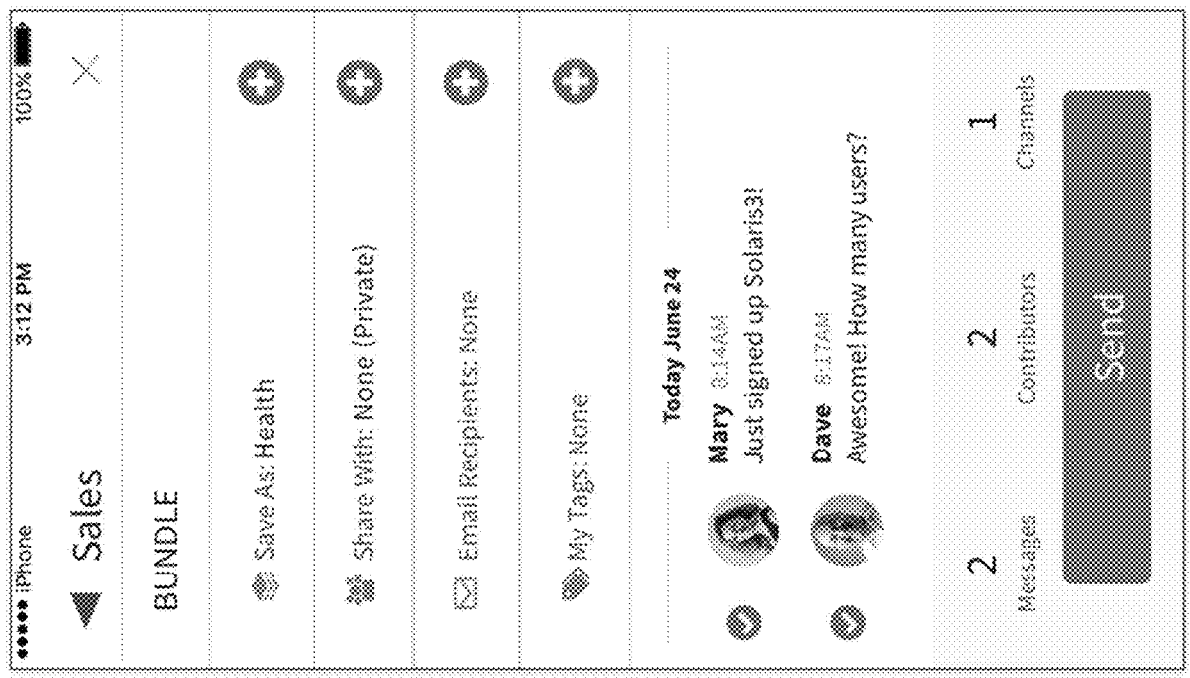

FIG. 13I is a screenshot that illustrates an exemplary Save As operation, namely the case where a new bundle of messages created in newly named. In order to complete the save, the "SEND" button, for example, may be selected.

FIGS. 14A through 14F are screenshots that illustrate the creation of a bundle across more than one channel.

Figure 14B:
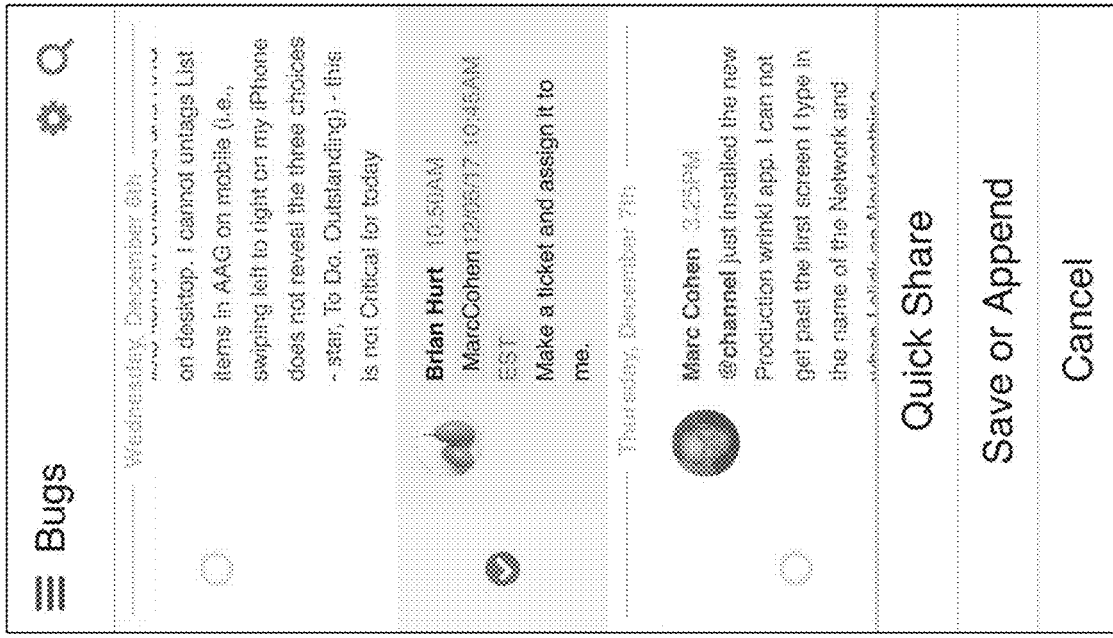
FIGS. 14A-14F are screenshots that illustrate one or more exemplary embodiments of the present invention.
Figure 14A:
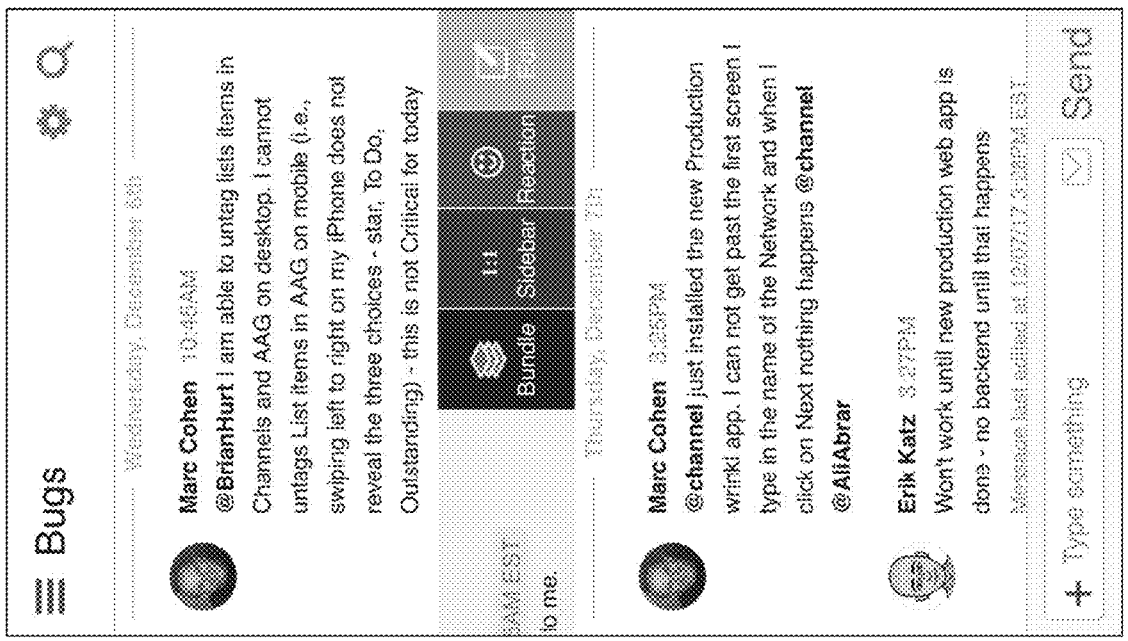

As shown in FIG. 14A, a user has initiated the Create a Bundle process from within the BUGS channel.

As shown in the screenshot that appears in FIG. 14B, the user has selected a message (in this case from Brian Hurt) that the user would like included in the bundle. Next, the user taps on the "hamburger" icon (in this example) to return to the navigation pane in order to select messages from a further channel. This operation is merely exemplary as many other methods of switching channels can be implemented.

Figure 14C:
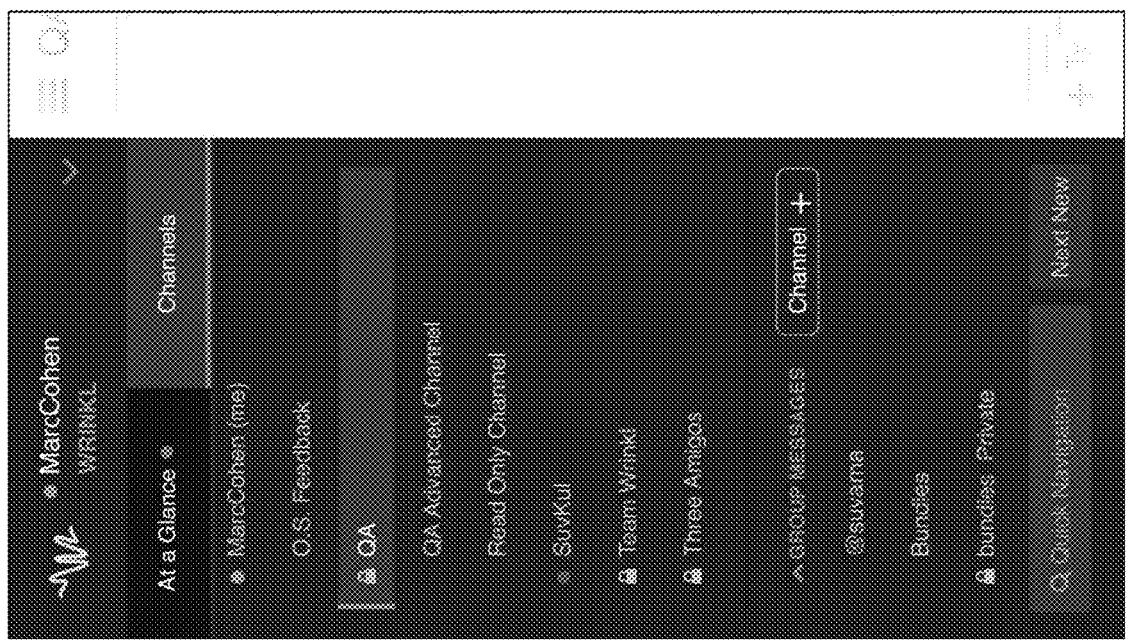

FIG. 14C is a screenshot that illustrates a user switching to a $2^{nd}$ channel. The user can repeat this process in order to select multiple additional channels from which messages are added to a bundle. Thus, in FIG. 14C, the user has elected to switch to the QA channel to identify and select additional messages to add to the bundle.

Figure 14E:
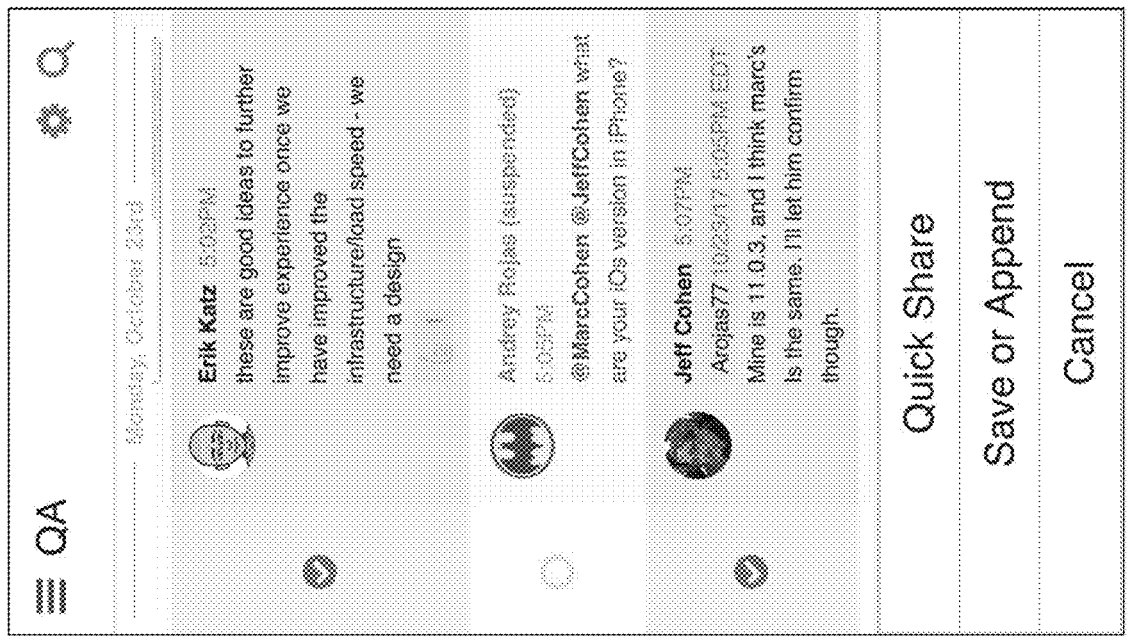
Figure 14D:
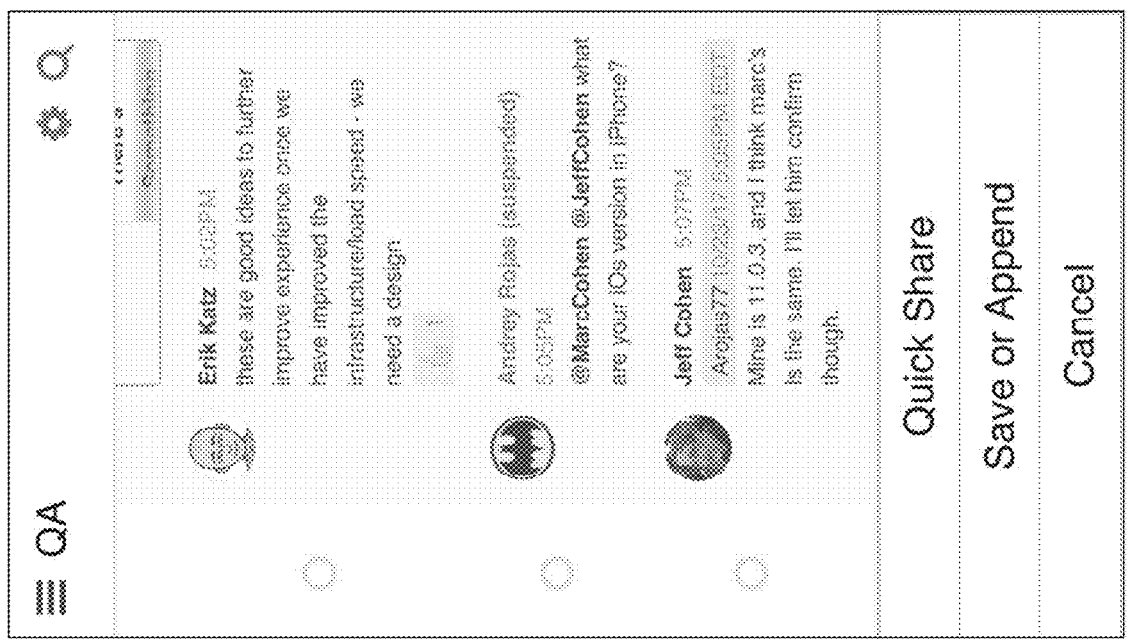

FIG. 14D is a further screenshot that illustrates in one exemplary embodiment how a user might review messages for inclusion in a bundle.

FIG. 14E is a screenshot that shows that a user has selected messages from a $2^{nd}$ channel to add to a bundle.

Figure 14F:
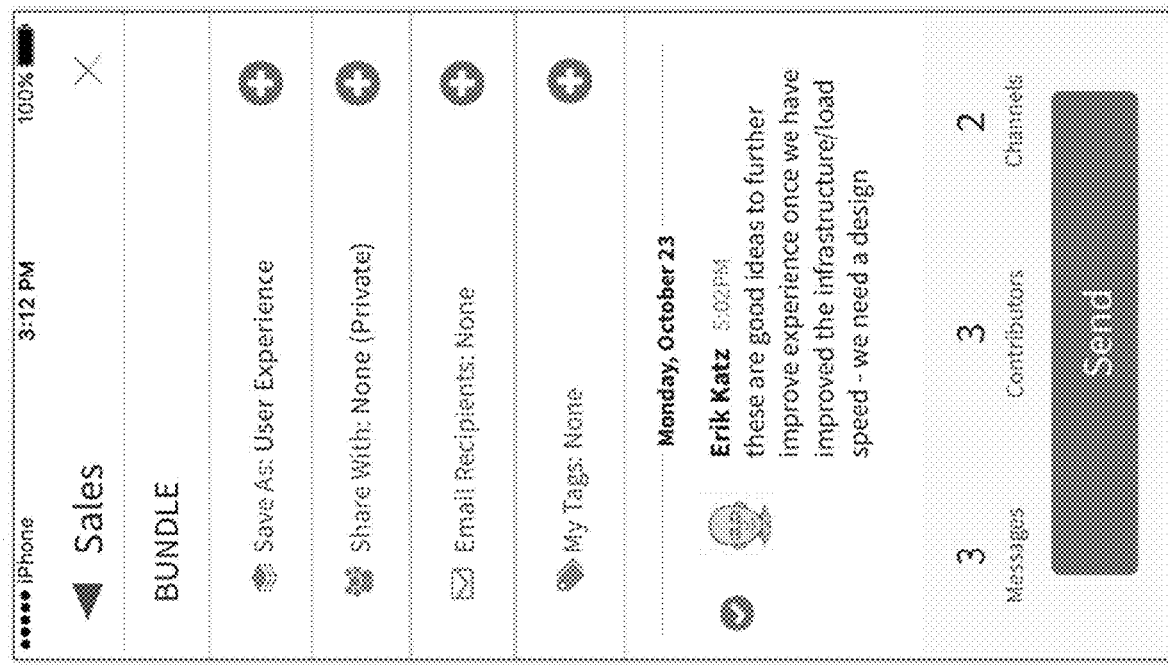

FIG. 14F is a screenshot that illustrates saving of a bundle. In this exemplary embodiment, the bundle is comprised of messages from multiple discrete channels.

Figure 15A:
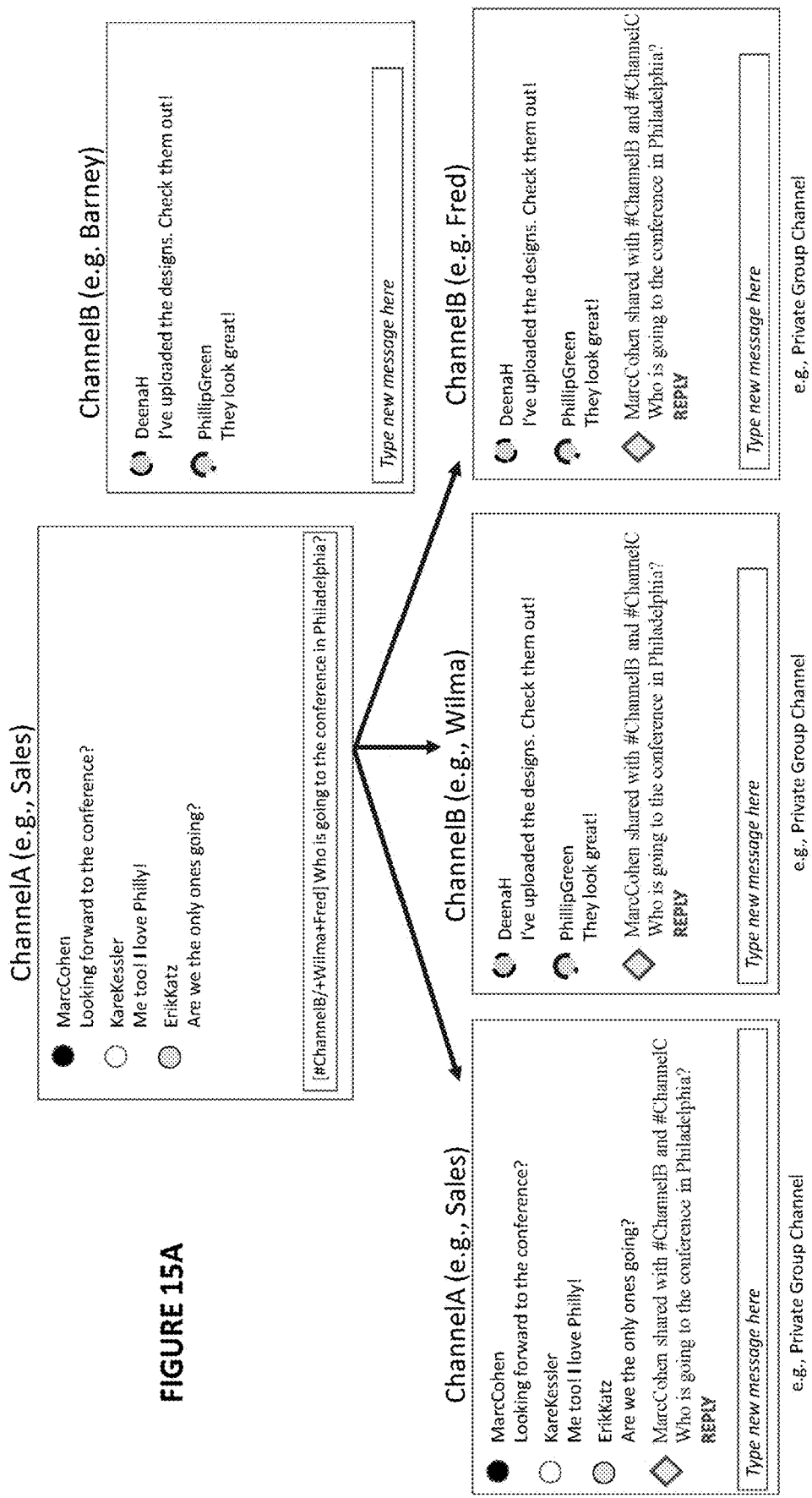
FIG. 15A is a screenshot that illustrates one or more exemplary embodiments of the present invention.

FIG. 15A is a screen shot that illustrates a further exemplary embodiment of the present invention. User 1 (Marc-Cohen) posts a message which is sent and posted in parallel to more than one channel, but excludes the channel in which the message was posted. Replies are permitted. This exemplary embodiment shows the message is posted in the originating channel and is also posted to but excludes at least another one of a plurality of users within said another channel.

Figure 15B:
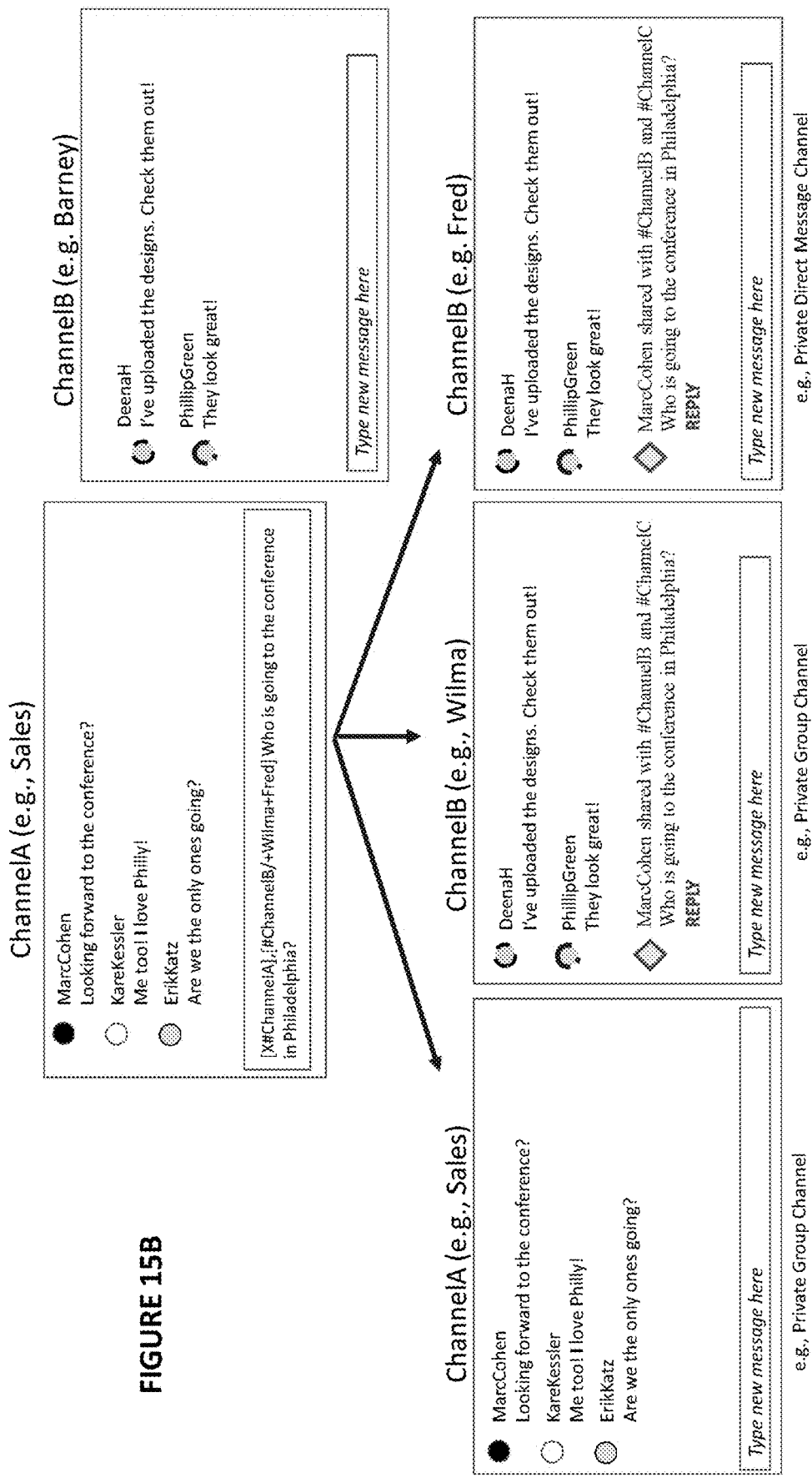
FIG. 15B is a screenshot that illustrates one or more exemplary embodiments of the present invention.

FIG. 15B is a screen shot that illustrates a further exemplary embodiment of the present invention. User 1 (Marc-Cohen) posts a message which is sent and posted in parallel to more than one channel, but excludes the channel in which the message was posted. This exemplary embodiment shows the message is removed/deleted from originating [ChannelA] and posted to an excluded at least another one of a plurality of users within said another channel [#ChannelB/+Fred and +Wilma].

FIGS. 16A-16D illustrate further exemplary embodiments of the present invention. Note that in each of the screens shown in FIGS. 16A-16D, the user is "in", i.e. viewing and/or posting messages in an isolated group. In these exemplary embodiments, the channel is named "Three Amigos."

Note in these exemplary embodiments is it possible that the text entry bar is independent of any specific channel until the message is posted—i.e. a user could type a message, switch channels and then post, in which case the channel that the user is in is not known/established until the message is "sent."

Figures 16A, 16B:

FIG. 16A thus shows an exemplary screenshot. Subsequently, in the example shown in FIG. 16B, typing "#" reveals a menu that displays channel names. The menu can be, for example, a single inclusive channel "pick-list" or can be, for example, a refined list based on the user input. In the example shown, as the user continues to type, the list is refined based on the user's input. At any time, the user may select or enter one [or more] channel names (e.g., group channel or direct message channel names). This step can be repeated if/as necessary or desired.

Figures 16C, 16D:
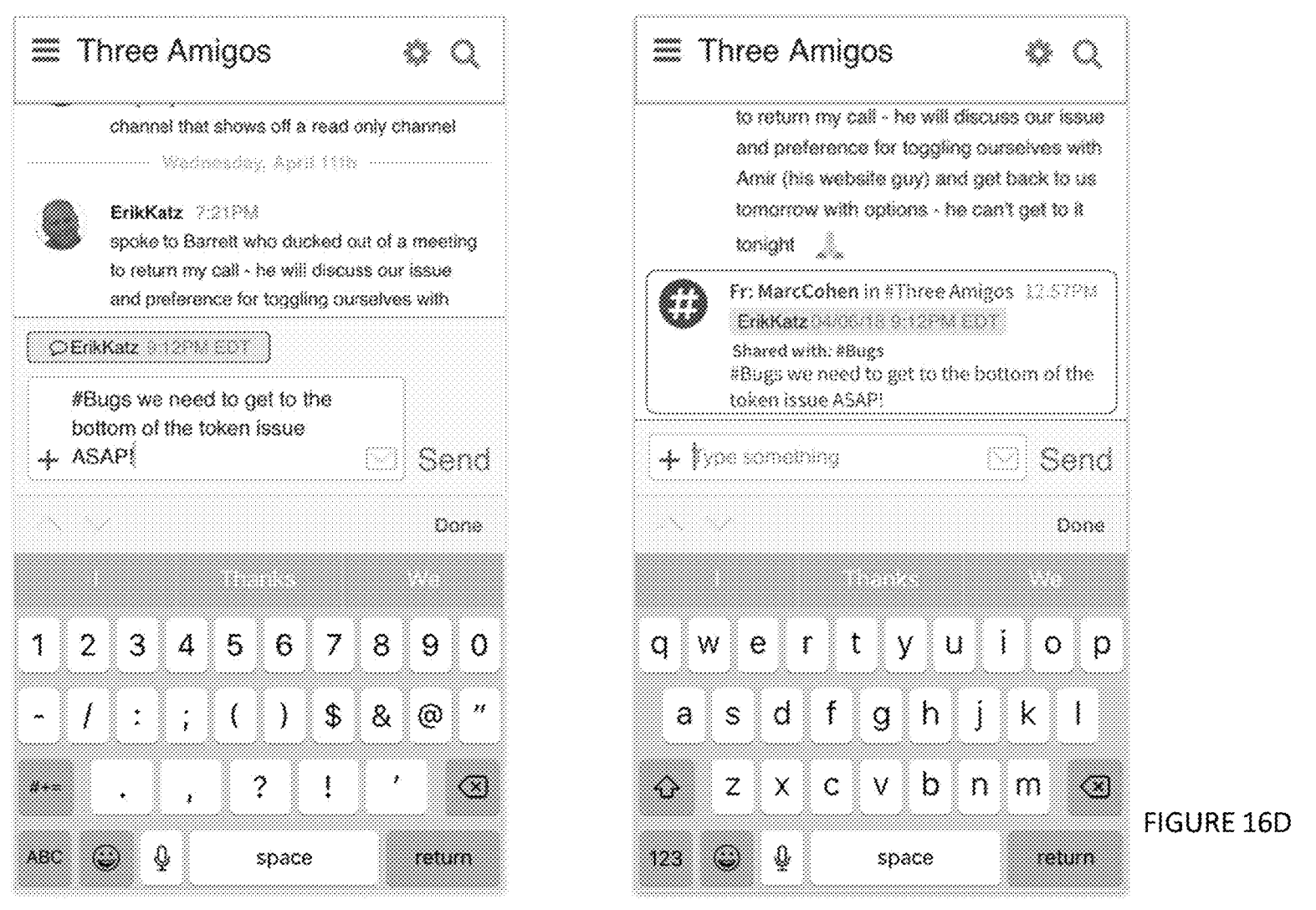

In the example shown in FIG. 16C, a "reference object" happens to be included and shown. In this example, the hash-mentioned message being crafted will be linked to and will reference an earlier message that appeared in this channel.

In the example shown in FIG. 16D, the screen shows the posted hash mention message along with the reference object. The posted messages may or may not include information that conveys supplemental data such as the names of other channels that the message has been shared with (sent to). The supplemental data can be different based upon who is viewing the message and in which channel it is being reviewed (i.e., the circumstances under which the message is being seen). For example, a message sent from channel 1 to channel 2 may, for some subscribers, display the name of the "from" channel, but in other cases hide the name of channel [1] and instead merely display "private channel" (or not include the from channel name at all).

Figures 17A, 17B:
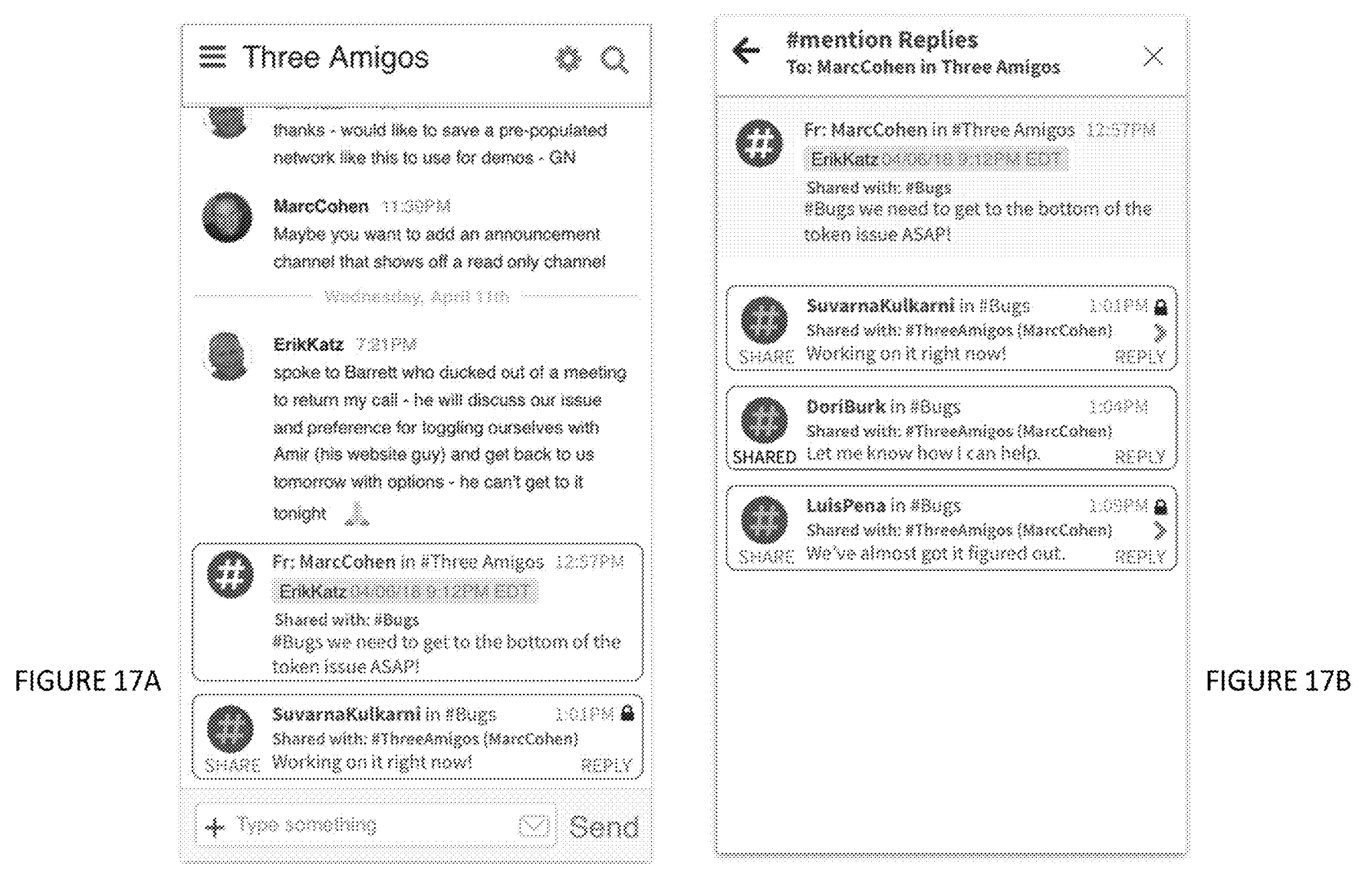

FIGS. 17A and 17B illustrate further exemplary embodiments of the present invention.

Referring to FIG. 17A, in one exemplary embodiment of the present invention, replies to a hash mention from users in another channel can be presented first (and only) to the creator of the original message post in the original channel from which the hash mention was sent. In this example the reply is kept private unless and until the original sender of the original message has decided to share the reply (all or in part) with others (or some) in the original channel.

Furthermore, in one exemplary embodiment of the present invention, replies to a hash mention from a user from another channel are shown to all without further intervention on the part of the original sender (for example, automatically shared).

In the example shown in FIG. 17A, in the penultimate message, an indication is provided that the message was sent from the present channel. The indication may be in the form of the color of the hashtag sign, for example. In the last message, an indication is provided that the message was sent from a channel other than the present channel. Again, the indication may be in the form of the color of the hashtag sign. Referring again to the last message, this response message remains "private" and visible only to the creator of the message that spawned this response message unless/or until shared (in whole or in part) with at least one other of the plurality of users in this [and/or other] channel/s.

In the example shown in FIG. 17B, in one exemplary embodiment of the present invention, replies to a hash mention from users in another channel can be aggregated and presented together to the creator of the original message post in the original channel from which the hash mention was sent. In this example the reply/replies is/are kept private unless and until the original sender of the original message has decided to share a reply (all or in part) with others (or some) in the original channel. The views depicted in FIGS. 17A and 17B can be combined or implemented separately or exclusively. Furthermore, in one exemplary embodiment of the present invention, the sender or any person with which the hash mention reply has been shared, can further reply, which reply can be shared with all or a subset of others who have received the initial hash message post and/or a subsequent reply.

In further exemplary embodiments, the aggregated messages and replies may be visible to others of the plurality of users in others of the plurality of channels.

Figure 18B:
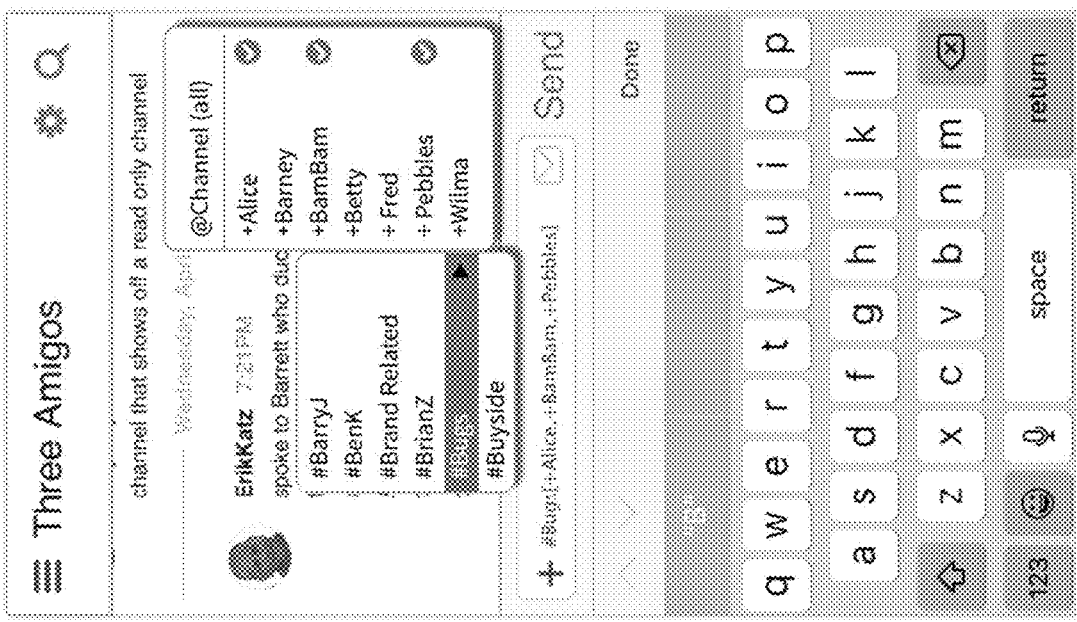
FIGS. 18A-18B are screenshots that illustrate one or more exemplary embodiments of the present invention.
Figure 18A:
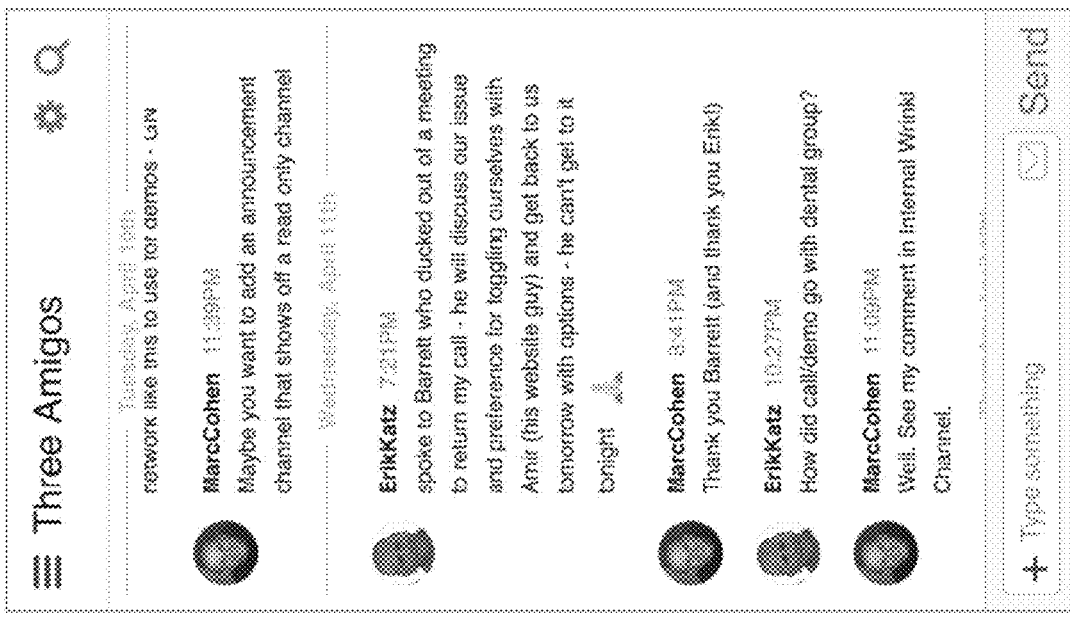

FIGS. 18A and 18B illustrate a further exemplary embodiment of the present invention. In the exemplary embodiment shown in these figures, a special character (e.g., "#") is used to indicate to the system that a cross channel post may be desired. In response to "seeing" the special character, the system makes available a list of channels [that can be further refined as the user continues typing, which serves to hone the list of matches. Sometimes, a "#" is just a "#" so while possible to apply the hash mention functionality it is not required. It is important to note that the specific character is not important (i.e., it could be a "#" a "|" an "S" or any other character or means to indicate the channel name or specific person/people within a specific channel combined with the fact that a cross channel is desired. For example, it does not have to be a character at all, it could be a verbal command, or selection of a prompt or icon.

A method of providing display of exchanged messages, comprises the steps of: providing display of messages exchanged between a plurality of participants, said messages are exchanged within channels, wherein: each of said participants exchanges messages with others of said participants in one or more channels in which message exchange between said plurality of participants is authorized; and any of said participants are prevented from exchanging messages in one or more channels when (or in which) message exchange between said plurality of participants is not authorized; allowing one of said participants sending one of said messages in one of said channels to send said one of said messages in parallel to another one of said channels.

The above method may be performed with regard to various exemplary embodiments, as follow:
said message is entered into a text entry bar which is associated with said one of said channels so that transmission of said message results in said message being transmitted within said channel, wherein transmission of said message in said channel causes transmission of said message in said another one of said channels.
said message is entered into a text entry bar which is associated with said one of said channels so that transmission of said message results in said message being transmitted within said channel, wherein transmission of said message in said channel causes transmission of said message in said another one of said channels.
said message is modified before being transmitted to said another one of said channels.
said transmission to said one of said channels and said another of said channels is concurrent.
transmission to said one of said channels and said another of said channels is not concurrent.
another of said participants receives said one of said messages and responds with a response so that only said one of said participants receives said response.
said participants are capable of responding to said one of said messages (\*\*A\*\*).
said one of said participants receives a reply to said one of said messages while another of said participants is excluded from receiving said reply, and said one of said participants subsequently is permitted to share said reply with said another of said participants (\*\*B\*\*).
the response in \*\*B\*\* is initiated through physical interaction with a display that is displaying said messages.
responses to said one of said messages are displayed in a manner so that said responses are grouped together.
messages are copyable between said one of said channels and said another of said channels.
said one of said participants inserts one or more characters in said one of said messages to indicate that said message is to be sent in parallel to said another one of said channels.
said one of said messages is visible in said one of said channels by only said one of said participants. another of said participants receives said one of said messages and responds with a response which is sent to less than all of said plurality of participants.
said response in \*\*A\* is automatically initiated through software.
said one of said participants indicates that said message is to be sent in parallel to said another one of said channels responsive to physical action by said one of said participants.
ones of said messages from multiple channels are posted as a group to one or more of said channels (\*\*C\*\*);
said ones of the messages in \*\*C\*\* includes at last one or more responses to said one of said messages.

With regard to the exemplary embodiment described above, various technical advantages and improvements are obtained over the prior art. For example, to previously send one message in multiple channels has been a laborious process that may require multiple interactions with a computer. Such interactions may include exemplary steps such as entering a message, highlighting the message, executing a "copy" (or a "cut") of the highlighted message, manually switching to other channels so that those channels are successively active, executing a "paste" into each channel as each channel becomes active, and then subsequently performing a "send" in each successively active channel. Thus, the exemplary embodiments achieve various technical advantages including fewer keystrokes, less I/O interaction, more efficient operation, and faster execution. With less I/O interaction, a microprocessor is potentially able to perform a desired function faster and with greater efficiency. By enabling a processor to perform the above described steps, and/or with the above described structure, the possibility of creating errors is reduced. Furthermore, the ability to transmit messages to multiple channels in parallel results in better allocation of resources (which, for example, are not tied up performing I/O operations). In addition, with regard to further exemplary embodiments and optional features, a user is optionally provided with varying levels of control of messages which provides for desirable levels of customization.

The above exemplary embodiments have been with regard to one or more users posting messages in one or more channels. In one or more exemplary embodiments, a "personal post" is contemplated, i.e. a post to a group channel that is visible to the poster (i.e. the person who is posting). In the one or more exemplary embodiments, other participants from the group channel where the post occurs are excluded from seeing (or receiving) the post. In the one or more exemplary embodiments, the post is visible to the poster, and all other participants in that channel are prevented from seeing (or receiving) the post. This exemplary embodiment(s) would be a useful way for someone to add a comment at a point in time (a note to self) in context within a group channel. The post may also be a convenient way to summarize a series of earlier posts into a single simple ToDo that is then added to a ToDo list.

In one or more exemplary embodiments, a user can send a comment to him/herself (or excluding at least one of the plurality of users that has access to the channel in which the comment is sent) in a group channel. In a further exemplary embodiment a prior message in a channel may be converted into an item for a ToDo list and comments may then be added to the channel (visible only to the person who converted the item for the ToDo list). In a further exemplary embodiment, it may be possible to select a "ToDo" function (by clicking on an ADD a ToDo icon) and a text entry box may appear. In this embodiment, a note can be added to a ToDo list with or without it also being posted to the current channel being viewed.

The above exemplary embodiments have described the ability to send messages across more than one channel. In further exemplary embodiments, a message sent across multiple channels can be replied to using various methodologies. In one exemplary embodiment, a reply to a message sent across multiple channels is sent to the user that originally sent the message. In another exemplary embodiment, a reply to a message sent across multiple channels is sent to the channel from which the message was originally sent. In yet another exemplary embodiment, a reply to a message sent across multiple channels is sent to all the channels that received the message. Where the reply is sent to can be controlled in several exemplary ways. For example, where the reply will be sent can be set as a default, with the default set (for example) as a menu option. In another example, a user sending a reply is given the option to specify where the reply will be sent. Such an option may be selected prior to sending the reply. In a further example, where the reply may be sent may be controlled by the message that the user is replying to.

Additional technical advantages are achieved through exemplary embodiments of the present invention. For example, parallel channel posts enable messages to be posted once but be posted to an additional one or a combination of additional group channels and individual direct message channels. Allowing parallel channel posting reduces the common practice of manually creating or having the system automatically crate new channels for every conceivable combination of users. Not only does spawning a new channel for every conceivable combination of users create tremendous overhead, channel clutter and confusion, but creating new channels in this manner often defeats a main objective of wanting to address additional recipients in the first place, that is, the inclusion into an ongoing conversation, on a temporary basis, of one or more users who are generally excluded from the originating channel. In some cases, the recipients of a parallel channel post will have the option to reply to the post, which reply can be sent to at least the originating poster in at least the originating channel. By allowing messages to be posted in parallel, responses and input from the generally excluded users can be added into a main conversation for the principal benefit of that channel's at-that-time authorized permanent member group. In one embodiment of the present invention, replies from users from other channels are posted and visible first only to the original poster of the original parallel channel post. The poster in this case is able to review responses before deciding to share (i.e. make visible) all or part of a response with other users. In this example, the originating user is able to remain engaged and focused and in a single channel or conversation while seeking input or advice from users external to the channel.

While a non-transitory machine-readable storage medium 928 is shown in an exemplary implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the disclosure. The term "machine-readable storage medium" shall accordingly be taken to include, but not be limited to, solid-state memories, and optical and magnetic media.

Some portions of the detailed descriptions are presented in terms of algorithms and symbolic representations of operations on data bits within a computer memory. These algorithmic descriptions and representations are the means used by those skilled in the video processing arts to most effectively convey the substance of their work to others skilled in the art. An algorithm is here, and generally, conceived to be a self-consistent sequence of steps leading to a desired result. The steps are those requiring physical manipulations of physical quantities.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "receiving", "determining", "associating", "updating", "providing", "integrating", "selecting", "executing", "processing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 and 400 and/or each of its individual functions, routines, subroutines, or operations. Examples of the structure for a variety of these systems are set forth in the description above.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. Apparatus for providing display of exchanged messages, said apparatus comprising:
   a memory for storing said messages; and
   at least one processor for:
   a) providing display of said messages, wherein said messages are exchanged between a plurality of participants, said messages are exchanged within channels, said channels include a first channel with a first message stream and a second channel with a second message stream, wherein text to be included in a first of said messages is received into a text entry bar from a first of said participants a) while in said first channel, and b) after said second channel has been created, wherein a second of said participants is allowed to communicate in said first channel, and a third of said participants is allowed to communicate in said second channel;

b) receiving a designation from said first of said participants, prior to said first of said messages being transmitted in said first channel and after said second channel has been created, that said first of said messages is to be transmitted in said second channel;

c) transmitting said first of said messages i) in said first message stream in said first channel; and ii) in said second message stream in said second channel after receiving and based on said designation so that said first of said messages appears in said first message stream and said second message stream;

d) after transmitting said first of said messages in said first channel and said second channel, indicating in at least one of said first channel or said second channel that said first of said messages was transmitted in more than one of said channels; and e) allowing said second of said participants while in said first channel and said third of said participants while in said second channel to reply to said first of said messages, wherein at least one of said messages that appears in said second channel is excluded from appearing in said first channel, wherein at least one of a) said second of said participants is not included in said second channel; or b) said third of said participants is not included in said first channel, when said first of said messages is transmitted, and wherein when said designation is received in step b) for an initial occurrence in time of a plurality of chronologically different times that said designation is received, messages have already been exchanged in said second channel.

2. Apparatus according to claim 1, wherein said second of said participants receives said first of said messages and replies with a response that is visible to only said first of said participants and said second of said participants.

3. Apparatus according to claim 1, wherein replying to said first of said message is initiated through physical interaction with a display that is displaying said first of said messages.

4. Apparatus according to claim 1, wherein said second of said participants replies with a first response, a fourth of said participants replies to said first of said messages in said first channel with a second response, and wherein said first response and said second response are displayed in a manner so that said first response and said second response are grouped together in said first channel.

5. Apparatus according to claim 1, wherein said designation is performed by said first of said participants inserting one or more characters in said first of said messages to indicate that said first of said messages is to be sent to said first channel and to said second channel.

6. Apparatus according to claim 1, wherein when said second of said participants replies with a third response, said third response is visible to not all but less than all of said plurality of participants that participate in said first channel.

7. Apparatus according to claim 1, wherein said first of said participants indicates with physical action that said first of said messages is to be transmitted to ones of said channels that includes said first channel and said second channel.

8. Apparatus according to claim 1, wherein responsive to physical interaction with a screen providing said display of said messages, said first channel and said second channel are identified as having transmitted therein said first of said messages and said second of said messages.

9. Apparatus according to claim 1, wherein when said second of said participants replies with a third response to said first of said messages in said first channel, said third response is also transmitted in said second channel.

10. Apparatus according to claim 1, wherein
said second of said participants replies in said first channel with a first response,
said third of said participants replies in said second channel with a second response,
said first response is visible in said first channel and is prevented from being displayed in said second channel;
said second response is visible in said second channel and is prevented from being displayed in said first channel.

11. Apparatus according to claim 1, wherein at least one of said third of said participants is specified by said first of said participants as being authorized to receive said first of said messages; or a fourth participant included in said second channel that is not authorized to receive said first of said messages is prevented from viewing said first of said messages.

12. Apparatus according to claim 1, wherein said first of said messages is transmitted in said first channel by default.

13. Apparatus according to claim 1, wherein said first of said messages is transmitted in said first channel after said first of said participants selects said first channel for transmitting said first of said messages.

14. Apparatus according to claim 1, wherein all but said first of said participants is prevented from receiving said first of said message in said first channel.

15. Apparatus according to claim 1, wherein receiving said designation includes identifying said second channel as being where said first of said messages is to be transmitted.

16. Apparatus according to claim 1, wherein said indication is provided in said first channel and said second channel.

17. Apparatus according to claim 1, wherein prior to receiving said designation, said second channel exists, and ones of said messages that are transmitted in said first channel while said second channel exists are prohibited from appearing in said second channel, and after receiving said designation and based on said designation, said apparatus transitions from i) said ones of said messages that are transmitted in said first channel while said second channel exists being prohibited from appearing in said second channel to ii) others of said messages transmitted in said first channel while said second channel exists being permitted to appear in said second channel and are received by said third of said participants in said second channel.

18. Apparatus according to claim 1, wherein a chronologically initial message that is in said second channel is not transmitted by said first user in both said first channel and said second channel.

19. A method of providing display of exchanged messages, said method comprising the steps of:

a) providing display of said messages, wherein said messages are exchanged between a plurality of participants, said messages are exchanged within channels, said channels include a first channel with a first message stream and a second channel with a second message stream, wherein text to be included in a first of said messages is received into a text entry bar from a first of said participants a) while in said first channel, and b) after said second channel has been created, wherein a second of said participants is allowed to communicate in said first channel, and a third of said participants is allowed to communicate in said second channel;

b) receiving a designation from said first of said participants, prior to said first of said messages being transmitted in said first channel and after said second channel has been created, that said first of said messages is to be transmitted in said second channel;

c) transmitting said first of said messages i) in said first message stream in said first channel; and ii) in said second message stream in said second channel after receiving and based on said designation so that said first of said messages appears in said first message stream and said second message stream;

d) after transmitting said first of said messages in said first channel and said second channel, indicating in at least one of said first channel or said second channel that said first of said messages was transmitted in more than one of said channels; and e) allowing said second of said participants while in said first channel and said third of said participants while in said second channel to reply to said first of said messages, wherein at least one of said messages that appears in said second channel is excluded from appearing in said first channel, wherein at least one of a) said second of said participants is not included in said second channel; or b) said third of said participants is not included in said first channel, when said first of said messages is transmitted, and wherein when said designation is received in step b) for an initial occurrence in time of a plurality of chronologically different times that said designation is received, messages have already been exchanged in said second channel.

20. A method according to claim 19, wherein said second of said participants receives said first of said messages and replies with a response that is visible to only said first of said participants and said second of said participants.

21. A method according to claim 19, wherein replying to said first of said message is initiated through physical interaction with a display that is displaying said first of said messages.

22. A method according to claim 19, wherein said second of said participants replies with a first response, a fourth of said participants replies to said first of said messages in said first channel with a second response, and wherein said first response and said second response are displayed in a manner so that said first response and said second response are grouped together in said first channel.

23. A method according to claim 19, wherein said designation is performed by said first of said participants inserting one or more characters in said first of said messages to indicate that said first of said messages is to be sent to said first channel and to said second channel.

24. A method according to claim 19, wherein when said second of said participants replies with a third response, said third response is visible to not all but less than all of said plurality of participants that participate in said first channel.

25. A method according to claim 19, wherein said first of said participants indicates with physical action that said first of said messages is to be transmitted to ones of said channels that includes said first channel and said second channel.

26. A method according to claim 19, wherein said first of said participants is authorized to participate in said first channel and said second channel as a condition of transmitting said first of said messages in said first channel and said second channel.

27. A method according to claim 19, wherein responsive to physical interaction with a screen providing said display of said messages, said first channel and said second channel are identified as having transmitted therein said first of said messages and said second of said messages.

28. A method according to claim 19, wherein when said second of said participants replies with a third response to said first of said messages in said first channel, said third response is also transmitted in said second channel.

29. A method according to claim 19, wherein:
said second of said participants replies in said first channel with a first response,
said third of said participants replies in said second channel with a second response,
said first response is visible in said first channel and is prevented from being displayed in said second channel;
said second response is visible in said second channel and is prevented from being displayed in said first channel.

30. A method according to claim 19, wherein at least one of said third of said participants is specified by said first of said participants as being authorized to receive said first of said messages; or a fourth participant included in said second channel that is not authorized to receive said first of said messages is prevented from viewing said first of said messages.

31. A method according to claim 19, wherein said first of said messages is transmitted in said first channel after said first of said participants selects said first channel for transmitting said first of said messages.

32. A method according to claim 19, wherein all but said first of said participants is prevented from receiving said first of said message in said first channel.

33. A method according to claim 19, wherein receiving said designation includes identifying said second channel as being where said first of said messages is to be transmitted.

34. A method according to claim 19, wherein prior to receiving said designation, said second channel exists, and ones of said messages that are transmitted in said first channel while said second channel exists are prohibited from appearing in said second channel and after receiving said designation and based on said designation, said apparatus transitions from i) said ones of said messages that are transmitted in said first channel while said second channel exists being prohibited from appearing in said second channel to ii) others of said messages transmitted in said first channel while said second channel exists being permitted to appear in said second channel and are received by said third of said participants in said second channel.

35. A method according to claim 19, wherein a chronologically initial message that is in said second channel is not transmitted by said first user in both said first channel and said second channel.

* * * * *